United States Patent
Nieten et al.

(10) Patent No.: US 10,791,306 B2
(45) Date of Patent: Sep. 29, 2020

(54) PROJECTOR FOR PROJECTING IMAGES

(71) Applicant: Carl Zeiss Jena GmbH, Jena (DE)

(72) Inventors: Christoph Nieten, Jena (DE); Enrico Geissler, Jena (DE); Bryce Anton Moffat, Jena (DE); Carsten Wehe, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 16/731,410

(22) Filed: Dec. 31, 2019

(65) Prior Publication Data

US 2020/0228768 A1    Jul. 16, 2020

(30) Foreign Application Priority Data

Jan. 10, 2019 (DE) .................. 10 2019 100 480

(51) Int. Cl.
*H04N 9/31* (2006.01)

(52) U.S. Cl.
CPC ......... *H04N 9/3188* (2013.01); *H04N 9/3123* (2013.01)

(58) Field of Classification Search
CPC .. H04N 9/3126; H04N 9/3155; H04N 9/3188; H04N 9/3123; H04N 9/3197; H04N 9/31
(Continued)

(56) References Cited

U.S. PATENT DOCUMENTS

| | | | |
|---|---|---|---|
| 5,978,142 A | 11/1999 | Blackham et al. | |
| 2007/0139620 A1* | 6/2007 | Bruzzone | H04N 9/3105 353/20 |

(Continued)

FOREIGN PATENT DOCUMENTS

| | | |
|---|---|---|
| DE | 602004008975 T2 | 6/2008 |
| DE | 102008029788 B4 | 11/2016 |
| WO | 2019156129 A1 | 8/2019 |

OTHER PUBLICATIONS

Doherty, D. et al.: 10.4: Phased Reset Timing for Improved Digital Micromirror Device™ (DMD™) Brightness, International Symposium Digest of Technical Papers, vol. 29, 1998, pp. 125-128, 4 pages.

(Continued)

*Primary Examiner* — Sherrie Hsia
(74) *Attorney, Agent, or Firm* — Skaar Ulbrich Macari, P.A.

(57) ABSTRACT

The control unit of a projector drives modulators for the range of brightness of the image data with a first resolution of NN levels, wherein NN is an integer greater than one. The control unit applies a predefined brightness change to the brightness value in accordance with the image data for the image point such that a changed brightness value having a second resolution, which is greater than the first resolution, is calculated, and converts the changed brightness value into the increased brightness value such that it has the first resolution and is greater than a notional comparison value having the first resolution that arises if the predefined brightness change is applied to the brightness value in accordance with the image data, with the result that the control unit drives one of the modulators for a pixel to be boosted with the increased brightness value having the first resolution.

19 Claims, 33 Drawing Sheets

(58) Field of Classification Search
USPC .............. 348/744, 745, 758, 750, 755, 756; 353/30, 34; 359/237
See application file for complete search history.

(56) References Cited

U.S. PATENT DOCUMENTS

| | | |
|---|---|---|
| 2009/0231496 A1* | 9/2009 | Nishino ................. G09G 3/346 348/744 |
| 2017/0206822 A1 | 7/2017 | Moffat et al. |
| 2018/0308401 A1 | 10/2018 | French et al. |
| 2019/0012950 A1 | 1/2019 | Nieten et al. |

OTHER PUBLICATIONS

ISO 10527:2007, CIE S 014-1/E; CIE Standard Colorimetric Observers, Oct. 15, 2007, 40 pages.
DIN EN ISO 11664-5 (first edition Sep. 1, 2016), Colorimetry, Part 5, 14 pages.
Search Report to the corresponding European patent application rendered by the European Patent Office (EPO) dated May 26, 2020, 14 pages.

* cited by examiner

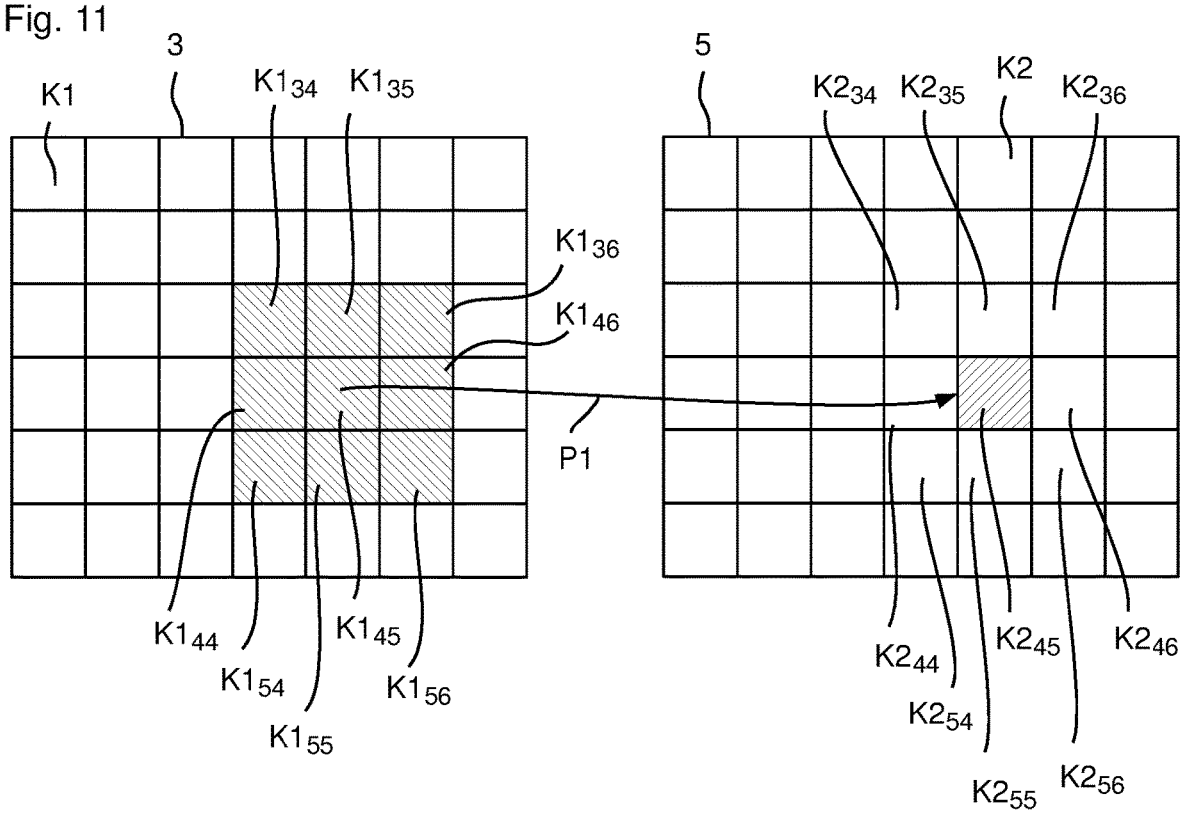

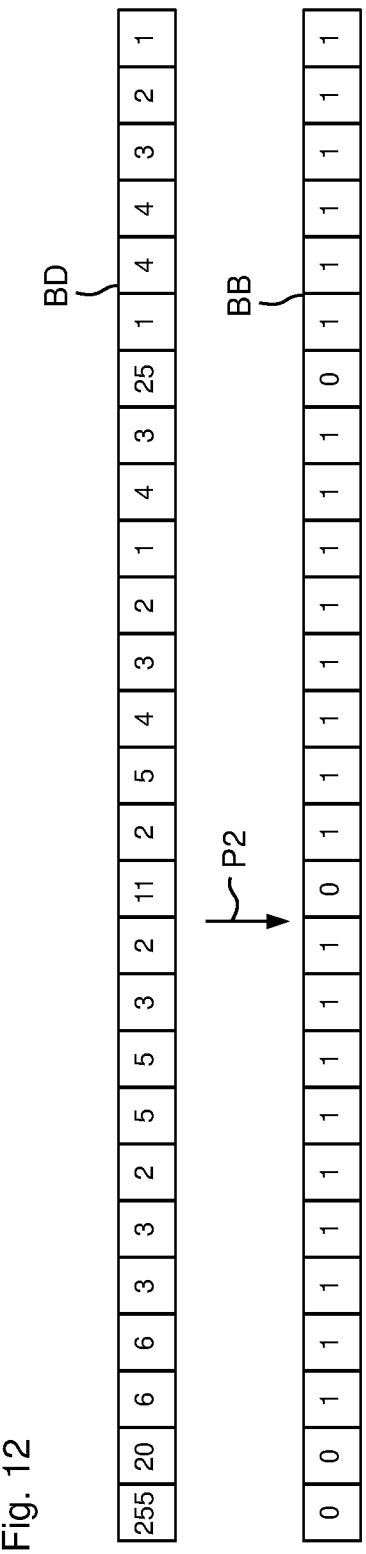
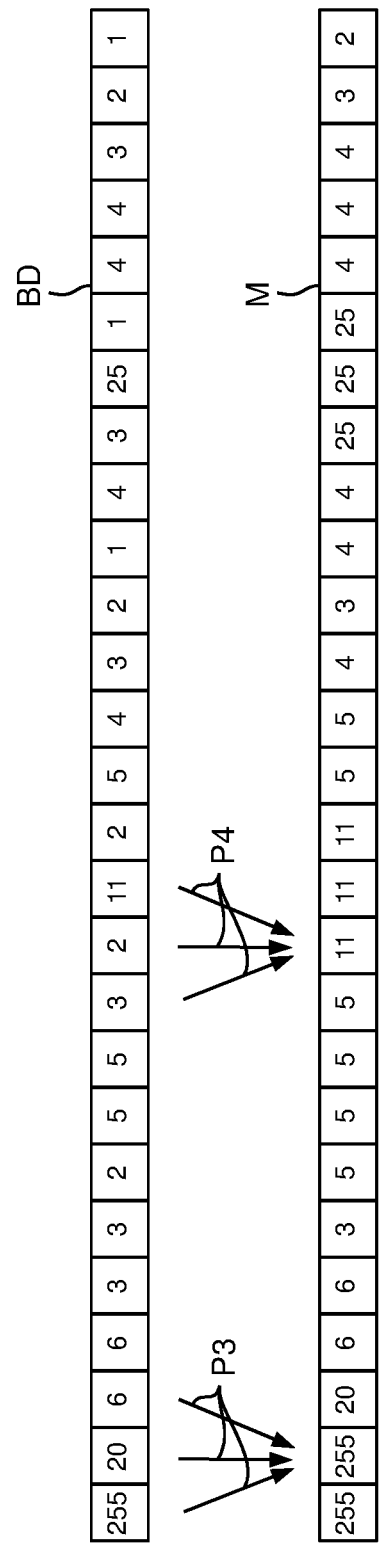

Fig. 23

| Pixel # | "Transmission" P1 ideal [0:1] | "Transmission" P2 ideal [0:1] | Mask P1 real 8bit [0:255] | Mask P2 real 8bit [0:255] | grayscale value P1 real 8bit [0:255] | P1 DMD2 [Boost] [0:255] | grayscale value P2 real 8bit [0:255] | P2 DMD2 [Boost] [0:255] | brightness P1 real 8bit [0:1] | brightness P2 real 8bit [0:1] | sum real 8bit [0:1] | error [%] |
|---|---|---|---|---|---|---|---|---|---|---|---|---|
| 1 | 1 | 0 | 255 | 0 | 7 | 162 | 0 | 0 | 3.66E-04 | 0 | 3.66E-04 | 0% |
| 2 | 1 | 0 | 255 | 0 | 7 | 162 | 0 | 0 | 3.66E-04 | 0 | 3.66E-04 | 0% |
| 3 | 1 | 0 | 255 | 0 | 7 | 162 | 0 | 0 | 3.66E-04 | 0 | 3.66E-04 | 0% |
| 4 | 1 | 0 | 255 | 0 | 7 | 162 | 0 | 0 | 3.66E-04 | 0 | 3.66E-04 | 0% |
| 5 | 1 | 0 | 255 | 0 | 7 | 162 | 0 | 0 | 3.66E-04 | 0 | 3.66E-04 | 0% |
| 6 | 0.95 | 0.05 | 249 | 65 | 7 | 162 | 2 | 46 | 3.66E-04 | 2.30E-05 | 3.89E-04 | 6% |
| 7 | 0.9 | 0.1 | 243 | 90 | 7 | 162 | 2 | 46 | 3.66E-04 | 2.30E-05 | 3.89E-04 | 6% |
| 8 | 0.85 | 0.15 | 237 | 108 | 6 | 139 | 3 | 69 | 2.61E-04 | 5.60E-05 | 3.17E-04 | 14% |
| 9 | 0.8 | 0.2 | 230 | 123 | 6 | 139 | 3 | 69 | 2.61E-04 | 5.60E-05 | 3.17E-04 | 14% |
| 10 | 0.75 | 0.25 | 224 | 136 | 6 | 139 | 4 | 92 | 2.61E-04 | 1.05E-04 | 3.67E-04 | 0% |
| 11 | 0.7 | 0.3 | 217 | 148 | 6 | 139 | 4 | 92 | 2.61E-04 | 1.05E-04 | 3.67E-04 | 0% |
| 12 | 0.65 | 0.35 | 210 | 158 | 6 | 139 | 4 | 92 | 2.61E-04 | 1.05E-04 | 3.67E-04 | 0% |
| 13 | 0.6 | 0.4 | 202 | 168 | 6 | 139 | 5 | 116 | 2.61E-04 | 1.76E-04 | 4.37E-04 | 19% |
| 14 | 0.55 | 0.45 | 194 | 177 | 5 | 116 | 5 | 116 | 1.76E-04 | 1.76E-04 | 3.51E-04 | 4% |
| 15 | 0.5 | 0.5 | 186 | 186 | 5 | 116 | 5 | 116 | 1.76E-04 | 1.76E-04 | 3.51E-04 | 4% |
| 16 | 0.45 | 0.55 | 177 | 194 | 5 | 116 | 5 | 116 | 1.76E-04 | 1.76E-04 | 3.51E-04 | 4% |
| 17 | 0.4 | 0.6 | 168 | 202 | 5 | 116 | 6 | 139 | 1.76E-04 | 2.61E-04 | 4.37E-04 | 19% |
| 18 | 0.35 | 0.65 | 158 | 210 | 4 | 92 | 6 | 139 | 1.05E-04 | 2.61E-04 | 3.67E-04 | 0% |
| 19 | 0.3 | 0.7 | 148 | 217 | 4 | 92 | 6 | 139 | 1.05E-04 | 2.61E-04 | 3.67E-04 | 0% |
| 20 | 0.25 | 0.75 | 136 | 224 | 3 | 69 | 6 | 139 | 5.60E-05 | 2.61E-04 | 3.17E-04 | 14% |
| 21 | 0.2 | 0.8 | 123 | 230 | 3 | 69 | 6 | 139 | 5.60E-05 | 2.61E-04 | 3.17E-04 | 14% |
| 22 | 0.15 | 0.85 | 108 | 237 | 2 | 46 | 7 | 162 | 2.30E-05 | 3.66E-04 | 3.89E-04 | 6% |
| 23 | 0.1 | 0.9 | 90 | 243 | 2 | 46 | 7 | 162 | 2.30E-05 | 3.66E-04 | 3.89E-04 | 6% |
| 24 | 0.05 | 0.95 | 65 | 249 | 0 | 0 | 7 | 162 | 0 | 3.66E-04 | 3.66E-04 | 0% |
| 25 | 0 | 1 | 0 | 255 | 0 | 0 | 7 | 162 | 0 | 3.66E-04 | 3.66E-04 | 0% |
| 26 | 0 | 1 | 0 | 255 | 0 | 0 | 7 | 162 | 0 | 3.66E-04 | 3.66E-04 | 0% |
| 27 | 0 | 1 | 0 | 255 | 0 | 0 | 7 | 162 | 0 | 3.66E-04 | 3.66E-04 | 0% |
| 28 | 0 | 1 | 0 | 255 | 0 | 0 | 7 | 162 | 0 | 3.66E-04 | 3.66E-04 | 0% |
| 29 | 0 | 1 | 0 | 255 | 0 | 0 | 7 | 162 | 0 | 3.66E-04 | 3.66E-04 | 0% |
| 30 | 0 | 1 | 0 | 255 | 0 | 0 | 7 | 162 | 0 | 3.66E-04 | 3.66E-04 | 0% |

Fig. 25

| Pixel # | Mask P1 real 8bit [0:255] | Mask P2 real 8bit [0:255] | P1 (image*mask) 16bit [0:2^16-1] | P1 DMD2 Boost [0:255] | P2 (image*mask) 16bit [0:2^16-1] | P2 DMD2 Boost [0:255] | brightness P1 real 8bit [0:1] | brightness P2 real 8bit [0:1] | sum real 8bit [0:1] | error [%] |
|---|---|---|---|---|---|---|---|---|---|---|
| 1 | 255 | 0 | 1799 | 162 | 0 | 0 | 3.69E-04 | 0 | 3.69E-04 | 0% |
| 2 | 255 | 0 | 1799 | 162 | 0 | 0 | 3.69E-04 | 0 | 3.69E-04 | 0% |
| 3 | 255 | 0 | 1799 | 162 | 0 | 0 | 3.69E-04 | 0 | 3.69E-04 | 0% |
| 4 | 255 | 0 | 1799 | 162 | 0 | 0 | 3.69E-04 | 0 | 3.69E-04 | 0% |
| 5 | 255 | 0 | 1799 | 162 | 0 | 0 | 3.69E-04 | 0 | 3.69E-04 | 0% |
| 6 | 249 | 65 | 1757 | 158 | 459 | 41 | 3.49E-04 | 1.79E-05 | 3.67E-04 | 0.09% |
| 7 | 243 | 90 | 1724 | 154 | 635 | 57 | 3.30E-04 | 3.70E-05 | 3.67E-04 | 0.10% |
| 8 | 237 | 108 | 1672 | 150 | 762 | 68 | 3.11E-04 | 5.46E-05 | 3.66E-04 | 0.37% |
| 9 | 230 | 123 | 1623 | 146 | 868 | 78 | 2.93E-04 | 7.38E-05 | 3.67E-04 | 0.03% |
| 10 | 224 | 136 | 1580 | 142 | 959 | 86 | 2.76E-04 | 9.15E-05 | 3.67E-04 | 0.06% |
| 11 | 217 | 148 | 1531 | 138 | 1044 | 94 | 2.59E-04 | 1.11E-04 | 3.70E-04 | 0.87% |
| 12 | 210 | 158 | 1482 | 133 | 1115 | 100 | 2.39E-04 | 1.28E-04 | 3.66E-04 | 0.21% |
| 13 | 202 | 168 | 1425 | 128 | 1185 | 107 | 2.20E-04 | 1.48E-04 | 3.68E-04 | 0.10% |
| 14 | 194 | 177 | 1369 | 123 | 1249 | 112 | 2.01E-04 | 1.64E-04 | 3.65E-04 | 0.65% |
| 15 | 186 | 186 | 1312 | 118 | 1312 | 118 | 1.84E-04 | 1.84E-04 | 3.67E-04 | 0.01% |
| 16 | 177 | 194 | 1249 | 112 | 1369 | 123 | 1.64E-04 | 2.01E-04 | 3.65E-04 | 0.65% |
| 17 | 168 | 202 | 1185 | 107 | 1425 | 128 | 1.48E-04 | 2.20E-04 | 3.68E-04 | 0.10% |
| 18 | 158 | 210 | 1115 | 100 | 1482 | 133 | 1.28E-04 | 2.39E-04 | 3.66E-04 | 0.21% |
| 19 | 148 | 217 | 1044 | 94 | 1531 | 138 | 1.11E-04 | 2.59E-04 | 3.70E-04 | 0.87% |
| 20 | 136 | 224 | 959 | 86 | 1580 | 142 | 9.15E-05 | 2.76E-04 | 3.67E-04 | 0.06% |
| 21 | 123 | 230 | 868 | 78 | 1623 | 146 | 7.38E-05 | 2.93E-04 | 3.67E-04 | 0.03% |
| 22 | 108 | 237 | 762 | 68 | 1672 | 150 | 5.46E-05 | 3.11E-04 | 3.66E-04 | 0.37% |
| 23 | 90 | 243 | 635 | 57 | 1724 | 154 | 3.70E-05 | 3.30E-04 | 3.67E-04 | 0.10% |
| 24 | 65 | 249 | 459 | 41 | 1757 | 158 | 1.79E-05 | 3.49E-04 | 3.67E-04 | 0.09% |
| 25 | 0 | 255 | 0 | 0 | 1799 | 162 | 0 | 3.69E-04 | 3.69E-04 | 0% |
| 26 | 0 | 255 | 0 | 0 | 1799 | 162 | 0 | 3.69E-04 | 3.69E-04 | 0% |
| 27 | 0 | 255 | 0 | 0 | 1799 | 162 | 0 | 3.69E-04 | 3.69E-04 | 0% |
| 28 | 0 | 255 | 0 | 0 | 1799 | 162 | 0 | 3.69E-04 | 3.69E-04 | 0% |
| 29 | 0 | 255 | 0 | 0 | 1799 | 162 | 0 | 3.69E-04 | 3.69E-04 | 0% |
| 30 | 0 | 255 | 0 | 0 | 1799 | 162 | 0 | 3.69E-04 | 3.69E-04 | 0% |

Fig. 49

| RGB input | | | 1-3DMD prior art | | | Ideal | RGB1 | R2 | G2 | B2 | 1-3DMD + Boost | | | | | |
|---|---|---|---|---|---|---|---|---|---|---|---|---|---|---|---|---|
| R | G | B | L | x | y | L | | | | | t01r/τr | t01g/τg | t01b/τb | L | x | y |
| 255 | 255 | 255 | 1 | 0.295 | 0.329 | 1 | 255 | 255 | 255 | 255 | | | | 1 | 0.295 | 0.329 |
| 20 | 20 | 20 | 0.00371 | 0.295 | 0.328 | 0.00370 | 20.1 | 20 | 20 | 20 | | | | 0.00371 | 0.295 | 0.328 |
| 10 | 10 | 10 | 0.00081 | 0.295 | 0.328 | 0.00080 | 10.1 | 10 | 10 | 10 | | | | 0.00081 | 0.295 | 0.328 |
| 9 | 9 | 9 | 0.00065 | 0.295 | 0.328 | 0.00064 | 9.05 | 9 | 9 | 9 | | | | 0.00065 | 0.295 | 0.328 |
| 8 | 8 | 8 | 0.00050 | 0.295 | 0.328 | 0.00049 | 0 | 156.8 | 134.8 | 66.5 | 0.8017 | 0.7485 | 0.5430 | 0.00050 | 0.295 | 0.328 |
| 7 | 7 | 7 | 0.00038 | 0.295 | 0.327 | 0.00037 | 0 | 82.1 | 70.6 | 34.8 | 0.5975 | 0.5578 | 0.4045 | 0.00037 | 0.295 | 0.328 |
| 6 | 6 | 6 | 0.00027 | 0.295 | 0.327 | 0.00026 | 0 | 38.9 | 33.4 | 16.5 | 0.4255 | 0.3972 | 0.2879 | 0.00027 | 0.295 | 0.328 |
| 5 | 5 | 5 | 0.00018 | 0.294 | 0.326 | 0.00018 | 0 | 16.1 | 13.8 | 6.8 | 0.2847 | 0.2657 | 0.1925 | 0.00018 | 0.295 | 0.328 |
| 4 | 4 | 4 | 0.00012 | 0.293 | 0.325 | 0.00011 | 0 | 5.4 | 4.7 | 2.3 | 0.1740 | 0.1624 | 0.1174 | 0.00011 | 0.295 | 0.328 |
| 3 | 3 | 3 | 6.54E-05 | 0.292 | 0.322 | 5.69E-05 | 0 | 1.3 | 1.2 | 0.6 | 0.0921 | 0.0859 | 0.0619 | 5.77E-05 | 0.295 | 0.328 |
| 2 | 2 | 2 | 3.18E-05 | 0.288 | 0.315 | 2.33E-05 | 0 | 0.2 | 0.2 | 0.1 | 0.0374 | 0.0348 | 0.0248 | 2.36E-05 | 0.295 | 0.328 |
| 1 | 1 | 1 | 1.35E-05 | 0.278 | 0.298 | 5.08E-06 | 0 | 0.006 | 0.005 | 0.002 | 0.0076 | 0.0071 | 0.0047 | 3.14E-06 | 0.295 | 0.328 |
| 0 | 0 | 0 | 4.42E-07 | 0.247 | 0.239 | 0 | 0 | 0 | 0 | 0 | 0 | 0 | 0 | 4.42E-07 | 0.247 | 0.239 |

Fig. 50

| RGB input | | | 1-3DMD prior art | | | Ideal | R1 | R2 | G2 | B2 | 1-3DMD + Boost | | | | | |
|---|---|---|---|---|---|---|---|---|---|---|---|---|---|---|---|---|
| R | G | B | L | x | y | L | | | | | t01r/τr | t01g/τg | t01b/τb | L | x | y |
| 255 | 0 | 0 | 1 | 0.645 | 0.355 | 1 | 255 | 255 | 0 | 0 | | | | 1 | 0.645 | 0.355 |
| 20 | 0 | 0 | 0.00374 | 0.638 | 0.354 | 0.00370 | 20.1 | 20 | 0 | 0 | | | | 0.00374 | 0.639 | 0.354 |
| 10 | 0 | 0 | 0.00085 | 0.619 | 0.350 | 0.00080 | 10.1 | 10 | 0 | 0 | | | | 0.00085 | 0.621 | 0.350 |
| 9 | 0 | 0 | 0.00068 | 0.614 | 0.349 | 0.00064 | 9.05 | 9 | 0 | 0 | | | | 0.00068 | 0.615 | 0.349 |
| 8 | 0 | 0 | 0.00054 | 0.606 | 0.347 | 0.00049 | 0 | 153.7 | 0 | 0 | 0.7944 | 0.0085 | 0.0091 | 0.00053 | 0.615 | 0.349 |
| 7 | 0 | 0 | 0.00041 | 0.595 | 0.345 | 0.00037 | 0 | 80.5 | 0.007 | 0.004 | 0.5920 | 0.0062 | 0.0065 | 0.00039 | 0.615 | 0.349 |
| 6 | 0 | 0 | 0.00030 | 0.579 | 0.342 | 0.00026 | 0 | 38.1 | 0.004 | 0.004 | 0.4216 | 0.0042 | 0.0044 | 0.00028 | 0.615 | 0.349 |
| 5 | 0 | 0 | 0.00022 | 0.555 | 0.338 | 0.00018 | 0 | 15.8 | 0.0015 | 0.0016 | 0.2821 | 0.0026 | 0.0026 | 0.00019 | 0.615 | 0.349 |
| 4 | 0 | 0 | 0.00015 | 0.518 | 0.330 | 0.00011 | 0 | 5.3 | 0.0005 | 0.0005 | 0.1724 | 0.0013 | 0.0012 | 0.00011 | 0.615 | 0.349 |
| 3 | 0 | 0 | 1.00E-04 | 0.461 | 0.319 | 5.69E-05 | 0 | 1.3 | 0.00012 | 0.00010 | 0.0913 | 0.0004 | 0.0002 | 6.08E-05 | 0.615 | 0.349 |
| 2 | 0 | 0 | 6.65E-05 | 0.382 | 0.304 | 2.33E-05 | 0 | 0.2 | 0.000009 | 0.000002 | 0.0370 | 0 | 0 | 2.56E-05 | 0.593 | 0.341 |
| 1 | 0 | 0 | 4.83E-05 | 0.301 | 0.288 | 5.08E-06 | 0 | 0.005 | 0 | 0 | 0.0076 | 0 | 0 | 7.05E-06 | 0.478 | 0.307 |
| 0 | 0 | 0 | 2.29E-06 | 0.247 | 0.239 | 0 | 0 | 0 | 0 | 0 | 0 | 0 | 0 | 2.29E-06 | 0.247 | 0.239 |

PROJECTOR FOR PROJECTING IMAGES

PRIORITY

This application claims the benefit of German Patent Application No. 10 2019 100 480.2, filed on 10 Jan. 2019, which is hereby incorporated herein by reference in its entirety.

FIELD

The present invention relates to a projector for projecting images.

BACKGROUND

Projectors are used to minimize the unavoidable background brightness, which results in a better representation of black image contents (having the brightness zero). The difficulty, however, is that in the case of dark image contents, the lowest input grayscale levels (that is to say the grayscale values following the grayscale value=zero=black) in the projected image are no longer representable in a manner distinguishable from the remaining background brightness. This is often managed with the aid of so-called temporal dithering and/or spatial dithering. In the case of temporal dithering, the grayscale value to be represented is represented correctly only in a manner averaged over a plurality of successively projected images (or frames) generated in each case for a predetermined frame duration. That means that e.g. in the case of five successive frames, the corresponding pixel is switched on only in two or three frames and is switched off in the other frames. When averaged over the five frames, the desired grayscale value can then be represented fairly well. In the case of spatial or local dithering, the averaging is effected by way of switching on and off adjacent pixels in a single frame. With such dithering, firstly not all grayscale values can actually be represented. Precisely the grayscale values following the grayscale value zero are not representable in this way. Secondly, dithering generates shimmer, which many observers find disturbing. Furthermore, it is possible to combine local and temporal dithering and to vary them over successive frames in order to mask the "dither pattern"—although this also leads to shimmer.

These difficulties result in a worse image impression in particular even if a plurality of projectors are used for projecting a large overall image, wherein in this case the projected images are projected such that they overlap in the edge region in order to provide a continuous image impression. If, then, such a low grayscale value is to be represented in said edge region, on account of the brightness represented excessively highly, by virtue of each of the two projectors, this results in even higher brightnesses for low input brightnesses.

For such a case it is known (DE 10 2016 100 592 A1) to boost pixels having such low brightnesses, e.g. by the corresponding first pixel of the first modulator being switched to black and the assigned second pixel of the second modulator modulating the actually undesired residual light incident on said second pixel (specifically with a higher and thus boosted brightness value relative to the image data).

It has been found, however, that although low brightnesses are thus representable in a distinguishable manner, the deviation from the ideal brightness value can be relatively large. This results in undesired artefacts in the image representation. Such deviations can be particularly disturbing in the edge region, for example, in which the projected images overlap if a plurality of projectors are used for projecting a large overall image.

SUMMARY

The disclosure includes a projector for projecting an image with which the difficulties described can be overcome as fully as possible.

The projector for projecting an image can comprise a first modulator, which has a plurality of first pixels capable of being impinged on by light from a light source, a second modulator, which is disposed downstream of the first modulator and has a plurality of second pixels, and an imaging optical unit, which images the first modulator onto the second modulator. The first and second pixels are switchable independently of one another in each case into a first state, in which light incident on them is used for image generation, and into a second state, in which light incident on them does not serve for image generation, in order pixel-individually to modulate the light for generating the image. The projector furthermore has a projection optical unit, which images light coming from the second modulator onto a projection surface in order to project the image, as a result of which each second pixel is assigned to an image point of the projected image, and a control unit, which drives the two modulators on the basis of supplied image data, wherein the control unit drives the modulators for the range of the minimum possible to the maximum possible brightness of the image data with a first resolution of NN levels, wherein NN is an integer greater than one, wherein each second pixel is assigned at least one first pixel in such a way that the imaging optical unit causes the second pixel a) to be impinged on by light from the respectively assigned first pixel if the assigned first pixel is switched into the first state, in order actively to illuminate the second pixel, and b) not to be impinged on by light from the respectively assigned first pixel if the assigned first pixel is switched into the second state, in order not actively to illuminate the second pixel, with the result that only unavoidable residual light is incident on the second pixel.

The control unit drives the modulators such that for at least one second pixel which is assigned to an image point which, on the basis of the image data, is intended to have a brightness value which is greater than zero, c) the at least one second pixel is switched into the second state and the assigned first pixel(s) is or are switched into the first state for brightness modulation only during the time segment(s) in which the at least one second pixel is switched into the second state, with the result that residual light modulated by the at least one second pixel then emanates and contributes to the image generation, wherein the control unit drives the assigned first pixel(s) on the basis of an increased brightness value, or d) the assigned first pixel(s) is or are switched into the second state at least at the time segments in which the at least one second pixel is switched into the first state, with the result that no active illumination is effected and the at least one second pixel modulates the residual light, wherein the control unit drives the residual-light-modulating second pixel on the basis of an increased brightness value.

The control unit

A) applies a predefined brightness change to the brightness value in accordance with the image data for the image point such that a changed brightness value having a second resolution, which is greater than the first resolution, is calculated, and B) converts the changed brightness value into the increased brightness value such that it has the first resolution and is greater than a notional comparison value having the first resolution that arises if the predefined brightness change is applied to the brightness value in accordance with the image data, with the result that the control unit drives one of the modulators in step c) or d) with the increased brightness value having the first resolution.

Furthermore, provision is made of a projector for projecting an image, comprising a first modulator, which has a plurality of first pixels capable of being impinged on by light from a light source, a second modulator, which is disposed downstream of the first modulator and has a plurality of second pixels, and an imaging optical unit, which images the first modulator onto the second modulator, wherein the projector furthermore has a projection optical unit, which images light coming from the second modulator onto a projection surface in order to project the image, as a result of which each second pixel is assigned to an image point of the projected image, and a control unit, which drives the two modulators on the basis of supplied image data, wherein the control unit drives the modulators for the range of the minimum possible to the maximum possible brightness of the image data with a first resolution of NN levels, wherein NN is an integer greater than one, wherein the control unit A) applies a predefined brightness change to the brightness value in accordance with the image data for the image point such that a changed brightness value having a second resolution, which is greater than the first resolution, is calculated, and B) converts the changed brightness value into an increased brightness value such that it has the first resolution and is greater than a notional comparison value having the first resolution that arises if the predefined brightness change is applied to the brightness value in accordance with the image data, with the result that the control unit drives one of the modulators for a pixel to be boosted with the increased brightness value having the first resolution.

Since, in the case of brightness values to be boosted, the control unit applies a predefined brightness change to the brightness value in accordance with the image data for the corresponding second pixel such that a changed brightness value having a second resolution or second brightness resolution, which is greater than the first resolution (or first brightness resolution), is calculated, and thus converts the changed brightness value into the increased brightness value (boosted brightness value) having the first resolution, said value being greater than a notional comparison value having the first resolution that arises if the predefined brightness change is applied to the brightness value in accordance with the image data, the brightness range to be boosted can be represented in a more finely resolved manner and thus be generated significantly closer to the desired ideal brightness.

To put it another way, in the brightness range to be boosted, which can encompass e.g. 5-15% of the brightness values to be represented, a brightness change can be calculated and converted to the entire range of the first resolution, with the result that for the brightness range to be boosted it is possible to use a higher brightness resolution, which is higher e.g. by a factor of 6.7 to 20 in comparison with the brightness range having brightnesses that are greater than the first threshold value.

The control unit for calculating the changed brightness value can multiply the brightness value in accordance with the image data by a value that determines the brightness change (or equivalently thereto can carry out a corresponding division). A percentage brightness change is preferably carried out.

In the projector, an individual brightness change can be stored for each image point, and is accessed by the control unit during the calculation of the changed brightness value.

The brightness change can be a brightness reduction.

The brightness change can be applied in order to carry out an adaptation of the brightness in an image field overlap region with a further projector and/or an adaptation to the brightness of a further projector.

In particular, provision can be made of a multi-projector arrangement having two, three, four, five, . . . and up to 20 or more projectors according to the invention (including all developments described), in order to generate an overall image from the images of the projectors. The individual images of the projectors can (preferably) partly overlap.

If the projectors have different color spaces, the latter can be brought to a common color space by way of gamut mapping (e.g. in step A)). This ensures that for each RGB triad of the image data, from all projectors the projected color locus and the brightness are identical.

The projectors often have different white points. As an alternative to a gamut mapping, all projectors can be set to a common white point by way of a white point adaptation (which can be identical for all pixels of the projector, but does not have to be if there is a color profile over the image). The white point adaptation can be effected by way of a 3×3 matrix which assigns an outgoing (white-point-corrected) RGB value to an incoming RGB value. Then the images of all projectors are inherently of homogenous brightness and have the same white point. Said white point adaptation can preferably be performed in step A).

In the projector, the brightness change can be applied in order to compensate for a variation of the brightness of the imaged second pixels, said variation being caused by a variation of the size of the second pixels imaged onto the projection surface.

The increased brightness value can be at least 10 times the brightness value of the comparison value if NN is equal to 256.

The factor can also be greater than 10. In particular, it is preferably in the range of 10 to 50, 15 to 45, 20 to 40, 25 to 45 or 28 to 38. Preferred values for the factor are 18, 25, 36 and 46. In particular, the value of the factor can be chosen depending on the contrast of the projector.

Given a contrast of 500:1, e.g. a factor of 18 can be chosen. Preferably, this factor is applied for the brightness values of 1 to 14. Given a contrast of 1000:1, e.g. a factor of 25 can be chosen. Preferably, this factor is applied for the brightness values of 1 to 10. Given a contrast of 2000:1, e.g. a factor of 36 can be chosen. Preferably, this factor is applied for the brightness values of 1 to 7. Given a contrast of 4000:1, e.g. a factor of 46 can be chosen. Preferably, this factor is applied for the brightness values of 1 to 5 or of 1 to 6. Thus, preferably a larger factor is chosen with higher contrast.

The control unit can drive the two modulators by means of pulse-width-modulated control data.

The control unit in step A) can apply a predefined brightness change to the brightness value in accordance with the image data for each second pixel such that a changed brightness value having a second resolution, which is greater than the first resolution, is calculated, and can compare the changed brightness value with a boost threshold value and, if the changed brightness value is less than the boost threshold value, can perform step B).

The control unit, if the changed brightness value is equal to or greater than the boost threshold value, can convert the changed brightness value into a brightness value having the first resolution, without carrying out an additional increase. Such second pixels are thus not boosted.

The boost threshold value is preferably present with the second resolution.

If the changed brightness value is equal to or greater than the boost threshold value, the control unit can convert the changed brightness value into a reduced brightness value having the first resolution, said value taking account of the residual light in such a way that the reduced brightness value is lower than the brightness value in accordance with the image data and the predefined brightness change, wherein the control unit drives the pixel(s) in step c) or d) on the basis of the reduced brightness value.

The control unit can determine the at least one second pixel that modulates the residual light in accordance with step c) by means of the following steps:

I) at least one second pixel is selected which is assigned to an image point whose brightness value predefined by the image data and the predefined brightness change is greater than zero and less than or equal to the boost threshold value, and II) a selected second pixel is determined as a residual-light-modulating second pixel if all assigned first pixels, on account of the image data and the predefined brightness change, are driven in each case in accordance with a brightness value that is less than a predetermined second threshold value, wherein the second threshold value is chosen such that the time segment(s) when the first pixels are to be switched into the first state does or do not overlap the time segment(s) when the residual-light-modulating second pixel is to be switched into the first state, in order to modulate the residual light.

The boost threshold value can correspond to the first threshold value.

The control unit can perform step II) for a second pixel selected in step I) only if at least one of k neighboring pixels of the selected second pixel is assigned to an image point whose brightness value predefined by the image data and the predefined brightness change is greater than the first threshold value, wherein k is a natural number greater than or equal to 1.

In the projector, the functions of the first and second modulators can also be interchanged. In this case, the control unit drives the first pixels of the first projector in the manner as described for the second pixels of the second projector. The same correspondingly applies to the driving of the second pixels.

The projector can comprise a plurality of color channels in order to generate color partial images of the image to be projected, wherein a first color channel has the first modulator, the second modulator and the imaging optical unit, and wherein each further color channel comprises the first modulator or a further first modulator, which has a plurality of first pixels capable of being driven independently of one another in order to modulate light capable of impinging on the first modulator, the imaging optical unit or a further imaging optical unit and the second modulator or a further second modulator, which has a plurality of second pixels capable of being driven independently of one another and which, by means of the imaging optical unit, is capable of being impinged on by the light modulated by the first modulator and modulates this light by means of the second pixels in order to generate a color partial image, wherein the control unit drives each color channel such that one of the color partial images is generated, and the projection optical unit images the generated color partial images onto a projection surface such that the color partial images are perceptible as a projected multicolored image, wherein each color channel is configured for generating a color partial image of a predetermined primary color, wherein the color locus of the predetermined primary color varies with the brightness to be generated, and wherein the control unit drives each color channel such that for at least one image point in the multicolored image which, in accordance with the image data, is intended to have a predetermined target color locus and a predetermined target brightness, the color locus shift of the predetermined target color locus that is caused by the color channel or the color channels is compensated for with the target brightness being maintained.

The control unit can bring about a greater compensation during the driving of the color channels with decreasing target brightness.

The control unit can have, for target color loci generatable by means of the projector with assigned target brightnesses, predetermined and stored correction values for the color channels, wherein the control unit uses the correction values for compensation during the driving of the color channels.

The control unit can adapt the compensation to the color locus with the first threshold value or the boost threshold value as target brightness value. In this case, the first threshold value or the boost threshold value can be different for each color channel. It is also possible for the first threshold value or the boost threshold value to be identical for at least two color channels.

As a result of the modulation of the residual light, virtually the background brightness itself is modulated, with the result that a distinguishable representation of very low grayscale values and in particular grayscale values beginning with values of greater than zero is possible.

Preferably, the at least one second pixel modulates only the residual light for generating the image or during a frame duration of the image to be generated.

The brightness value in accordance with the image data is understood here to mean in particular an input grayscale value or drive value for the modulators, which is a value from a defined value range. In this regard, the value range can have e.g. only integer values of 0 to 255, wherein zero is intended to be the lowest brightness and thus black and 255 is intended to be the highest brightness. In the case of a colored or multicolored representation, this applies to each color of the color image or color partial image to be generated.

In particular, the control unit drives the residual-light-modulating second pixel on the basis of the increased brightness value. The residual-light-modulating second pixel can therefore be referred to as a boosted pixel. Increasing the brightness value to be represented takes account of the fact that the background brightness is relatively low. A good representation of small grayscale values is thus possible.

Here there need not be a fixed factor for all boostable grayscale values (brightness values which are greater than zero and less than or equal to the predetermined first threshold value). An individual factor can be defined for each boostable grayscale value.

In particular, the control unit drives the two modulators by means of pulse-width-modulated control data. Very accurate driving is thus possible. In particular, the driving of the two modulators can be well synchronized.

The control unit can determine as the at least one second pixel such a second pixel whose brightness value predefined by the image data is greater than zero and less than or equal to the first threshold value.

Furthermore, the control unit can determine the at least one second pixel that modulates the residual light by means of the following steps:

I) at least one second pixel is selected whose brightness value predefined by the image data and the predefined brightness change is greater than zero and less than or equal to the first threshold value, and II) a selected second pixel is determined as a residual-light-modulating second pixel if (preferably only if) all k neighboring pixels (preferably in one direction, that is to say first direct neighboring pixel, second neighboring pixel, which is the direct neighbor with respect to the first direct neighboring pixel, etc.) are selected in step a). In this case, k is a natural number greater than or equal to 1.

The control unit can determine the at least one second pixel that modulates the residual light by means of the following steps:

I) at least one second pixel is selected whose brightness value predefined by the image data and the predefined brightness change is greater than zero and less than or equal to the first threshold value, and II) a selected second pixel is determined as a residual-light-modulating second pixel if (preferably only if) all assigned first pixels, on account of the image data and the predefined brightness change, are driven in each case in accordance with a brightness value that is less than a predetermined second threshold value, wherein the second threshold value is chosen such that the time segment(s) when the assigned first pixels are to be switched into the first state does or do not overlap the time segment(s) when the residual-light-modulating second pixel is to be switched into the first state, in order to modulate the residual light.

A temporal separation of the illumination of boosted pixels and non-boosted pixels is thus achieved, which, at the boundary between a boosted pixel and a non-boosted pixel, can advantageously be used to ensure that the boosted pixel lying at the edge is definitely not illuminated (with none of the first pixels assigned thereto) and the non-boosted pixel lying at the edge is illuminated sufficiently, even though at least one illumination pixel of the non-boosted pixel also illuminates the boosted pixel (but only at times when the boosted pixel is switched into the second state).

Step II) can preferably be carried out only for boostable second pixels (=pixels selected in step I)) whose k-th neighboring pixel (in each case preferably in one direction, that is to say first, direct neighboring pixel, second neighboring pixel, which is the direct neighbor with respect to the first direct neighboring pixel, etc.) is not boostable (in accordance with step I)). The first neighboring pixels can surround the boostable second pixel under consideration in a ring-shaped manner. The second neighboring pixels can surround both the boostable second pixel under consideration and the first neighboring pixels in a ring-shape manner. This applies in the same way to third, fourth and further neighboring pixels. In this case, k is a natural number greater than or equal to 1. If all 1 to k neighboring pixels of a boostable second pixel are boostable, the second pixel can be boosted (=selected second pixel). With the choice of k, in particular the second pixel the furthest away from the boostable second pixel can be defined, upon the active illumination of which there is incident on the boostable second pixel still light (in particular to such an extent or with such a proportion) that would be disturbing during the residual light modulation by the boostable second pixel. If each second pixel is assigned a first main illumination pixel and n neighboring pixels with respect thereto (in one direction), wherein n is a natural number greater than or equal to 1, k is preferably set to be equal to n.

For the driving of the first pixels, on account of the image data, it is possible to chose the brightness value that is the highest of all second pixels to which the first pixel is assigned.

With the projector, the images can preferably be projected in each case for a predetermined frame duration. In particular, the first pixel(s) assigned to the at least one second pixel can be switched into the second state during the entire frame duration.

In the projector, exactly one first pixel can be assigned to each second pixel. However, it is also possible for a first pixel and also at least one further first pixel directly adjacent to said first pixel to be assigned to each second pixel. Furthermore, a first pixel and also at least the further first pixels directly adjacent to said first pixel can be assigned to each second pixel. Not only the directly adjacent further first pixels but also the respective further neighbors can be assigned. It can also be stated that a first pixel and also further first pixels separated from said first pixel by not more than n pixels are assigned to each second pixel. n is a natural number greater than or equal to 1. The assigned first pixels are distinguished in particular by the fact that the light coming from them is imaged at least partly onto the second pixel to which the first pixel is assigned, by means of the imaging optical unit.

Furthermore, the control unit in the projector, for second pixels which, in accordance with the image data and the predefined brightness change, are intended to represent a brightness value that is greater than the first threshold value, can take account of the residual brightness in such a way that the second pixel is driven on the basis of a reduced brightness value, which is lower than the brightness value, and the predefined brightness change in accordance with the image data. In this case, however, during the generation of the image, the second pixels are preferably switched into the first state at least at times simultaneously with at least one assigned first pixel. Consequently, the residual brightness can concomitantly be taken into account, which is concomitantly modulated by means of the second pixel, with the result that more accurate grayscale values are representable.

This is advantageous in particular for brightness values which, although greater than the first threshold value, are less than or equal to 20% or 30% of the maximum brightness value.

The modulators are preferably reflective modulators. In particular, the modulators are embodied as tilting mirror matrices.

In so far as grayscale values and brightness values are mentioned here, in the case of a monochromatic representation this should be understood as grayscale value of the monochromatic color. In the case of multicolored representations, the grayscale values should be understood as brightness values of the corresponding colors represented.

The projector can be configured in particular for a multicolored image representation. To that end, a multicolored illumination can be provided, for example, which directs temporally successively different primary colors onto the first modulator. The primary colors can be the colors red, green and blue. The temporal change of the primary colors is carried out so rapidly that the temporally successively generated color partial images (e.g. in the colors red, green and blue) are not distinguishable for an observer and the observer thus perceives only one multicolored image. For generating the temporally successive colors, a so-called color wheel can be arranged between the light source (which emits e.g. white light) of the projector and the first modulator, said color wheel introducing different color filters successively into the beam path between the light source and the first modulator. However, any other type of time-sequential color generation is also possible.

Furthermore, a multicolored illumination of the first modulator is also possible, if three second modulators are provided, for example, which are then illuminated with the individual colors (e.g. red, green and blue). By way of example, color splitting cubes can be used for this purpose. The three second modulators then generate the color partial images, which are projected onto the projection surface in a manner being superimposed by means of the projection optical unit, in order to generate the desired multicolored image. Of course, more or fewer than three second modulators can also be provided.

Furthermore, the control unit drives the modulators such that for at least one second pixel which, in accordance with the image data and the predefined brightness change, is intended to represent a brightness value that is greater than zero and also less than or equal to a predetermined first threshold value, the at least one second pixel is switched into the second state and the assigned first pixel(s) is or are switched into the first state only during the time segment(s) in which the second pixel is switched into the second state, with the result that residual light modulated by the at least one second pixel then emanates and contributes to the image generation.

In this projector, too, the unavoidable residual light is modulated in order to represent low grayscale values. However, the modulation of the residual light is effected by way of the first modulator. The second modulator is only used to provide the unavoidable residual light, which is then modulated, for image projection. Thus, once again the unavoidable residual light is used in a positive manner for the representation of low brightness values.

In the projector, the control unit, for generating the modulated residual light, can drive the assigned first pixel(s) on the basis of an increased brightness value, which is greater than a notional comparison value having the first resolution that arises if the predefined brightness change is applied to the brightness value in accordance with the image data. The assigned first pixel(s) is/are thus boosted. This projector according to the invention in which the assigned first pixel(s) is/are boosted can be developed in a manner identical or similar to how the initially described projector according to the invention is developed.

Of course, both described projectors can also be combined such that temporally successively second pixels and first pixels are boosted in the manner described.

Furthermore, a projector for projecting images is provided in which the control unit, for second pixels, takes account of the residual brightness in such a way that the second pixel is driven on the basis of a reduced brightness value that is lower than the brightness value in accordance with the image data. In particular, the second pixels that are driven with the reduced brightness value are switched into the first state at least at times simultaneously with at least one assigned first pixel. Modulation is thus effected principally during active illumination of the second pixel. In addition, however, the modulation of the unavoidable residual light is taken into account for the desired brightness, which results in more accurate brightness values. This is advantageous in particular for low brightness values that are e.g. less than or equal to 30% of the maximum brightness value, or less than or equal to 20% of the maximum brightness value.

The imaging optical unit can be embodied in particular as a 1:1 imaging optical unit. However, it can also be embodied as a magnifying or reducing imaging optical unit. Preferably, a 1:1 assignment between first and second pixels is provided by the imaging optical unit. On account of the actual realization of the modulators and/or the imaging optical unit, during the active illumination, light from adjacent first pixels can also be imaged onto the second pixel assigned in accordance with the 1:1 assignment.

It is also possible, however, e.g. by means of the dimensions of the modulators used and/or the arrangement thereof, to ensure that the light from a plurality of first pixels is always imaged onto a second pixel.

Furthermore, provision is made of a projector for projecting an image, comprising a first modulator, which has a plurality of first pixels capable of being impinged on by light from a light source, a second modulator, which is disposed downstream of the first modulator and has a plurality of second pixels, and an imaging optical unit, which images the first modulator onto the second modulator, wherein the first and second pixels are switchable independently of one another in each case into a first state, in which light incident on them is used for image generation, and into a second state, in which light incident on them does not serve for image generation, in order pixel-individually to modulate the light for generating the image, wherein the projector furthermore has a projection optical unit, which images light coming from the second modulator onto a projection surface in order to project the image, as a result of which each first pixel is assigned to an image point of the projected image, and a control unit, which drives the two modulators on the basis of supplied image data, wherein the control unit drives the modulators for the range of the minimum possible to the maximum possible brightness of the image data with a first resolution of NN levels, wherein NN is an integer greater than one, wherein each first pixel is assigned at least one second pixel in such a way that the imaging optical unit, a) if the first pixel is switched into the first state, causes the at least one second pixel to be impinged on by light from the first pixel, in order actively to illuminate the second pixel, and b) if the first pixel is switched into the second state, causes the at least one second pixel not to be impinged on by light from the first pixel, in order not actively to illuminate the second pixel, with the result that only unavoidable residual light is incident on the second pixel,
wherein the control unit drives the modulators such that for at least one first pixel which is assigned to an image point which, on the basis of the image data, is intended to have a brightness value which is greater than zero, c) the at least one first pixel is switched into the second state and the assigned second pixel(s) is or are switched into the first state only during the time segment(s) in which the at least one first pixel is switched into the second state, with the result that no active illumination is effected and the assigned second pixel(s) modulate(s) the residual light, wherein the control unit drives the residual-light-modulating second pixel(s) on the basis of an increased brightness value,
or
d) the assigned second pixel(s) is or are switched into the second state for brightness modulation at least at the time segments in which the at least one first pixel is switched into the first state, with the result that residual light modulated by the assigned second pixel(s) then emanates and contributes to the image generation, wherein the control unit drives the at least one first pixel on the basis of an increased brightness value,
wherein the control unit
A) applies a predefined brightness change to the brightness value in accordance with the image data for the image point such that a changed brightness value having a second resolution, which is greater than the first resolution, is calculated, and
B) converts the changed brightness value into the increased brightness value such that it has the first resolution and is greater than a notional comparison value having the first resolution that arises if the predefined brightness change is applied to the brightness value in accordance with the image data, with the result that the control unit drives one of the modulators in step c) or d) with the increased brightness value having the first resolution.

The projector can comprise the light source as part of the projector. Furthermore, the projector can comprise further means which are known to the person skilled in the art and which are necessary for operation of the projector.

A projection system is provided, in which at least two projectors according to the invention are operated such that their projected images partly overlap in order to generate a larger overall image. Such a projection system can be used for example for a dome projection (e.g. in planetaria) or for flight simulators or other simulators (for e.g. automobile, truck, motorcycle, etc.).

A method for projecting an image by means of the projector is provided. In particular, a method for projecting an image by means of a projector with double modulation is provided, in which in a step A) a predefined brightness change is applied to the brightness value in accordance with the image data for the image point such that a changed brightness value having a second resolution, which is greater than the first resolution, is calculated, and
in a step B) the changed brightness value is converted into the increased brightness value such that it has the first resolution and is greater than a nominal comparison value having the first resolution that arises if the predefined brightness change is applied to the brightness value in accordance with the image data, with the result that one of the modulators of the projector (preferably in step c) or d)) is driven with the increased brightness value having the first resolution.

Furthermore, a method for projecting images is provided in which a projector is operated such that the control unit drives the modulators such that for at least one second pixel assigned to an image point which, in accordance with the image data, is intended to represent a brightness value that is greater than zero and less than or equal to a predetermined first threshold value (or a boost threshold value), the assigned first pixel(s) is or are switched into the second state at least at the time segments in which the second pixel is switched into the first state, with the result that no active illumination is effected and the second pixel modulates the residual light.

Preferably, the at least one second pixel modulates only the residual light for generating the image or during a frame duration of the image to be generated.

Furthermore, a method for projecting an image by means of a projector is provided in which the control unit drives the modulators such that for at least one second pixel assigned to an image point which, in accordance with the image data, is intended to represent a brightness value that is greater than zero and less than or equal to a predetermined first threshold value (or a boost threshold value), the at least one second pixel is switched into the second state and the assigned first pixel(s) is or are switched into the first state only during the time segment(s) in which the second pixel is switched into the second state, with the result that residual light modulated by the at least one second pixel then emanates and contributes to the image generation.

Furthermore, a method for projecting images is provided such that the control unit, for second pixels, takes account of the residual brightness in such a way that the second pixel is driven on the basis of a reduced brightness value, which is lower than the comparison value.

Preferably, the second pixel driven with a reduced brightness value is switched into the first state at least at times simultaneously with at least one assigned first pixel. Consequently, the second pixel is actively illuminated and modulates the illumination light, the unavoidable residual light simultaneously being taken into account.

The methods according to the invention can be developed in a manner corresponding to how the devices or projectors according to the invention are developed.

It goes without saying that the features mentioned above and those yet to be explained below can be used not only in the combinations specified but also in other combinations or on their own, without departing from the scope of the present invention.

The invention will be explained in more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times.

BRIEF DESCRIPTION OF THE DRAWINGS

FIG. 11 shows an illustration for elucidating the assignment of a plurality of first pixels of the first modulator to a second pixel of the second modulator.

FIG. 12 shows a schematic illustration for elucidating the determination of whether or not a second pixel is boostable.

FIG. 13 shows a schematic illustration for elucidating the ascertainment of the pattern data M on the basis of the given image data.

FIG. 23 shows a table having brightness and mask values for a known projector comprising two modulators.

FIG. 25 shows a table having brightness and mask values for a projector according to certain embodiments of the invention comprising two modulators.

FIG. 49 shows calculated grayscale values for the projector according to certain embodiments of the invention for white.

FIG. 50 shows calculated grayscale values for the projector for red.

Figure 1:
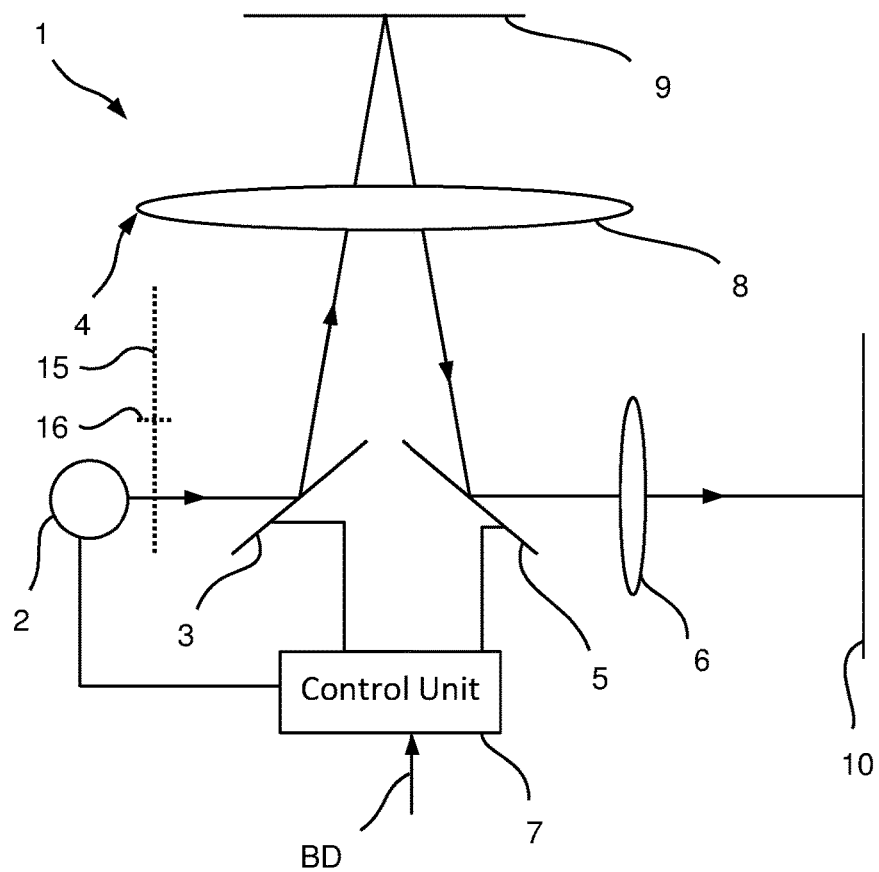
FIG. 1 shows a schematic illustration of one embodiment of the projector according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention is explained in yet more detail below with the aid of embodiment examples with reference to the attached drawings, which also disclose features essential to the invention. These embodiment examples merely serve the purpose of illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components.

Elements or components of different embodiment examples can be combined with each other, unless otherwise indicated. Modifications and alterations which are described for one of the embodiment examples can also be applicable to other embodiment examples. To avoid repetitions, the same or corresponding elements are given the same reference numbers in different figures and are not explained repeatedly.

In the embodiment shown in FIG. 1, the projector 1 according to the invention for projecting images for a predetermined frame duration in each case comprises a light source 2, an illumination modulator 3, an imaging optical unit 4, an image modulator 5, a projection optical unit 6 and also a control unit 7.

The two modulators 3, 5 are each embodied as a tilting mirror matrix (also called DMD hereinafter) having a plurality of tilting mirrors arranged in rows and columns, wherein the tilting mirrors can be brought to a first and a second tilting position independently of one another.

Figure 2:
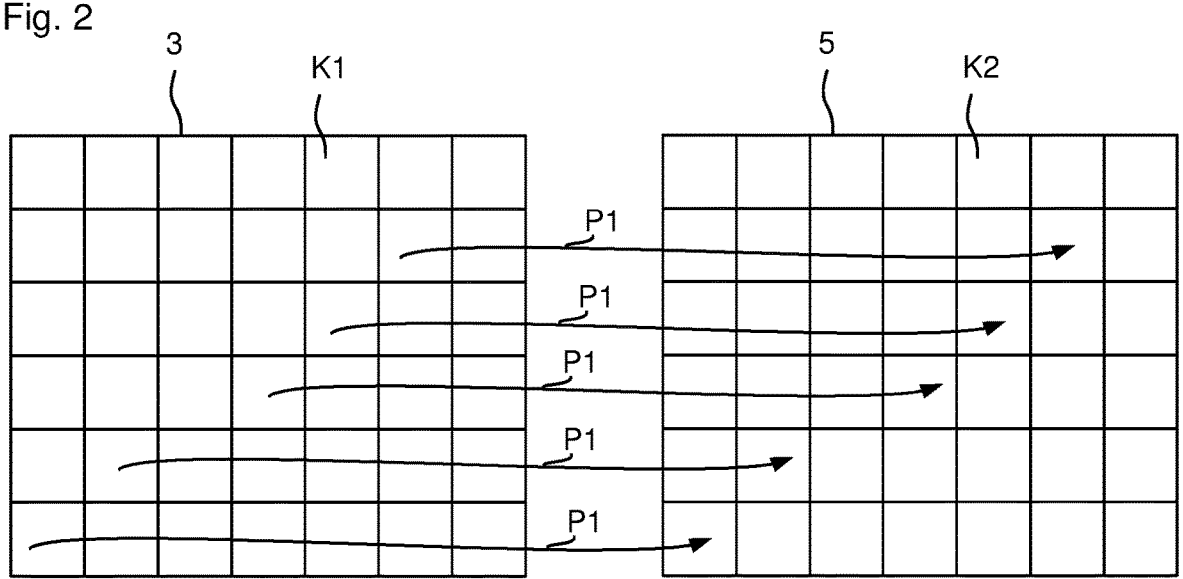
FIG. 2 shows a schematic illustration for elucidating the assignment between the first pixels of the first modulator and the second pixels of the second modulator.

In the exemplary embodiment described, the illumination modulator 3 has a plurality of tilting mirrors K1 (also called illumination pixels hereinafter) and the image modulator 5 has a plurality of tilting mirrors K2 (also called image pixels hereinafter). FIG. 2 illustrates schematically in each case 6×7 tilting mirrors K1, K2. The tilting mirrors K1 and K2 each have identical dimensions, the small number of tilting mirrors K1 and K2 being assumed merely to simplify the illustration. The modulators 3, 5 can, of course, contain very many more tilting mirrors K1, K2 than illustrated.

The imaging optical unit 4 is embodied as a 1:1 imaging optical unit comprising a lens 8 and a mirror 9 and images each tilting mirror K1 of the illumination modulator 3 exactly onto one tilting mirror K2 of the image modulator 5, as is indicated by the arrows P1. Consequently, exactly one image pixel K2 of the image modulator 5 is assigned to each illumination pixel K2 of the illumination modulator 3 on account of the imaging by means of the imaging optical unit 4. It can also be stated that exactly one illumination pixel K1 is assigned to each image pixel K2.

The two modulators 3 and 5 are driven by the control unit 7 on the basis of supplied image data BD for each of the images to be projected successively such that the illumination modulator 3, on which the light (e.g. white light) from the light source 2 impinges, is a light source modulated in a planar fashion for the image modulator 5, which generates or modulates the image to be projected, which is then projected onto a projection surface 10 by means of the projection optical unit 6. In order to provide the light source modulated in a planar fashion, the projector 1 is configured such that the light reflected by the tilting mirrors K1 of the illumination modulator 3 that are in the first tilting position is imaged onto the assigned tilting mirror K2 of the image modulator 5. The light reflected by the tilting mirrors K1 of the illumination modulator 3 that are in the second tilting position is absorbed by a beam trap (not shown) and is thus not imaged onto the image modulator 5. The image generation or modulation is then effected by means of the tilting position of the image pixels (=tilting mirrors K2 of the image modulator 5) since only the light reflected by the image pixels K2 that are in the first tilting position is projected onto the projection surface 10 by way of the projection optical unit 6. The light reflected by the image pixels K2 that are in the second tilting position is not projected onto the projection surface 10, but rather absorbed e.g. in a beam trap (not shown). The image to be projected is thus modulated or generated by way of the tilting position of the image pixels K2, said image being projected by means of the projection optical unit 6.

Figure 3:
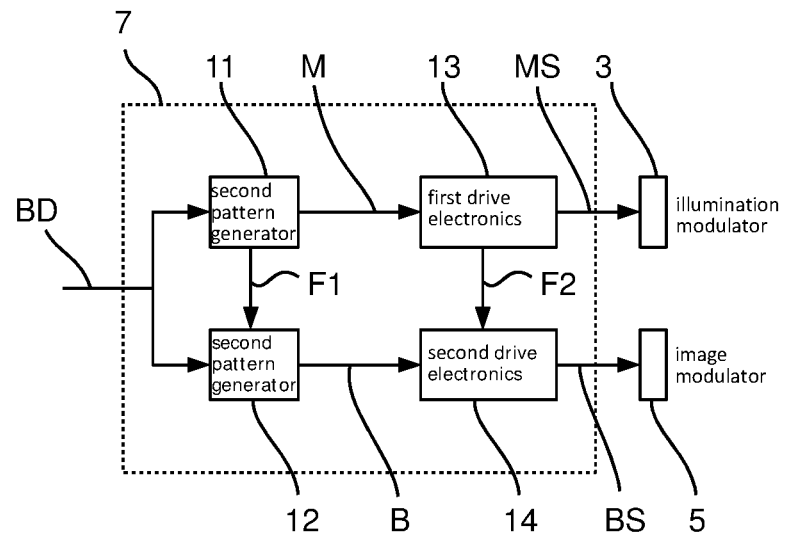
FIG. 3 shows a schematic illustration of the control unit from FIG. 1 for elucidating the generation of pulse-width-modulated pattern and image control data.

The image data BD are present already in digital form with the suitable pixel resolution for the image modulator 5 and are applied simultaneously to a first and a second pattern generator 11 and 12 in the control unit 7, as is shown schematically in FIG. 3. The first pattern generator 11 generates pattern data M on the basis of the supplied image data BD, said pattern data being applied to first drive electronics 13. The first drive electronics 13 generate, on the basis of the pattern data M, pulse-width-modulated illumination control data MS and apply the latter to the illumination modulator 3.

The second pattern generator 12 generates frame data B on the basis of the supplied image data BD, said frame data being applied to second drive electronics 14 for the image modulator 5. The second drive electronics 14 generate pulse-width-modulated image control data BS and apply them to the image modulator 5.

In accordance with the illumination and image control data MS, BS, during the frame duration T for generating the image, the illumination and image pixels K1, K2 are brought to the first and second tilting positions such that the desired image is generated and projected.

As a result of the two modulators 3, 5 being connected in series and as a result of the generation of the illumination and image control data MS, BS as described below, an improvement during the representation of low grayscale levels and low brightness values is achieved during operation of the projector 1.

Figure 4:
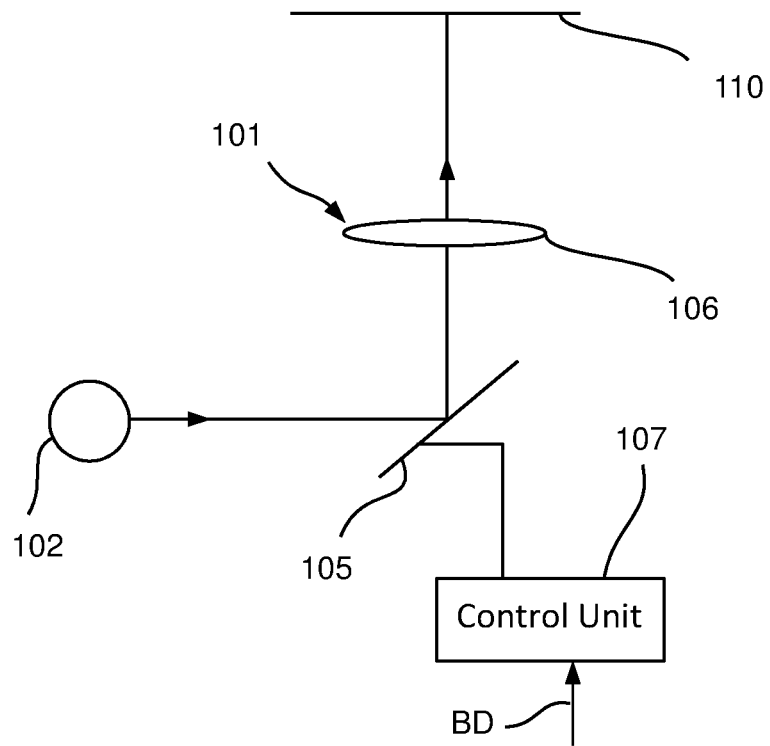
FIG. 4 shows a schematic illustration of a known projector with single modulation.

Projector 101 with Single Modulation in Accordance with FIG. 4

To afford a better understanding of the projector 1 according to the invention, a description is given below of a projector 101 with single modulation, comprising only one modulator 105, used as image modulator (FIG. 4). This projector 101 with single modulation comprises a light source 102 and a projection optical unit 106, wherein the modulator 105, which can be embodied as a tilting mirror matrix, is illuminated with light from the light source 102. The modulator 105 modulates the light by means of the mutually independently drivable tilting mirrors of the modulator 105 in order to generate an image that is projected onto a projection surface 110 by means of the projection optical unit 106. The modulation is controlled by a control unit 107 on the basis of supplied image data BD. In the case of such a conventional projector 101, the contrast (maximum brightness in relation to minimum brightness) is generally between 500:1 and 2000:1. That means that as a result of a reduction of an input grayscale value, the projected brightness does not tend toward zero, but rather approaches a finite value that is reached for an input grayscale value of 0 and arises from the contrast of the projector 101. It is assumed for the following discussion that the brightness values are represented in an 8-bit system with integers from 0 to 255, wherein 0 represents the minimum brightness (black) and 255 represents the maximum brightness.

Figure 5:
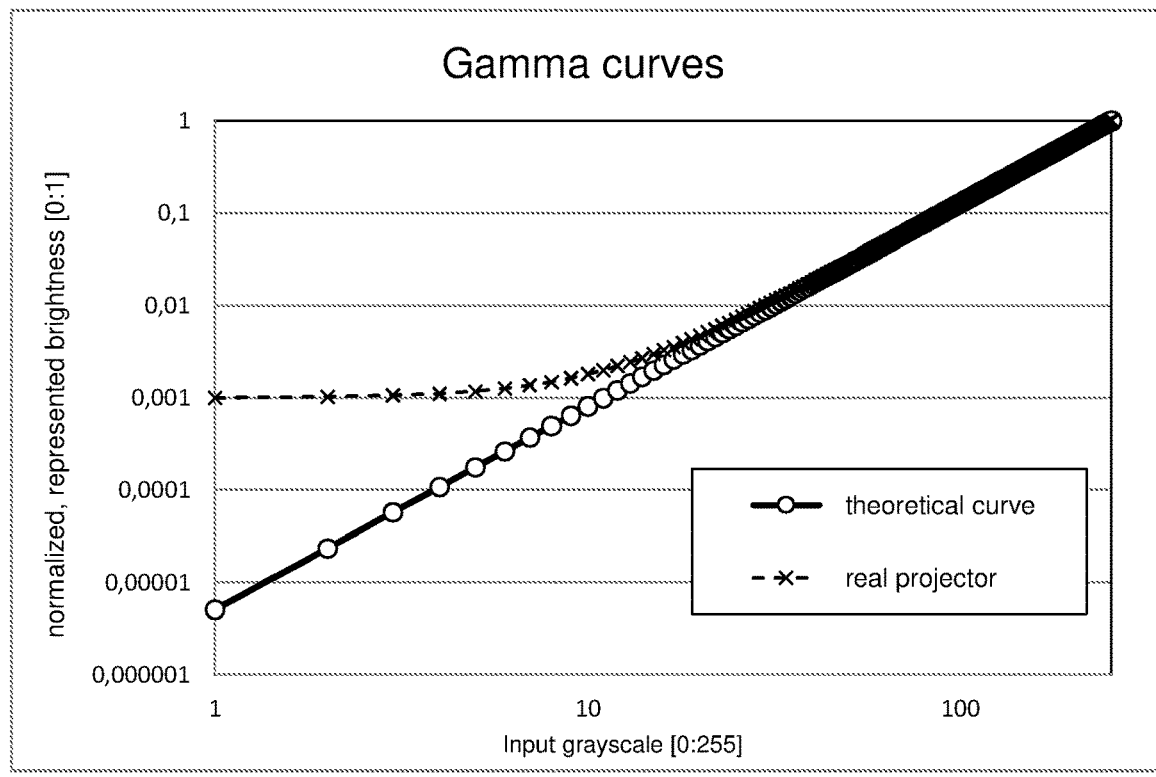
FIG. 5 shows a schematic illustration for comparing the theoretical γ-curve with the real γ-curve of the projector in accordance with FIG. 4.

This is illustrated schematically in FIG. 5, the theoretical γ-curve (here where γ=2.2) being represented as a solid line, with the real curve for the projector 101 having a contrast of 1000:1 being represented as a dashed line. The input grayscale levels are represented along the x-axis and the normalized brightness in the range of 1E-6 to 1 is represented along the y-axis.

Mathematically, the brightness profile $I_{prior\ art}$ results from the fact that the finite contrast K in relation to a background brightness of U=1/K leads to the following equation for $I_{prior\ art}(g)$.

$$I_{prior\ art}(g) = U + (1-U) \cdot \left(\frac{g}{255}\right)^{\gamma}$$

In this case, g is the input grayscale level and γ is the so-called γ value for the description of the brightness profile. Moreover, the maximum brightness (for g=255) is normalized to 1. The theoretical brightness profile is defined as follows.

$$I_{Theoretical}(g) := \left(\frac{g}{255}\right)^{\gamma}$$

This unavoidable background brightness U has the effect that for dark image contents the lowest input grayscale levels are no longer distinguishable in the image since they no longer stand out against the background brightness. In this regard, in the case of the example in accordance with FIG. 5, the grayscale level g=4 is just about 10% brighter than the background at grayscale level g=0. The actually usable range of grayscale levels decreases as a result.

Figure 6:
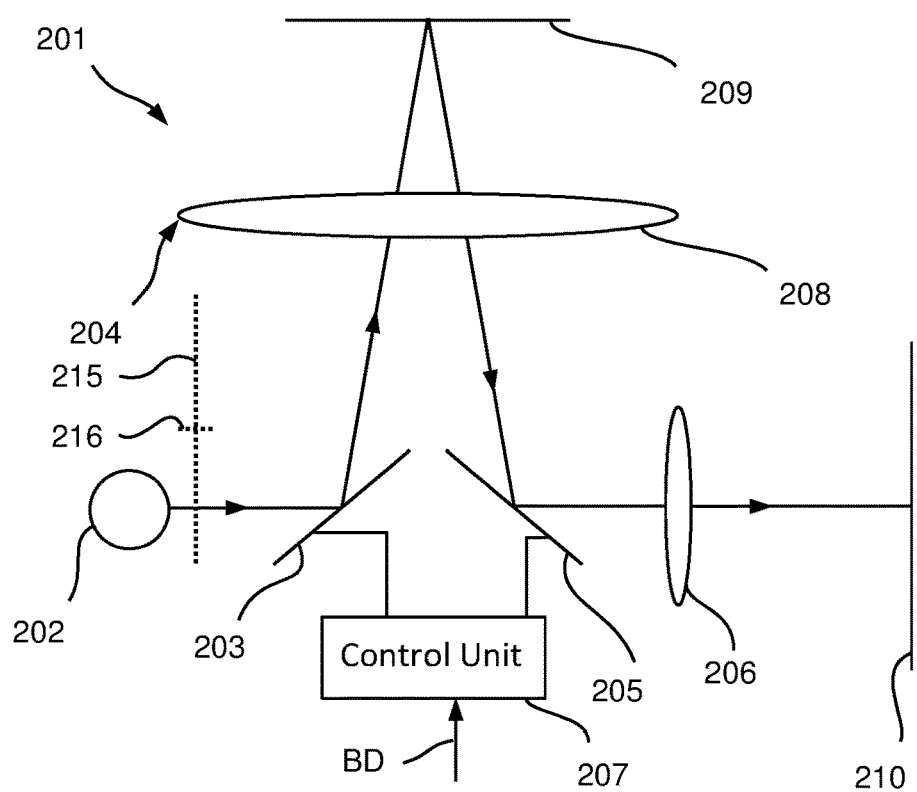
FIG. 6 shows an illustration of a known projector with double modulation.

Projector 201 with Double Modulation in Accordance with FIG. 6

With the use of two modulators 203 and 205 connected in series, as is the case for the projector 201 with double modulation in FIG. 6, not only is there an increase in contrast to beyond 1 000 000:1. Moreover, the dark grayscale levels also have a lower background brightness (since they are illuminated with less intensity).

The projector 201 is constructed fundamentally in the same way as the projector 1 in FIG. 1. Therefore, identical or similar elements are designated by reference signs that are greater than the corresponding reference signs in FIG. 1 by 200. Only the differences are described below, these essentially concerning the control unit 207 and the driving of the modulators 203 and 205. The intensity profile indicated below results for the projector 201 in accordance with FIG. 6:

$$I_{2xDMD}(g_1, g_2) = \frac{1}{T}\int_0^T (I_1(g_1, t) \cdot I_2(g_2, t))dt =$$
$$\frac{1}{T}\int_0^T \{U + (1-U) \cdot i_1(g_1, t)\} \cdot \{U + (1-U) \cdot i_2(g_2, t)\}dt$$

In this case, T=1/f (frame duration T) is the time required for the representation of a frame at a frame rate f. The functions $i_1(g_1, t)$ and $i_2(g_2, t)$ describe, as a function of an input grayscale value $g_1$ and $g_2$, respectively, at what times t a tilting mirror of the modulators 203, 205 forwards light (i.e. the function has the value 1) and does not forward light (i.e. the function has the value 0). The functions $i_1$ and $i_2$ thus assume only the values 0 and 1 with respect to time. It is evident from this that there is a time $T_1 \leq T$ for which both modulators 203, 205 are set to black. Furthermore, there is a time $T_2 \leq T$ for which exactly one of the two modulators 203, 205 is set to black (function value of $i_1$ or $i_2$ is 0), while the other modulator is at white ($i_1$ or $i_2$ is 1). Finally, there is a time $T_3 \leq T$ for which both modulators 203, 205 are at white ($i_1$ and $i_2$ is 1). It holds true that $T_1+T_2+T_3=T$. It follows from these considerations that:

$$I_{2xDMD}(g_1, g_2) = \frac{1}{T}\left\{\int_{T_1} U^2 dt + \int_{T_2} U dt + \int_{T_3} 1 dt\right\} =$$
$$\frac{1}{T}\{T_1(g_1, g_2) \cdot U^2 + T_2(g_1, g_2) \cdot U + T_3(g_1, g_2)\}$$

In this case, the times $T_1$, $T_2$ and $T_3$ are functions of the input grayscale values $g_1$ and $g_2$.

Figure 7:
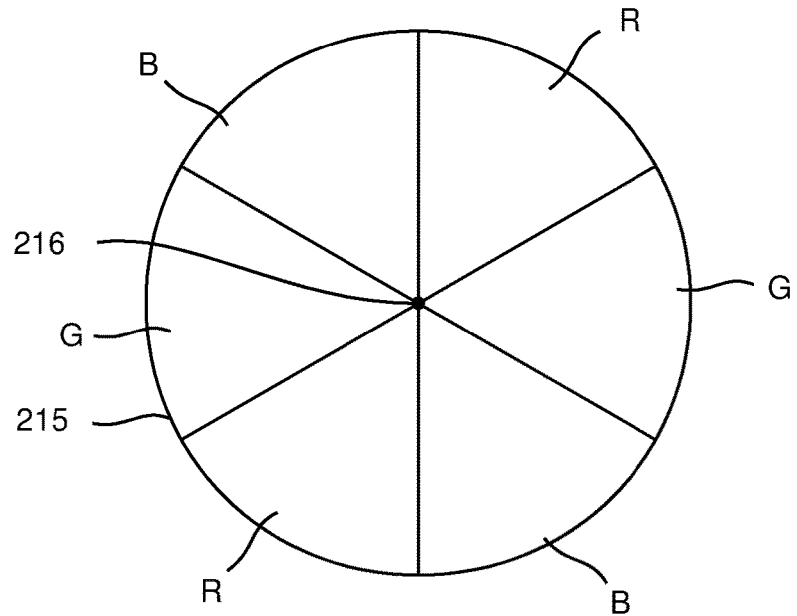
FIG. 7 shows a schematic illustration of the color wheel.

The resulting projected brightnesses of such a projector 201 will be elucidated on the basis of an example below. If colored image generation is desired, a color wheel 215 can be arranged in the beam path between the light source 202 and the first modulator 203, as is illustrated by dashed lines in FIG. 6. The colors are then generated time-sequentially by way of the color wheel 215, which is illustrated schematically with its rotation axis 216. FIG. 7 shows a plan view of the color wheel 215 having six equally sized color segments (which thus extend over an angular range of 60°). The color segments are designated by the upper case letters R, G and B. This is intended to clarify that the corresponding color segment transmits only the red color (at R), the green color (at G) and the blue color (at B), with the result that from the white light from the light source 202 time-sequentially red, green or blue light is incident on the illumination modulator 203. Consequently, red, green and blue partial images can be projected temporally successively by means of the two modulators 203, 205. Said partial images are generated successively in time so rapidly that only the superimposition and hence a color image is perceptible to an observer. This can be achieved, given an image rate or frame rate of f=60 Hz, for example, by the color wheel 215 rotating at a frequency of 120 Hz. As a result, there are four red passes, four green passes and four blue passes within one frame. For each color transition, 15° is subtracted, the so-called spoke. During this time duration, the illumination modulator 203 is switched to be dark in order to prevent an undefined color projection since a color segment boundary of the color wheel 215 is actually crossing the illumination light. Four time segments with a color wheel segment size of 45° thus remain for a color modulation per color (red, green and blue). Given a frame rate of 60 Hz, this corresponds to a time of $$T_{RGB} := T_R = T_G = T_B = \frac{4*45°}{720°} * \frac{1}{60 \text{ Hz}} = 4167 \text{ } \mu s$$

The minimum time for which a tilting mirror K1, K2 can forward or not forward light (LSB, Least Significant Bit) is assumed as follows:

$$t_{LSB} = 2*25 \text{ } \mu s$$

The factor 2 results from the fact that in two of the four color cycles of a frame a time slice of 25 μs is used for representing the LSB. If this time is related to the total duration of a color ($T_{RGB}$), a brightness of 0.012 results, which corresponds to a grayscale level of approximately 34 (given γ=2.2).

By means of spatial and temporal dithering, this value can be reduced further by a factor of $n_{Dither}$. For the limit value below which all grayscale levels must be "dithered", from $$I_{Theoretical}(g) := \left(\frac{g}{255}\right)^\gamma$$

the following grayscale value $g_{Dither}$ results:

$$g_{Dither} = 255 * \left(\frac{t_{LSB}}{T_{RGB}}\right)^{1/\gamma}$$

The dithering method makes it possible to produce brightnesses in discrete gradations for the lowest grayscale levels (up to grayscale level 34 in the example). The minimum effective on time for a tilting mirror (averaged over 256 frames) is then $$t_{min} = t_{LSB}/n_{Dither} = 2*25 \text{ } \mu s/256 \approx 2 \text{ } \mu s$$

For this example here a dither resolution of 8 bits was chosen, which yields $n_{Dither}=256$. In order to represent a defined grayscale level $g \leq g_{Dither}$, n times the minimum on time $t_{min}$ is required, this being calculated as follows.

$$n(g) = \left[\left[\left(\frac{g}{255}\right)^\gamma \cdot \frac{T_{RGB}}{t_{LSB}}\right]\right]$$

Here the operator [[ . . . ]] rounds to the nearest natural number (including 0). In this example, the smallest representable brightness value thus corresponds to $t_{min}/T_{RGB}=4.69 \cdot 10^{-5}$. Table 1 below shows, in the column Brightness theoretical, that this corresponds approximately to grayscale level 3 of a theoretical system with single modulation (as in the case of the projector 101 with single modulation). The column Brightness "prior art" concerns the projector 101 with single modulation, and the column Brightness with 2xDMD corresponds to the projector 201 with double modulation.

TABLE 1

| Grayscale level input [0:255] | Brightness theoretical [0:1] | Brightness "prior art" [0:1] | Brightness with 2xDMD [0:1] |
| --- | --- | --- | --- |
| 0 | 0 | 1.00E−03 | 1.00E−06 |
| 1 | 5.08E−06 | 1.01E−03 | 1.00E−06 |
| 2 | 2.33E−05 | 1.02E−03 | 1.00E−06 |
| 3 | 5.69E−05 | 1.06E−03 | 1.20E−04 |
| 4 | 1.07E−04 | 1.11E−03 | 1.67E−04 |
| 5 | 1.75E−04 | 1.17E−03 | 2.60E−04 |
| 6 | 2.62E−04 | 1.26E−03 | 3.54E−04 |
| 7 | 3.67E−04 | 1.37E−03 | 4.48E−04 |
| 8 | 4.93E−04 | 1.49E−03 | 5.88E−04 |
| 9 | 6.38E−04 | 1.64E−03 | 7.29E−04 |
| 10 | 8.05E−04 | 1.80E−03 | 8.69E−04 |
| 11 | 9.92E−04 | 1.99E−03 | 1.06E−03 |
| 12 | 1.20E−03 | 2.20E−03 | 1.29E−03 |
| 13 | 1.43E−03 | 2.43E−03 | 1.52E−03 |
| 14 | 1.69E−03 | 2.69E−03 | 1.76E−03 |
| 15 | 1.96E−03 | 2.96E−03 | 2.04E−03 |
| 16 | 2.26E−03 | 3.26E−03 | 2.32E−03 |
| 17 | 2.59E−03 | 3.58E−03 | 2.65E−03 |
| 18 | 2.93E−03 | 3.93E−03 | 3.02E−03 |
| 19 | 3.30E−03 | 4.30E−03 | 3.35E−03 |
| 20 | 3.70E−03 | 4.69E−03 | 3.77E−03 |

With the projector 201 with double modulation it is thus not possible to represent the grayscale level 0, 1 and 2.

If the image on the image modulator 205 is addressed according to the phased reset method (in which the pixels are switched successively block by block, as is described in detail e.g. in the article "10.4: Phased Reset Timing for Improved Digital Micromirror Device (DMD) Brightness"; D. Doherty, G. Hewlett; SID Symposium Digest of Technical Papers, 29: 125-128. doi: 10.1889/1.1833710) and each of the 16 reset zones is shifted in time relative to the previous reset zone by $t_{Reset}=8$ μs, in the time $$\frac{T_{LSB}}{2} = \frac{t_{LSB}}{2} + 15 * t_{Reset} = 145 \text{ } \mu s$$

the LSBs of all 16 reset zones are represented. The factor 1/2 results from the fact that in a frame the LSB is distributed between two time segments of the color wheel.

It is possible to use only this time for an illumination by the illumination modulator 203, which is addressed according to the global reset method (in which all pixels are switched simultaneously, as is described in detail e.g. in the same SID article as above). In this example, the illumination time for the LSB is chosen to be a little longer:

$$\tau_{LSB}=2*150 \text{ μs}=300 \text{ μs}$$

The factor 2 again results from the fact that the LSB is distributed between two of the four RGB color passes. With the use of a 4× color wheel 215 (four color passes in one frame), the LSB with which the lowest 34 grayscale levels can be modulated (by way of temporal dithering) is used in two of the four color passes. For a representation of grayscale values which require only the LSB for a representation (by way of spatial and temporal dithering up to, for example, grayscale level 34), starting from RGB=(3,3,3)—here it holds true that in the example n (g=3)=1, while there is rounding down for n (g≤3)=0—illumination light is guided onto the image modulator (three colors) via the illumination modulator $$\tau=3*300 \text{ μs}=900 \text{ μs}$$

for the time. That means that during 900 μs·60 Hz=5.4% of the time of one frame, the illumination modulator 203 forwards light to the image modulator 205. In order to calculate the projected brightnesses for input grayscale value $3 \leq g \leq g_{Dither}$, the times $T_1$, $T_2$ and $T_3$ have to be taken into consideration, resulting in the following:

$$T_1(g)=T_R+T_G+T_B-\tau=12500 \text{ μs}-\tau=1160 \text{ μs}$$

$$T_2(g)=\tau-3 \cdot n(g) \cdot t_{min}$$

$$T_3(g)=3 \cdot n(g) \cdot t_{min}$$

The factor 3 results from the three colors, red, green and blue. For g<3, it holds true that $T_1(g)=T_R+T_G+T_B$ and $T_2(g)=T_3(g)=0$. Thus, using the above formula for $I_{2DMD}(g_1, g_2)$, it is possible to calculate the brightness profile for the lowest grayscale levels in the case of the projection 201 with double modulation by way of titling mirror matrices. In addition to table 1, the results are illustrated in the subsequent FIGS. 8 and 9. For the dark grayscale levels, this solution yields a distinct improvement by comparison with the prior art with single modulation (image generation by means of a projector with single modulation).

Figure 8:
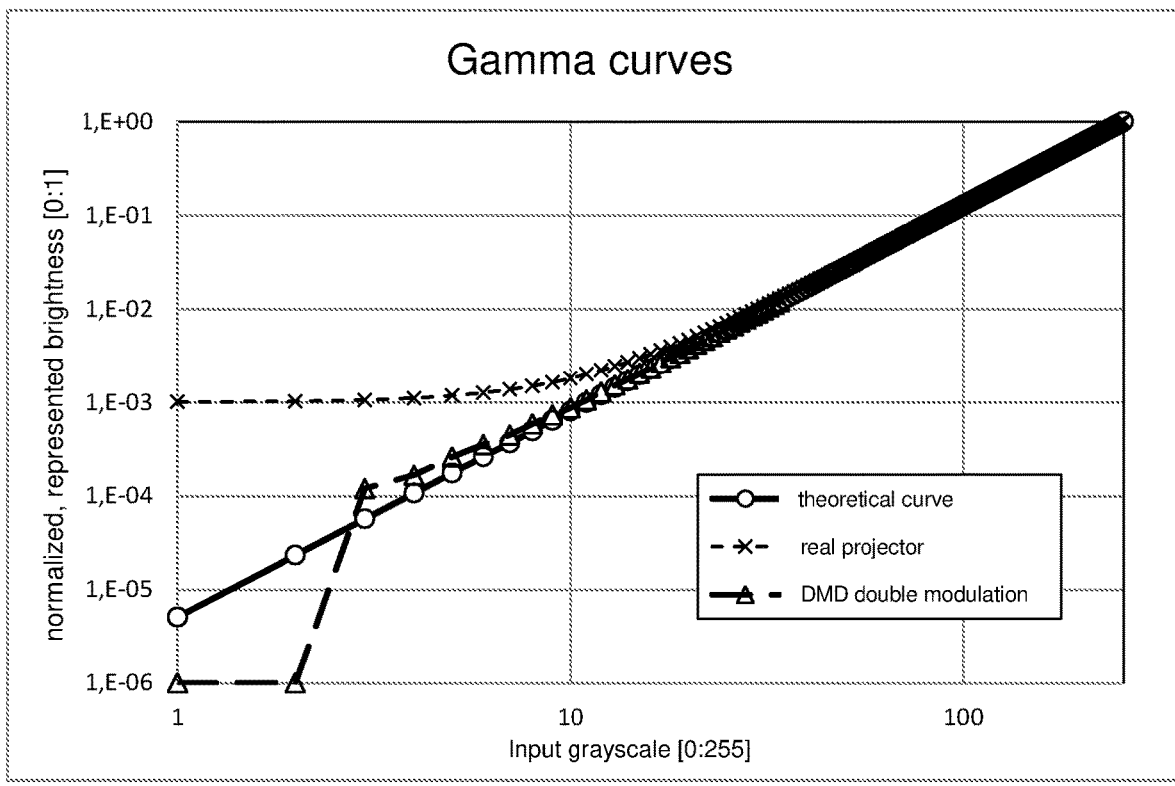
FIG. 8 shows an illustration in accordance with FIG. 5, the γ-curve of the projector with double modulation additionally being depicted as well.

FIG. 8 illustrates for comparison the theoretical γ-curve (in the example where γ=2.2) as a solid line, the real curve for the projector 101 with single modulation for a contrast K=1000:1 as a dashed line and the real curve for the projector 201 with double modulation as a long-dashed line. In this case, the input grayscale level in the range of 1 to 255 is plotted along the x-axis and the normalized brightness in the range of $1 \cdot 10^{-6}$ to 1 is plotted along the y-axis.

Figure 9:
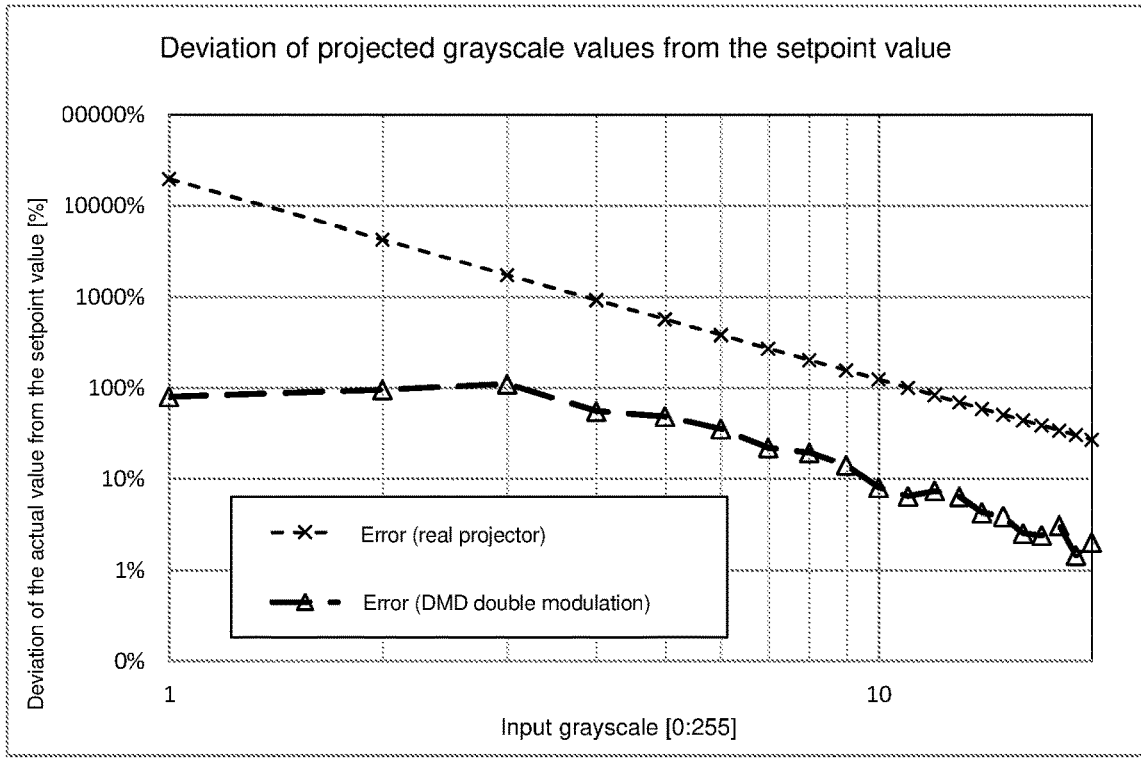
FIG. 9 shows an illustration of the deviation of projected grayscale values from the setpoint value for a projector with single modulation and a projector with double modulation.

FIG. 9 illustrates the percentage deviation of the projected grayscale value from the setpoint value for the lowest 20 grayscale levels as a dashed line for the projector 101 with single modulation and as a long-dashed line for the projector 201 with double modulation. In this case, the input grayscale level in the range of 0 to 20 is plotted along the x-axis and the deviation of the actual value from the setpoint value in percent is plotted along the y-axis (absolute value of the actual value minus the setpoint value divided by the setpoint value).

It is evident that with the projector 201 with double modulation, for low grayscale values, the deviation of the projected brightnesses from the setpoint brightnesses becomes smaller by more than one order of magnitude in comparison with the projector 101 with single modulation. However, even in the case of the projector 201 with double modulation, for grayscale levels of less than 10, the deviation from the setpoint value remains above a perception threshold for brightness deviations of 10%.

In the case of the projector 201 with double modulation, a further disadvantage consists in the fact that, as set out above, the lowest grayscale levels have to be generated by way of dithering (up to grayscale level 34 in the example). That means that the brightness in relation to such a grayscale value is distributed over a plurality of pixels and/or over a plurality of frames. If the observer is situated near the projection surface (or if the pixels adopt a certain angular magnitude), then shimmer becomes visible, which is found to be disturbing. Furthermore, it can happen that the lowest grayscale levels can no longer be represented even by way of dithering. In the case of the described projector 201 with double modulation, the grayscale levels 0, 1 and 2 are identically equal to the background and the brightnesses are modulated only starting from grayscale level 3.

Projector 1 According to the Invention

In the case of the projector 1 according to the invention, the driving of the modulators 3 and 5 is implemented such that there is no need to use dithering for low grayscale level values. The disturbing image impression caused by dithering can be significantly reduced. Furthermore, even the very lowest grayscale levels can moreover still be represented in a distinguishable manner.

This is achieved by virtue of the fact that for dark grayscale levels (grayscale levels whose values are less than or equal to a threshold value and of course greater than zero), the illumination and image control data MS, BS are generated in such a way that the illumination modulator 3 does not make any light available and the image modulator 5 nevertheless carries out a brightness modulation. The modulation by the image modulator 5 here takes account of the fact that illumination is effected only with the unavoidable residual light (background brightness U of the illumination modulator 3), with the result that the image modulator 5 is driven as though it ought to generate a brighter grayscale value. Consequently, the image modulator 5 modulates all brightnesses that are lower than the background brightness of the illumination modulator 3. In this case, the driving of the image modulator 5 corresponds to a brightness or a grayscale level which, taking account of the chosen γ value, is multiplied by the contrast value of the illumination modulator 3. In the same way as the projector 201 with double modulation, the projector 1 can comprise a color wheel 15 in order to be able to generate and project multicolored images.

It can also be stated that for representing the low grayscale levels the threshold value), the illumination modulator 3 is set to black, while the grayscale levels of the image modulator 5 are increased (boosted) by the contrast of the illumination modulator. The distinction between the normal representation and boosted pixels takes place at the pixel level, as is also described in detail below. In the case of a projector 1 with tilting mirror double modulation, as a result of the representation of the dark grayscale levels by way of boosted (increased) grayscale values on the image modulator 5, these no longer have to be generated by dithering, with the result that all brightnesses represented in a boosted fashion do not shimmer and do not irritate the observer. Furthermore, even the lowest grayscale values can be represented in a distinguishable manner.

For the consideration below it is assumed that the intermediate imaging by means of the imaging optical unit 4 from the illumination modulator 3 onto the image modulator 5 has no image aberrations, with the result that light of each pixel K1 of the illumination modulator 3 is directed onto exactly the one assigned pixel K2 (and only this pixel) of the image modulator 5.

If the illumination modulator 3 is switched to black (grayscale level 0, $g_1$=0), and the image modulator 5 is switched to white (grayscale level 255, $g_2$=255), then a value corresponding to the background of a projector 101 with single modulation results as the projected brightness. In the abovementioned example with a projector 101 whose image generator has a contrast of K=1000:1 and γ=2.2, this background brightness (U=1/K=0.001) corresponds approximately to the grayscale level 11 of an ideal projector (cf. table 1). This results from the fact that the dependence of the projected (normalized) brightness $I_{theor}$ on a grayscale level g is given as:

$$I_{theor}(g) := \left(\frac{g}{255}\right)^\gamma$$

This yields the following for a limit grayscale level $g_{Limit}$ (=threshold value):

$$g_{Limit} = 255 \cdot (U)^{1/\gamma} = 11.03 \approx 11$$

If both modulators 3, 5 have the same background brightness U, the following formula results for the brightness profile as a function of the input grayscale values $g_1$ and $g_2$:

$$I_{double}(g_1, g_2) = I_{prior\ art}(g_1) * I_{prior\ art}(g_2) = \left\{U + (1-U) \cdot \left(\frac{g_1}{255}\right)^\gamma\right\} * \left\{U + (1-U) \cdot \left(\frac{g_2}{255}\right)^\gamma\right\}$$

For $g_1$=0, the following results as projected brightness after a double modulation:

$$I_{double}(g_1 = 0, g_2) = U * \left\{U + (1-U) \cdot \left(\frac{g_2}{255}\right)^\gamma\right\}$$

What is sought, then, is the grayscale value $g_2$ for the image modulator 5 in order to represent an arbitrary grayscale level that is less than the limit grayscale level ($g=g_{Limit}$) with the aid of the double modulation.

$$I_{double}(g_1=0, g_2) = I_{theor}(g)$$

This equation can be solved with respect to $g_2$.

$$g_2 = \left[\left[255 \cdot \left[\left(\frac{\left(\frac{g}{255}\right)^\gamma}{U} - U\right) \middle/ (1-U)\right]^{1/\gamma}\right]\right]$$

In this case, $g_2$ is rounded to a natural number between 0 and 255, as indicated by the operator [[ . . . ]].

In order to represent the grayscale level g=3, for example, $g_1$=0 is used for the illumination modulator 3 and $g_2$=69 is set for the image modulator 5. The image modulator 5 thus uses an elevated (boosted) value by comparison with the grayscale value actually desired (here grayscale level g=3).

Since the illumination and image control data MS, BS are generated as pulse-width-modulated control data, they can also be characterized on the basis of their duty factor (or duty ratio). Without the boosting according to the invention, the image control data BS would have a duty factor range of 0 to 255, wherein at zero (=minimum duty factor) the tilting mirrors K2 are in the second tilting position during the entire frame duration T and at 255 (=maximum duty factor) said tilting mirrors are in the first tilting position during the entire frame duration T. In the case of duty factor values of between 0 and 255, the tilting mirrors K2 are in the first tilting position during a first time duration Δt1 and in the second tilting position during a second time duration Δt2, wherein Δt1+Δt2=T. Consequently, the second time duration Δt2 becomes all the longer, the greater the duty factory value. In general, in the case of duty factor values of between 0 and 255, the tilting mirror K2 is switched back and forth repeatedly between its two tilting positions, with the result that the two time durations Δt1 and Δt2 are composed of temporal subsegments.

As a result of the boosting, for the image control data BS, provision is made of a first duty factor range for grayscale values greater than the predetermined threshold value and a second duty factor range for grayscale values that are not greater than the predetermined threshold value. The first duty factor range has the conventional values for values greater than the predetermined threshold value, which corresponds e.g. to the grayscale value 11. Thus, the lower limit of the first duty factor range would be at the grayscale value 12 and the duty factor value for this grayscale value is 12. The first duty factor range thus has values of 12 to 255.

The second duty factor range thus has its upper limit at the grayscale value 11, but the duty factor value for the grayscale value 11 is e.g. 254. The lower limit of the second duty factor range is 21 in the example described here. The second duty factor range thus has values of 21 to 254.

On account of the boosting, at least the duty factor value at the upper limit of the second duty factor range (=boosted duty factor range) is greater than the duty factor value at the lower limit of the first duty factor range (=unboosted duty factor range). It can also be stated that the two duty factor ranges overlap.

A combination of the grayscale values of the two modulators 3, 5 for representing a given grayscale level g is indicated in table 2 below. The left-hand column indicates the grayscale values g of 1-15 from the maximum possible range of 0-255, which are to be represented by means of the projector 1. The middle column indicates the grayscale level value for the illumination modulator 3 and the right-hand column indicates the grayscale level value for the image modulator 5.

TABLE 2

| grayscale level g to be represented [0:255] | grayscale level value g1 [0:255] | grayscale level value g2 [0:255] |
|---|---|---|
| 1 | 0 | 21 |
| 2 | 0 | 45 |
| 3 | 0 | 69 |
| 4 | 0 | 92 |
| 5 | 0 | 115 |
| 6 | 0 | 138 |
| 7 | 0 | 162 |
| 8 | 0 | 185 |
| 9 | 0 | 208 |
| 10 | 0 | 231 |
| 11 | 0 | 254 |
| 12 | 255 | 12 |
| 13 | 255 | 13 |
| 14 | 255 | 14 |
| 15 | 255 | 15 |

It becomes clearly evident from this that in the boosted second duty factor range, the illumination modulator 3 is switched to black (value 0) and the image modulator 5 has duty factor values (21-254) that are greater than corresponding duty factor values for the non-boosted case (1-11) which would be set e.g. at the image modulator 205. Starting from values above the threshold value g=11, the illumination modulator 3 is switched to white or maximum illumination intensity (value 255) during the entire frame duration T and the image modulator 5 is driven with the corresponding grayscale values $g_2$ (12, 13, 14, etc.). In the case of the embodiment described here, even the duty factor value (=21) of the lower limit of the second duty factor range lies above the duty factor value (=12) of the lower limit of the first duty factor range. Consequently, the second duty factor range lies completely within the first duty factor range.

Furthermore, it is evident that a value has to be dithered only for the grayscale level to be represented g=1 with $g_2$=21≤34. Consequently, the irritations caused thereby are almost completely avoided.

This way of generating the illumination and image control data MS, BS is also referred to hereinafter as Boost 1.

In the previous description for the boosted pixels, the illumination modulator 3 was always switched to black, while the brightness modulation of the background light of the illumination modulator 3 is effected by the image modulator 5. It goes without saying that for boosting purposes the two modulators 3, 5 can be driven the other way round, with the result that for a boosted pixel the second modulator 5 is set to black, while the brightness modulation is effected by way of the first modulator 3.

In order that the improvements achieved by means of the projector 1 according to the invention may be presented in an easily understandable way, firstly the actually projected brightnesses are compiled for various projectors. For a theoretical (normalized) brightness profile as a function of a grayscale level g, the following formula, which has already been indicated, holds true.

$$I_{theor}(g) = \left(\frac{g}{255}\right)^\gamma$$

If consideration is given to the background brightness in a real system according to the prior art (projector 101 with single modulation), then the following holds true for the (normalized) brightness profile (see table 1, column Brightness "prior art"):

$$J_{priorart}(g) := U + (1 - U) \cdot \left(\frac{g}{255}\right)^\gamma$$

For the first solution presented above (Boost 1), the following results on account of the double modulation:

$$I_{Boost1}(g) = \begin{cases} U^2 & \text{for } g = 0 \to (g_1 = 0, g_2 = 0) \\ & \text{for } 0 < g \leq g_{Limit} \to \\ U \cdot \left\{U + (1 - U) \cdot \left(\frac{g_2}{255}\right)^\gamma\right\} & \begin{pmatrix} g_1 = 0, g_2 = 255 \cdot \\ \left[\frac{\left(\frac{g}{255}\right)^\gamma - U}{1 - U}\right]^{\frac{1}{\gamma}} \end{pmatrix} \\ U + (1 - U) \cdot \left(\frac{g_2}{255}\right)^\gamma & \text{for } g > g_{Limit} \to \\ & (g_1 = 255, g_2 = g) \end{cases}$$

The resulting brightness being projected according to this method "Boost 1" is compiled for the lowest 30 grayscale levels in table 3.

TABLE 3

| Grayscale level | Brightness | Brightness | Error | Grayscale level "Boost 1" | | Brightness | Error |
|---|---|---|---|---|---|---|---|
| input [0:255] | theoretical [0:1] | "prior art" [0:1] | "prior art" [%] | g1 [0:255] | g2 [0:255] | "Boost 1" [0:1] | "Boost 1" [%] |
| 0 | 0 | 1.00E−03 | | 0 | 0 | 1.00E−06 | |
| 1 | 5.08E−06 | 1.01E−03 | 19696% | 0 | 21 | 5.11E−06 | 0.7% |
| 2 | 2.33E−05 | 1.02E−03 | 4287% | 0 | 45 | 2.30E−05 | 1.4% |
| 3 | 5.69E−05 | 1.06E−03 | 1757% | 0 | 69 | 5.73E−05 | 0.7% |
| 4 | 1.07E−04 | 1.11E−03 | 933% | 0 | 92 | 1.07E−04 | 0.1% |
| 5 | 1.75E−04 | 1.17E−03 | 571% | 0 | 115 | 1.74E−04 | 0.5% |
| 6 | 2.62E−04 | 1.26E−03 | 382% | 0 | 138 | 2.60E−04 | 0.7% |
| 7 | 3.67E−04 | 1.37E−03 | 272% | 0 | 162 | 3.69E−04 | 0.6% |
| 8 | 4.93E−04 | 1.49E−03 | 203% | 0 | 185 | 4.94E−04 | 0.3% |
| 9 | 6.38E−04 | 1.64E−03 | 157% | 0 | 208 | 6.39E−04 | 0.2% |
| 10 | 8.05E−04 | 1.80E−03 | 124% | 0 | 231 | 8.05E−04 | 0.0% |
| 11 | 9.92E−04 | 1.99E−03 | 101% | 0 | 254 | 9.91E−04 | 0.1% |
| 12 | 1.20E−03 | 2.20E−03 | 83% | 255 | 12 | 2.20E−03 | 83% |
| 13 | 1.43E−03 | 2.43E−03 | 70% | 255 | 13 | 2.43E−03 | 70% |
| 14 | 1.69E−03 | 2.69E−03 | 59% | 255 | 14 | 2.69E−03 | 59% |
| 15 | 1.96E−03 | 2.96E−03 | 51% | 255 | 15 | 2.96E−03 | 51% |
| 16 | 2.26E−03 | 3.26E−03 | 44% | 255 | 16 | 3.26E−03 | 44% |
| 17 | 2.59E−03 | 3.58E−03 | 39% | 255 | 17 | 3.58E−03 | 39% |
| 18 | 2.93E−03 | 3.93E−03 | 34% | 255 | 18 | 3.93E−03 | 34% |
| 19 | 3.30E−03 | 4.30E−03 | 30% | 255 | 19 | 4.30E−03 | 30% |
| 20 | 3.70E−03 | 4.69E−03 | 27% | 255 | 20 | 4.69E−03 | 27% |
| 21 | 4.12E−03 | 5.11E−03 | 24% | 255 | 21 | 5.11E−03 | 24% |
| 22 | 4.56E−03 | 5.56E−03 | 22% | 255 | 22 | 5.56E−03 | 22% |
| 23 | 5.03E−03 | 6.02E−03 | 20% | 255 | 23 | 6.02E−03 | 20% |
| 24 | 5.52E−03 | 6.52E−03 | 18% | 255 | 24 | 6.52E−03 | 18% |
| 25 | 6.04E−03 | 7.03E−03 | 16% | 255 | 25 | 7.03E−03 | 16% |
| 26 | 6.58E−03 | 7.58E−03 | 15% | 255 | 26 | 7.58E−03 | 15% |
| 27 | 7.16E−03 | 8.15E−03 | 14% | 255 | 27 | 8.15E−03 | 14% |
| 28 | 7.75E−03 | 8.74E−03 | 13% | 255 | 28 | 8.74E−03 | 13% |

TABLE 3-continued

| Grayscale level input [0:255] | Brightness theoretical [0:1] | Brightness "prior art" [0:1] | Error "prior art" [%] | Grayscale level "Boost 1" g1 [0:255] | g2 [0:255] | Brightness "Boost 1" [0:1] | Error "Boost 1" [%] |
|---|---|---|---|---|---|---|---|
| 29 | 8.37E−03 | 9.36E−03 | 12% | 255 | 29 | 9.36E−03 | 12% |
| 30 | 9.02E−03 | 1.00E−02 | 11% | 255 | 30 | 1.00E−02 | 11% |

It is evident that for grayscale levels that are less than or equal to the limit grayscale level $g_{Limit}$ (=11), the theoretical brightnesses are attained with the exception of approximately 1%. For grayscale levels that are slightly brighter, however, there are considerable deviations (up to approximately 80% for the first grayscale level above the limit grayscale level).

In order further to reduce the described deviations from the setpoint value for grayscale levels above the grayscale level limit ($g > g_{Limit}$), in one development of the Boost 1 variant, the grayscale values $g_2$ of the image modulator 5 can be chosen in such a way that they achieve the theoretical brightnesses for a real projector 1 with a real background brightness U (on account of the choice of $g_1$=255) (this is also referred to hereinafter as "Boost 2"). What is thus sought is a $g_2'$ for which the following requirement holds true:

$$I_{double}(g_1 = 1, g_2') = I_{theor}(g) \text{ for all } g_{Limit} < g \leq 255$$

This is satisfied for:

$$g_2' = \left[\left[255 \cdot \left(\frac{\left(\frac{g}{255}\right)^\gamma - U}{1 - U}\right)^{\frac{1}{\gamma}}\right]\right]$$

This value is rounded to a natural number between 0 and 255, as indicated by the operator [[ . . . ]]. For the case considered here with a contrast of K=1000:1 and γ=2.2, the resulting grayscale values $g_2'$ are entered in table 3.

The following brightnesses result for the variant "Boost 2":

$$I_{Boost2}(g) = \begin{cases} U^2 & \text{for } g = 0 \to (g_1 = 0, g_2' = 0) \\ & \text{for } 0 < g \leq g_{Limit} \to \\ U \cdot \left\{U + (1-U) \cdot \left(\frac{g_2'}{255}\right)^\gamma\right\} & \left(g_1 = 0, g_2' = 255 \cdot \left[\frac{\left(\frac{g}{255}\right)^\gamma - U}{1-U}\right]^{\frac{1}{\gamma}}\right) \\ & \text{for } g > g_{Limit} \to \\ U + (1-U) \cdot \left(\frac{g_2}{255}\right)^\gamma & \left(g_1 = 255, g_2' = 255 \cdot \left[\frac{\left(\frac{g}{255}\right)^\gamma - U}{1-U}\right]^{\frac{1}{\gamma}}\right) \end{cases}$$

These values are entered in table 4 below.

TABLE 4

| Grayscale level input [0:255] | Brightness theoretical [0:1] | Brightness "prior art" [0:1] | Error "prior art" [%] | Grayscale level "Boost 2" g1 [0:255] | g2' [0:255] | Brightness "Boost 2" [0:1] | Error "Boost 2" [%] |
|---|---|---|---|---|---|---|---|
| 0 | 0 | 1.00E−03 | | 0 | 0 | 1.00E−06 | |
| 1 | 5.08E−06 | 1.01E−03 | 19696% | 0 | 21 | 5.11E−06 | 0.7% |
| 2 | 2.33E−05 | 1.02E−03 | 4287% | 0 | 45 | 2.30E−05 | 1.4% |
| 3 | 5.69E−05 | 1.06E−03 | 1757% | 0 | 69 | 5.73E−05 | 0.7% |
| 4 | 1.07E−04 | 1.11E−03 | 933% | 0 | 92 | 1.07E−04 | 0.1% |
| 5 | 1.75E−04 | 1.17E−03 | 571% | 0 | 115 | 1.74E−04 | 0.5% |
| 6 | 2.62E−04 | 1.26E−03 | 382% | 0 | 138 | 2.60E−04 | 0.7% |
| 7 | 3.67E−04 | 1.37E−03 | 272% | 0 | 162 | 3.69E−04 | 0.6% |
| 8 | 4.93E−04 | 1.49E−03 | 203% | 0 | 185 | 4.94E−04 | 0.3% |
| 9 | 6.38E−04 | 1.64E−03 | 157% | 0 | 208 | 6.39E−04 | 0.2% |
| 10 | 8.05E−04 | 1.80E−03 | 124% | 0 | 231 | 8.05E−04 | 0.0% |
| 11 | 9.92E−04 | 1.99E−03 | 101% | 0 | 254 | 9.91E−04 | 0.1% |
| 12 | 1.20E−03 | 2.20E−03 | 83% | 255 | 5 | 1.17E−03 | 2.2% |
| 13 | 1.43E−03 | 2.43E−03 | 70% | 255 | 8 | 1.49E−03 | 4.1% |
| 14 | 1.69E−03 | 2.69E−03 | 59% | 255 | 9 | 1.64E−03 | 2.9% |
| 15 | 1.96E−03 | 2.96E−03 | 51% | 255 | 11 | 1.99E−03 | 1.4% |
| 16 | 2.26E−03 | 3.26E−03 | 44% | 255 | 12 | 2.20E−03 | 2.8% |
| 17 | 2.59E−03 | 3.58E−03 | 39% | 255 | 14 | 2.69E−03 | 3.8% |
| 18 | 2.93E−03 | 3.93E−03 | 34% | 255 | 15 | 2.96E−03 | 1.0% |
| 19 | 3.30E−03 | 4.30E−03 | 30% | 255 | 16 | 3.26E−03 | 1.3% |
| 20 | 3.70E−03 | 4.69E−03 | 27% | 255 | 17 | 3.58E−03 | 3.1% |
| 21 | 4.12E−03 | 5.11E−03 | 24% | 255 | 19 | 4.30E−03 | 4.5% |
| 22 | 4.56E−03 | 5.56E−03 | 22% | 255 | 20 | 4.69E−03 | 2.9% |
| 23 | 5.03E−03 | 6.02E−03 | 20% | 255 | 21 | 5.11E−03 | 1.7% |
| 24 | 5.52E−03 | 6.52E−03 | 18% | 255 | 22 | 5.56E−03 | 0.6% |
| 25 | 6.04E−03 | 7.03E−03 | 16% | 255 | 23 | 6.02E−03 | 0.3% |

TABLE 4-continued

| Grayscale level | Brightness | Brightness | Error | Grayscale level "Boost 2" | | Brightness | Error |
|---|---|---|---|---|---|---|---|
| input [0:255] | theoretical [0:1] | "prior art" [0:1] | "prior art" [%] | g1 [0:255] | g2' [0:255] | "Boost 2" [0:1] | "Boost 2" [%] |
| 26 | 6.58E−03 | 7.58E−03 | 15% | 255 | 24 | 6.52E−03 | 1.0% |
| 27 | 7.16E−03 | 8.15E−03 | 14% | 255 | 25 | 7.03E−03 | 1.7% |
| 28 | 7.75E−03 | 8.74E−03 | 13% | 255 | 26 | 7.58E−03 | 2.2% |
| 29 | 8.37E−03 | 9.36E−03 | 12% | 255 | 27 | 8.15E−03 | 2.7% |
| 30 | 9.02E−03 | 1.00E−02 | 11% | 255 | 28 | 8.74E−03 | 3.1% |

In the case of the variant "Boost 2", the first duty factor range extends from 5 to 255 and the second duty factor range extends from 21 to 254. In the case of the variant "Boost 2" as well, the duty factor value of the upper limit of the second duty factor range is greater than the duty factor value of the lower limit of the first duty factor range. In particular, the second duty factor range lies completely in the first duty factor range.

With the variant "Boost 2", therefore, the deviation of the projected brightnesses relative to the theoretical values no longer becomes greater than 5%. This is achieved by virtue of the fact that the first duty factor range (in particular for grayscale values that are only somewhat greater than the threshold value) was adapted accordingly. The second duty factor range of the variant "Boost 2" is identical to the second duty factor range of the variant "Boost 1".

Tables 3 and 4 show the brightnesses of the projector according to the invention depending on the grayscale levels to be represented up to 30 (for γ=2.2). The brightnesses are compared for a perfect (theoretical) system, for the projector 101 with single modulation according to the prior art ("prior art"), having only a single image modulator 105 and a contrast of K=1000:1, and also for the variants "Boost 1" and "Boost 2" according to the invention. The deviation of the solutions from the setpoint value is additionally indicated.

Figure 10:
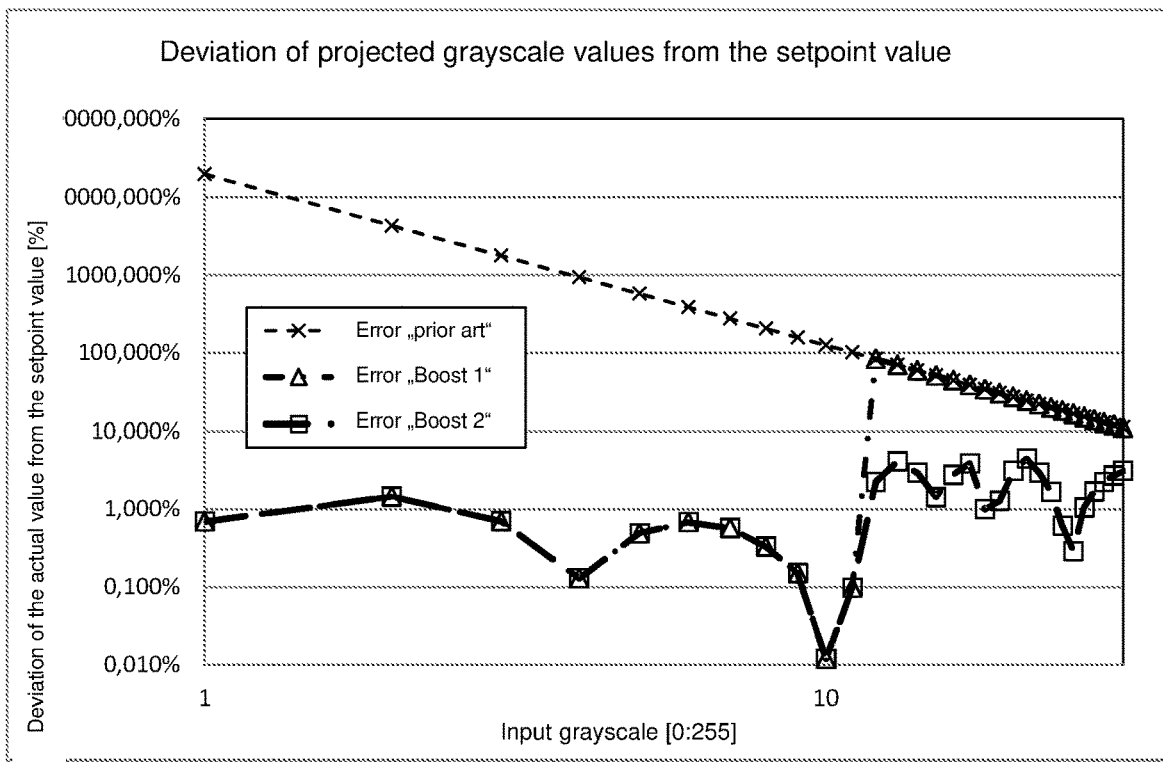
FIG. 10 shows an illustration of the deviation of the projected grayscale values from the setpoint value for the variants Boost1 and Boost2 according to certain embodiments of the invention.

FIG. 10 shows the percentage deviations of the projected grayscale value from the setpoint value for the lowest 30 grayscale levels for the projector 101 with single modulation according to the prior art (dashed), the projector 1 according to the invention in accordance with variant "Boost 1" (dot-dashed line) and the projector 1 according to the invention in accordance with "Boost 2" (long-dashed).

It is evident from FIG. 10 that the variants "Boost1" and "Boost2" for the boosted grayscale values (=grayscale values 1 to 11) yield identical results, which of course results from the fact that the second duty factor range is identical for both variants. For grayscale values greater than the threshold value (than grayscale values 12 and greater), the variant "Boost2" yields better results, which decrease as the grayscale value increases. This improvement is achieved by virtue of the fact that the residual light, which is unavoidable, is concomitantly taken into account starting from the input grayscale value 12. This results in the second pixels being driven with a lower brightness than the input brightness (in the case of the input brightness 12, the second pixel is driven e.g. with the brightness value 6; table 3). As a result, this leads to the improvement described.

In a further development of the variant "Boost1", which is referred to as "Boost 3", the following procedure can be adopted. This takes account of the fact that the tilting mirror matrices allow fine tuning of the synchronous switching of the tilting mirrors K1, K2. Furthermore, the grayscale values or brightness values are specified for each of the three primary colors, red, green and blue, which is evident from the use of $T_{RGB} := T_R = T_G = T_B$.

Since the two modulators 3, 5 are driven with pulse width modulation, the following formula should be employed for the calculation of the projected brightnesses:

$$I_{2 \times DMD}(g_1, g_2^*) = \frac{T_1(g_1, g_2^*) \cdot U^2 + T_2(g_1, g_2^*) \cdot U + T_3(g_1, g_2^*)}{T}$$

In this case, there are discrete brightness steps, which can be represented by way of a pulse width modulation. For the following considerations it is assumed that $t_{min}$ is the minimum effective on time of a tilting mirror K1, K2 (=time duration for which the tilting mirror is in its first tilting position) and that all brightnesses are given over multiples n of this time.

The determination of the grayscale values represented is carried out as follows:

the grayscale value 0 is represented by both DMDs being set to black, i.e. $g_1 = g_2^* = 0$ or $n_1 = n_2 = 0$.

For the boosted grayscale values $0 < g \le g_{Limit}$, one of the modulators 3 5 is set to black, (e.g. $g_1 = 0$ or $n_1 = 0$), while the other modulator represents a grayscale value $g_2^*$ (or a multiple $n_2$ of the minimum effective on time $3 \cdot t_{min}$ for all three colors) in order to satisfy the theoretical brightness. The following requirement thus results:

$$I_{theor}(g) = I_{2 \times DMD}(g_1 = 0, g_2^*)$$

Since one of the modulators 3, 5 is always set to black, this results here in $T_3 = 0$. For the time $T_2$, in which only one of the modulators 3, 5 is at white, it holds true that:

$$T_2 = 3 \cdot n_2 \cdot t_{min}$$

Consequently, for the time in which both modulators 3, 5 are set to black, it follows that:

$$T_1 = 3 \cdot T_{RGB} - T_2 = 3 \cdot T_{RGB} - 3 \cdot n_2 \cdot t_{min}$$

From $I_{theor}(g)$ it thus follows that:

$$\left(\frac{g}{255}\right)^\gamma = \frac{1}{T}\{T_1 \cdot U^2 + T_2 \cdot U + T_3\} = \frac{3 \cdot n_2 \cdot t_{min} \cdot U \cdot (1-U)}{3 \cdot T_{RGB}} + U^2$$

From this it follows that:

$$n_2(0 < g \le g_{Limit}) = \left[\left[\frac{T_{RGB} \cdot \left(\left(\frac{g}{255}\right)^\gamma - U^2\right)}{t_{min} \cdot U \cdot (1-U)}\right]\right]$$

This corresponds to an input grayscale value $g_2^*$ for the second modulator 3, 5 of:

$$g_2^*(0 < g \leq g_{Limit}) = \left[\left[255 \cdot \left(\frac{n_2(g) \cdot t_{min}}{T_{RGB}}\right)^{1/\gamma}\right]\right]$$

For grayscale values which are not boosted but are still dithered ($g_{Limit} < g \leq g_{Dither}$) and are thus illuminated within a minimum illumination time τ (per color) of the first DMD, there arises an analogous requirement to $I_{theor}(g) = I_{2 \times DMD}$ ($g_1 = 0$, $g_2^*$), namely:

$$I_{theor}(g) = I_{2 \times DMD}(g_1 = 1, g_2^*)$$

In this case, the grayscale value $g_1 = 1$ of the first modulator 3 is intended to provide the illumination time τ. This results in the following:

$$T_1 = 3 \cdot T_{RGB} - 3 \cdot \tau$$

$$T_2 = 3 \cdot \tau - 3 \cdot n_2 \cdot t_{min}$$

$$T_3 = 3 \cdot n_2 \cdot t_{min}$$

It follows therefrom:

$$\left(\frac{g}{255}\right)^\gamma = \frac{1}{T}\{T_1 \cdot U^2 + T_2 \cdot U + T_3\} = \frac{(T_{RGB} - \tau) \cdot U^2 + (\tau - n_2 \cdot t_{min}) \cdot U + n_2 \cdot t_{min}}{T_{RGB}}$$

The following thus results:

$$n_2(g_{Limit} < g \leq g_{Dither}) = \left[\left[\frac{T_{RGB} \cdot \left(\frac{g}{255}\right)^\gamma - \frac{(T_{RGB} - \tau) \cdot U^2 - \tau \cdot U}{t_{min} \cdot (1 - U)}}{}\right]\right]$$

the resulting input grayscale values for the second modulator 5 arise just like as above:

$$g_2^*(g_{Limit} < g \leq g_{Dither}) = \left[\left[255 \cdot \left(\frac{n_2(g) \cdot t_{min}}{T_{RGB}}\right)^{1/\gamma}\right]\right]$$

For grayscale levels $g > g_{Dither}$, the already described procedure for a double modulation is followed, in which a first one of the two modulators 3, 5 makes available the required time slices which are required for the modulation by the second modulator 3, 5 in order to generate the grayscale level sought.

Combining this results in the following:

$$I_{Boost3}(g) = \begin{cases} U^2 & \text{for } g = 0 \rightarrow (g_1 = g_2^* = 0) \\ \frac{n_2 \cdot t_{min} \cdot U \cdot (1 - U)}{T_{RGB}} + U^2 & \text{for } 0 < g \leq g_{Limit} \rightarrow \left(g_1 = 0, n_2 = \left[\left[\frac{T_{RGB} \cdot \left(\left(\frac{g}{255}\right)^\gamma - U^2\right)}{t_{min} \cdot U \cdot (1 - U)}\right]\right]\right) \\ \frac{(T_{RGB} - \tau) \cdot U^2 + (\tau - n_2 \cdot t_{min}) \cdot U + n_2 \cdot t_{min}}{T_{RGB}} & \text{for } g_{Limit} < g \leq g_{Dither} \rightarrow \left(g_1 = 1, n_2 = \left[\left[\frac{T_{RGB} \cdot \left(\frac{g}{255}\right)^\gamma - (T_{RGB} - \tau) \cdot U^2 - \tau \cdot U}{t_{min} \cdot (1 - U)}\right]\right]\right) \\ \text{Normal DMD} - \\ \text{Double modulation} & \text{for } g_{Dither} < g \leq 255 \end{cases}$$

The results according to this calculation specification are compiled in table 5 below. It is evident that with this method the boosted values can be represented more accurately again.

TABLE 5

| g1 [0:255] | g2* [0:255] | n2 | T1 [μs] | T2 [μs] | T3 [μs] | [0:1] | [%] |
|---|---|---|---|---|---|---|---|
| 0 | 0 | 0 | 0 | 0 | 0 | 1.00E-06 | |
| 0 | 21 | 87 | 12449 | 51 | 0 | 5.07E-06 | 0.059% |
| 0 | 45 | 477 | 12221 | 279 | 0 | 2.33E-05 | 0.039% |
| 0 | 69 | 1194 | 11800 | 700 | 0 | 5.69E-05 | 0.016% |
| 0 | 92 | 2268 | 11171 | 1329 | 0 | 1.07E-04 | 0.018% |
| 0 | 115 | 3718 | 10321 | 2179 | 0 | 1.75E-04 | 0.010% |
| 0 | 138 | 5564 | 9240 | 3260 | 0 | 2.62E-04 | 0.003% |
| 0 | 162 | 7819 | 7919 | 4581 | 0 | 3.67E-04 | 0.003% |
| 0 | 185 | 10496 | 6350 | 6150 | 0 | 4.93E-04 | 0.001% |
| 0 | 208 | 13607 | 4527 | 7973 | 0 | 6.38E-04 | 0.001% |
| 0 | 231 | 17162 | 2444 | 10056 | 0 | 8.05E-04 | 0.001% |
| 0 | 254 | 21170 | 96 | 12404 | 0 | 9.92E-04 | 0.002% |
| 1 | 12 | 24 | 11600 | 885.9 | 14.1 | 1.20E-03 | 0.411% |
| 1 | 13 | 29 | 11600 | 883.0 | 17.0 | 1.43E-03 | 0.153% |
| 1 | 14 | 34 | 11600 | 880.1 | 20.0 | 1.67E-03 | 1.294% |
| 1 | 15 | 40 | 11600 | 876.6 | 23.4 | 1.95E-03 | 0.884% |
| 1 | 16 | 47 | 11600 | 872.5 | 27.5 | 2.27E-03 | 0.482% |
| 1 | 17 | 54 | 11600 | 868.5 | 31.6 | 2.60E-03 | 0.612% |
| 1 | 18 | 61 | 11600 | 864.3 | 35.7 | 2.93E-03 | 0.098% |
| 1 | 19 | 69 | 11600 | 859.6 | 40.4 | 3.30E-03 | 0.041% |
| 1 | 20 | 77 | 11600 | 854.9 | 45.1 | 3.68E-03 | 0.502% |
| 1 | 21 | 86 | 11600 | 849.6 | 50.4 | 4.10E-03 | 0.389% |
| 1 | 22 | 96 | 11600 | 843.8 | 56.3 | 4.57E-03 | 0.190% |
| 1 | 23 | 106 | 11600 | 837.9 | 62.1 | 5.04E-03 | 0.169% |
| 1 | 24 | 116 | 11600 | 832.0 | 68.0 | 5.50E-03 | 0.303% |
| 1 | 25 | 127 | 11600 | 825.6 | 74.4 | 6.02E-03 | 0.339% |
| 1 | 26 | 139 | 11600 | 818.6 | 81.4 | 6.58E-03 | 0.044% |
| 1 | 27 | 151 | 11600 | 811.5 | 88.5 | 7.14E-03 | 0.155% |
| 1 | 28 | 164 | 11600 | 803.9 | 96.1 | 7.75E-03 | 0.022% |
| 1 | 29 | 177 | 11600 | 796.3 | 103.7 | 8.36E-03 | 0.139% |
| 1 | 30 | 191 | 11600 | 788.1 | 111.9 | 9.02E-03 | 0.049% |

In previous considerations it was assumed that the imaging optical unit 4 images each tilting mirror K1 onto exactly one assigned tilting mirror K2 (and only onto the latter). This is virtually impossible to realize in practice in a real system, however, with the result that a tilting mirror K2 receives light from the directly assigned tilting mirror K1 (which can also be referred to as main illumination pixel since the main part of the light incident on the tilting mirror originates from it) and also light from tilting mirrors K1 adjacent thereto.

This is illustrated schematically in FIG. 11. The tilting mirror $K2_{45}$ of the image modulator 5 that is illustrated in a hatched manner shall be considered. Said tilting mirror is illuminated primarily with the light from the directly assigned tilting mirror $K1_{45}$ (=main illumination pixel) of the illumination modulator 3, as is indicated by the arrow P1. However, light from the tilting mirrors $K1_{34}$, $K1_{35}$, $K1_{36}$, $K1_{44}$, $K1_{46}$, $K1_{54}$, $K1_{55}$, $K1_{56}$ that are directly adjacent to the tilting mirror $K1_{45}$ is also incident on the tilting mirror $K2_{45}$ of the image modulator 5. Consequently, in this case, the tilting mirrors $K1_{45}$, $K1_{34}$, $K1_{35}$, $K1_{36}$, $K1_{44}$, $K1_{46}$, $K1_{54}$, $K1_{55}$, $K1_{56}$ of the illumination modulator 3 are assigned to the tilting mirror $K2_{45}$ of the image modulator 5.

This assignment can also be formulated on the basis of a tilting mirror K1 of the illumination modulator 3. In this regard, light from the tilting mirror $K1_{45}$ is incident primarily on the tilting mirror $K2_{45}$. In addition, light from the tilting mirror $K1_{45}$ is also incident on the adjacent tilting mirrors $K2_{34}$, $K2_{35}$, $K2_{36}$, $K2_{44}$, $K2_{46}$, $K2_{54}$, $K2_{55}$ and $K2_{56}$, with the result that the tilting mirror $K1_{45}$ is assigned to nine tilting mirrors $K2_{34}$, $K2_{35}$, $K2_{36}$, $K2_{44}$, $K2_{45}$, $K2_{46}$, $K2_{54}$, $K2_{55}$ and $K2_{56}$.

If the tilting mirror K2$_{45}$ is intended to represent a grayscale value that is less than or equal to the threshold value g$_{Limit}$, and the adjacent tilting mirror K2$_{44}$ is intended to represent a grayscale value that lies above the threshold value, this would have the effect that the illumination pixel K1$_{45}$ for boosting the image pixel K2$_{45}$ is switched to black and the illumination pixel K1$_{44}$ for the tilting mirror K2$_{44}$ is switched to white. The illumination pixel K2$_{45}$ to be boosted would thus obtain more light than desired (e.g. owing to the light originating from the illumination pixel K1$_{44}$), which would result in an excessively bright boosting pixel.

For the description below, in order to simplify the illustration, a line of pixels to be represented comprising 27 pixels is taken as a basis, as is shown in FIG. 12. Each square illustrated represents one pixel, wherein in each pixel the grayscale value to be represented is indicated as a number (=image data BD). The grayscale value 10 is defined as threshold value g$_{Limit}$. On the basis of the given image data BD, for each pixel it is possible to ascertain (arrow P2) whether it is boostable (its grayscale value is less than or equal to the threshold value 10) or not (its grayscale value is greater than the threshold value 10). Boost data BB are ascertained as a result, which are in turn illustrated for each pixel. If the value of the pixel is 1, a boostable pixel is present. In the case of a value of 0, the pixel is not boostable.

Furthermore, the pattern data M are generated on the basis of the given image data BD. For this purpose, for each pixel, the maximum value of the values of the image data for the pixel and its direct neighboring pixels is ascertained and said maximum value is written into the corresponding pixel of the pattern data M, as is indicated by the arrows P3 and P4 in FIG. 13 for two pixels of the pattern data M. This ensures that each pixel of the image modulator 5 is illuminated uniformly or sufficiently, even if the illumination pixels are switched off at times during a frame duration on account of the pulse-width-modulated illumination control data MS.

Figure 14:
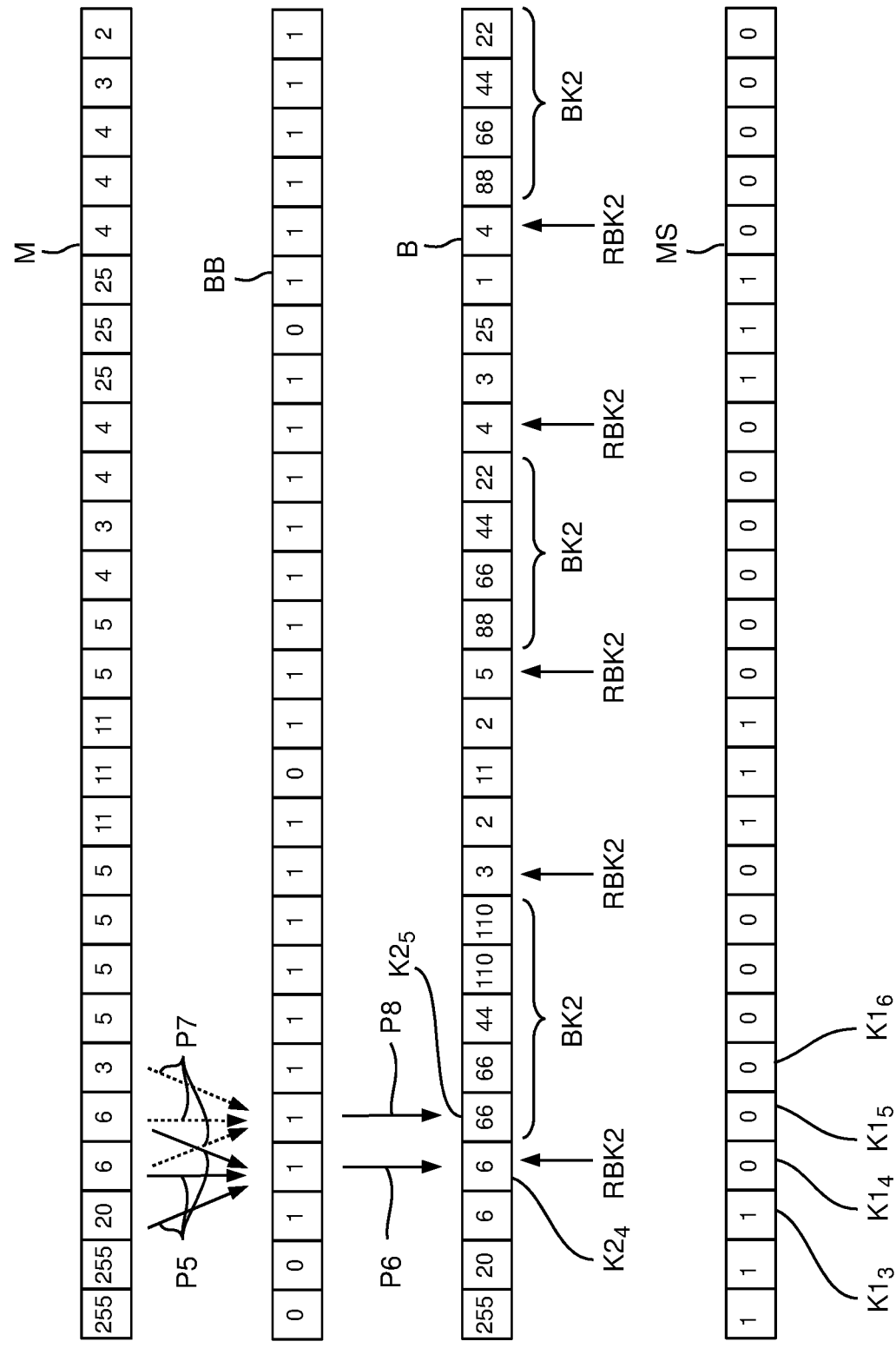
FIG. 14 shows a schematic illustration for elucidating the ascertainment of the brightness values for boosted and non-boosted pixels and also the corresponding illumination control data.

As is shown in FIG. 14, for each boostable pixel (pixel having the value 1 in the boost data BB), it is ascertained whether the illumination pixel values of the respectively assigned three pixels of the pattern data M all have in each case a value of less than or equal to the threshold value. If this is not the case, the grayscale value in the frame data B is not boosted and is thus accepted without being changed. This is indicated by the arrows P5 and P6. The left arrow of the three arrows P5 shows that the value 20 in the pattern data M is assigned to the boostable pixel, with the result that the grayscale value is not boosted.

In the case of the boostable pixel, whose assigned pixel values of the pattern data M are highlighted by the arrows P7, all pixel values are less than or equal to the threshold value, with the result that the corresponding grayscale value in the frame data B is boosted from 6 to 66 (arrow P8). It is assumed here that the grayscale value of a boosted pixel preceding from the original grayscale value is ascertained by multiplication by a boost factor (which here is 22).

In the case of the exemplary embodiment described here, the illumination control data MS are generated on the basis of the pattern data M such that they are set to on or white for values greater than the threshold value 10 in accordance with the grayscale value in the image data and are set to off or black for values less than or equal to the threshold value 10. Consequently, all boosted pixels BK2 are definitely illuminated only with the unavoidable background brightness, which is modulated according to the boosted values. In this regard, e.g. the pixel K2$_5$ is illuminated by light from the pixels K1$_4$, K1$_5$ and K1$_6$, which are all set to off (=0).

By contrast, all non-boosted pixels are illuminated.

However, in the case of some of the non-boosted pixels, the brightness of the illumination may turn out to be somewhat lower than previously. This concerns the edge pixels RBK2, the respectively assigned main illumination pixel of which is switched to black since said main illumination pixel is switched to black owing to a boosted pixel. However, a neighboring illumination pixel is not switched to black, with the result that light from said neighboring illumination pixel is incident on the boostable edge pixel RBK2. However, since the boostable edge pixel RBK2 does not have a boosted grayscale value, but rather the original grayscale value, an excessively bright edge can reliably be avoided as a result. This applies to the pixel K2$_4$, for example, the main illumination pixel K1$_4$ of which is indeed switched to off. However, there is a residual illumination by way of the illumination pixel K1$_3$.

Avoiding the excessively bright edge in this way can have the effect, however, that the edge appears too dark, since the edge pixel RBK2 is illuminated by the residual illumination described.

This undesired effect can be reduced by utilizing the pulse width modulation for driving the illumination and image pixels K1 and K2. Furthermore, the number of boosted pixels can be increased, as is described in detail below.

The same image data BD in accordance with FIG. 12 are taken as a basis. The boost data BB are generated from said image data, as has already been described in connection with FIG. 12.

Furthermore, pattern data M are generated on the basis of the image data BD in the same way as in FIG. 13. In a further step, said pattern data are then evaluated with regard to the pulse width modulation ensuing therefrom for the illumination modulator 3.

Figure 15:
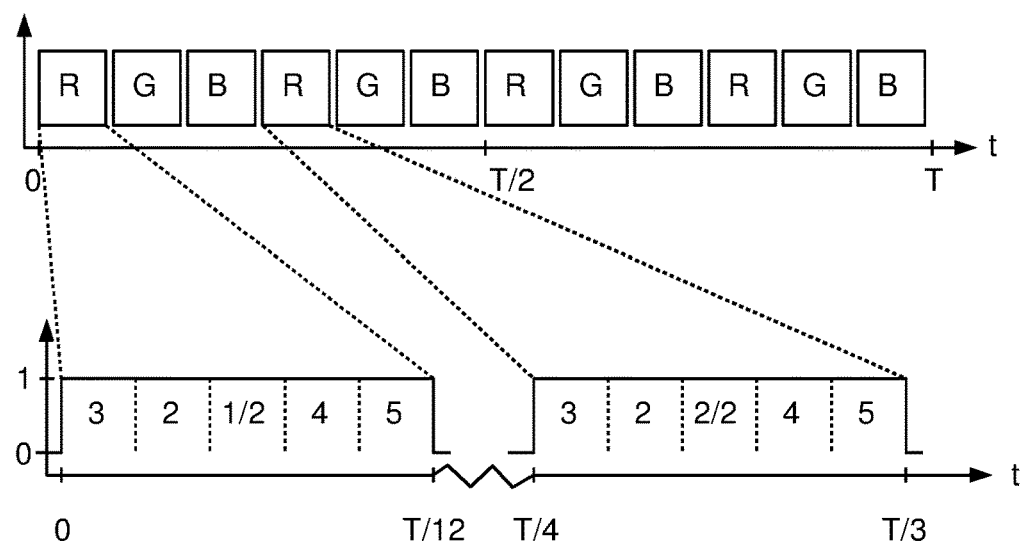
FIG. 15 shows an illustration for elucidating the pulse width modulation for the illumination modulator.

The pulse width modulation for the illumination modulator 3 has different time segments for each of the three colors red, green and blue during the frame duration T, said time segments being explained in conjunction with FIG. 15. On account of the assumed rotational frequency of 120 Hz for the color wheel 15, four color passes per frame duration T arise for each of the three colors red, green and blue, as is shown schematically in FIG. 15. The color passes are designated by R for red, G for green and B for blue. The color red is discussed in detail below. However, the same applies to the colors green and blue.

Since the individual time segments (which can also be referred to as time slots) are distributed uniformly for the first and second complete revolutions of the color wheel 15 during a frame duration T, only the first revolution of the color wheel 15 is described in detail.

Therefore, the lower part of FIG. 15 illustrates the first and second color passes for red with a magnified temporal scale. It is evident from this that each color pass is divided into five time segments of equal length, which are designated by 1/2, 2, 3, 4 and 5 and, respectively, 2/2, 2, 3, 4 and 5. There are thus six different time segments (1/2, 2/2, 2, 3, 4 and 5) during a color pass. For each time segment, on the basis of the illumination control data BS for each illumination pixel it is possible individually to establish whether it is switched on (=1 and corresponds to the illumination of the assigned image pixels) or whether it is switched off (=0 and corresponds to no active illumination of the assigned image pixels).

Furthermore, it is assumed that the illumination control data MS can have the values 0, 1/2, L or H.

In this case, 0 means that the corresponding illumination pixel is switched off during the entire frame duration T. The value 1/2 means that only the time segment 1/2 is used for the illumination, wherein grayscale values of 1 to 12 are thus representable. The value L means that only the time segments 2/2, 2, 3, 4 and 5 are used for the illumination, wherein grayscale values of 13 to 229 are thus representable. The value H means that all time segments 1/2, 2/2, 2, 3, 4 and 5 are used for the illumination, wherein grayscale values of greater than or equal to 230 are thus representable.

Figure 16:
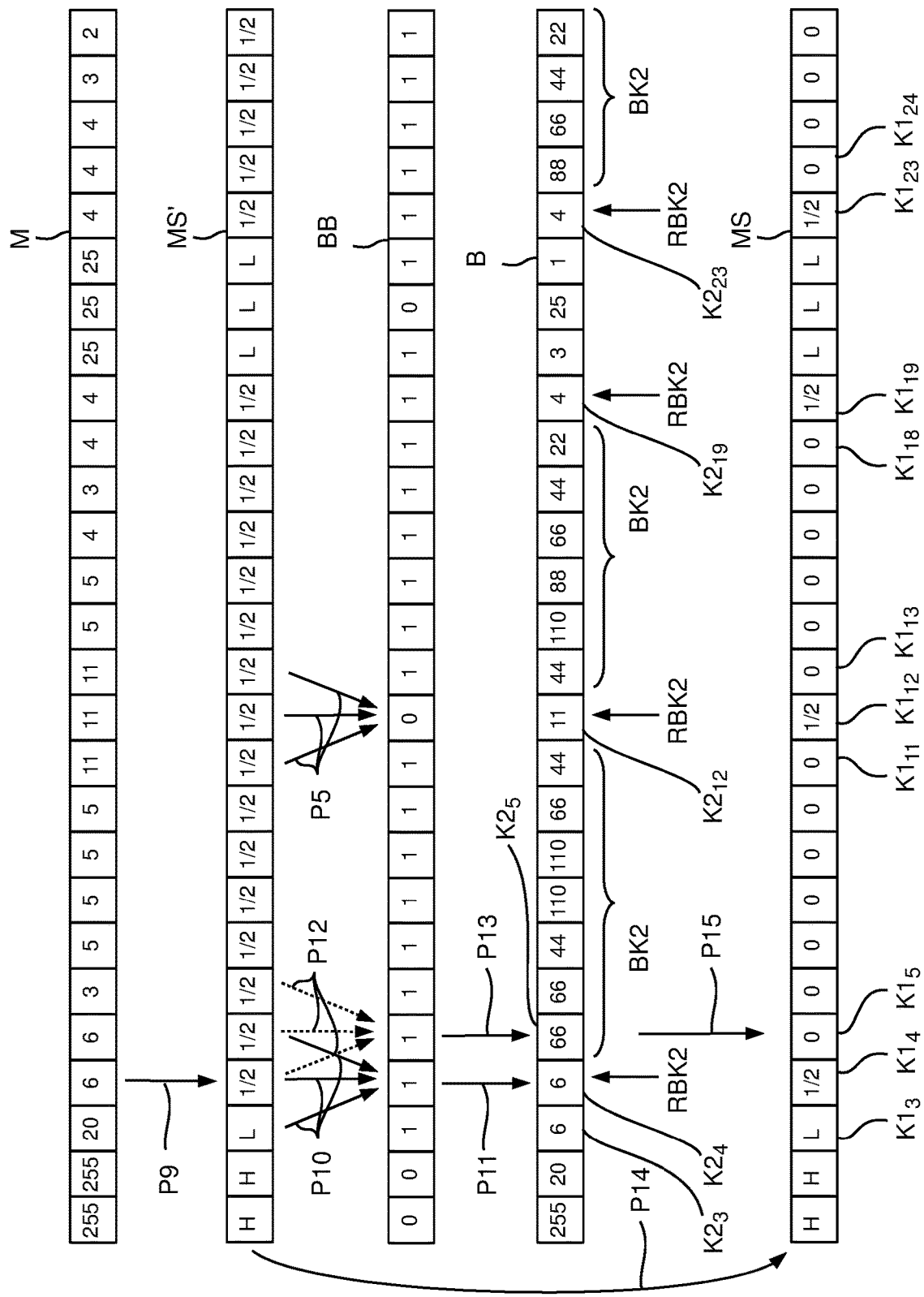
FIG. 16 shows an illustration for determining the brightness values for the boosted pixels and non-boosted pixels and the assigned illumination control data.

As is then shown in FIG. 16, provisional illumination control data MS' are generated from the pattern data M, wherein the described possible values of the illumination control data MS are allocated to the individual pixels (arrow P9).

Then, for each boostable pixel (pixel having the value 1 in the boost data BB), it is ascertained whether the values of the provisional illumination control data MS' of the respectively assigned three pixels have no other values apart from 0 and 1/2. If this is not the case, the grayscale value in the frame data B is not boosted and is thus accepted without being changed. This is indicated by the arrows P10 and P11, wherein the left arrow of the arrows P10 shows that the value L in the provisional illumination control data MS' is assigned to the boostable pixel, with the result that the grayscale value is not boosted.

In the case of the boostable pixel, whose assigned pixel values of the provisional illumination control data MS' are highlighted by the arrows P12, all pixel values are from the group comprising the values 0 and 1/2. Therefore, the corresponding grayscale value of 3 in accordance with the image data BD is increased to 66 (on account of the boost factor 22).

The illumination control data MS are then generated on the basis of the provisional illumination control data MS' and the image data B such that for boosted pixels the assigned main illumination pixel is set to 0 and the remaining illumination pixels have the same value as in the provisional illumination control data MS', as is indicated by the arrows P14 and P15.

As shown by a comparison of the image data B in accordance with FIG. 16 with the image data B in accordance with FIG. 14, more boostable pixels can be boosted. Furthermore, e.g. the left edge pixel $K2_4$ can be illuminated normally by way of its assigned main illumination pixel $K1_4$ (illumination control data value 1/2), since the directly adjacent boosted image pixel $K2_5$ having the boosted grayscale value of 66 is switched into its on state only at such times which do not coincide with the time slot 1/2. This is shown for the tilting mirrors $K1_4$, $K1_5$, $K2_4$ and $K2_5$ schematically in the four illustrations in FIGS. 17a, 17b, 17c and 17d for the color red in the same way as in the lower illustration of FIG. 15.

Figure 17A:
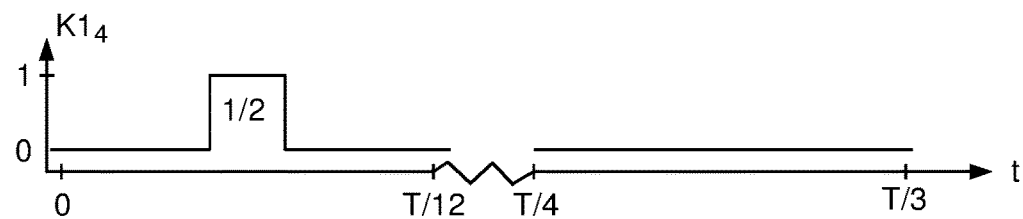
FIGS. 17a-17d show illustrations for elucidating the utilization of time segments in which the illumination pixels are switched off in order to be able to boost more image pixels.
Figure 17B:
Figure 17C:
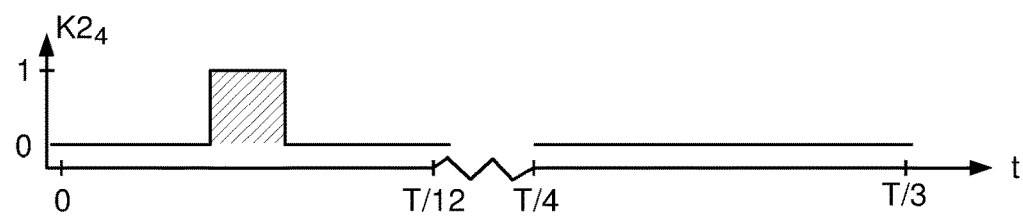
Figure 17D:

FIGS. 17a and 17b show the times at which the tilting mirrors $K1_4$ and $K1_5$, for the purpose of illumination, are switched on (=1) and are switched off (=0). The tilting mirror $K1_4$ is switched on during the time slot 1/2 and is switched off during the remaining time slots. The tilting mirror $K1_5$ is switched off throughout.

The tilting mirror $K2_4$ (=image pixel $K2_4$) is switched on during the time slot 1/2 in order to modulate the grayscale value 6. This is indicated by hatching since the tilting mirror $K2_4$ does not have to be in the on state (=1) during the entire time slot 1/2. During the other time slots 2/2, 2, 3, 4 and 5, the tiltable mirror $K2_4$ is permanently in the off state (=0).

The tilting mirror $K2_5$ (=image pixel $K2_5$) is switched on during the time slot 2/2 in order to modulate the grayscale value 66. This is indicated by hatching since the tilting mirror $K2_5$ does not have to be in the on state (=1) during the entire time slot 2/2. During the other time slots 1/2, 2, 3, 4 and 5, the tilting mirror $K2_5$ is permanently in the off state (=0).

As can be gathered from these illustrations in FIGS. 17a-17, the unavoidable stray illumination light from the tilting mirror $K1_4$ (or forwarded residual illumination light, even though the tilting mirror $K1_4$ is in the off state), which is incident on the tilting mirror $K2_5$ during the time slot 1/2, does not influence the modulation of the tilting mirror $K2_5$ for the boosted grayscale value 66 since the stray light is incident on the tilting mirror $K2_5$ only during a time segment in which the tilting mirror $K2_5$ is off and is not switched to the on state for modulation purposes. There is thus a temporal separation of the illumination at the edge of the boosted region, as a result of which more boostable pixels can be boosted and the brightness of the edge pixel K2 is better adapted to the brightness of the adjacent unboosted pixels (e.g. pixel $K2_3$) (see FIG. 16) in comparison with the embodiment in accordance with FIGS. 12-14.

In the case of the variant in accordance with FIG. 16, the edge pixels RBK2 are illuminated at least by means of the assigned main illumination pixel $K1_4$, $K1_{12}$, $K1_{19}$ and $K1_{23}$. However, the illumination (pixels $K1_5$, $K1_{11}$, $K1_{13}$, $K1_{18}$ and $K1_{24}$) for the directly adjacent boosted pixel $K2_5$, $K2_{11}$, $K2_{13}$, $K2_{18}$ and $K2_{24}$ is set to zero, which results in a non-optimum illumination of the edge pixels RBK2 ($K2_4$, $K2_{12}$, $K2_{19}$ and $K2_{23}$).

Figure 18:
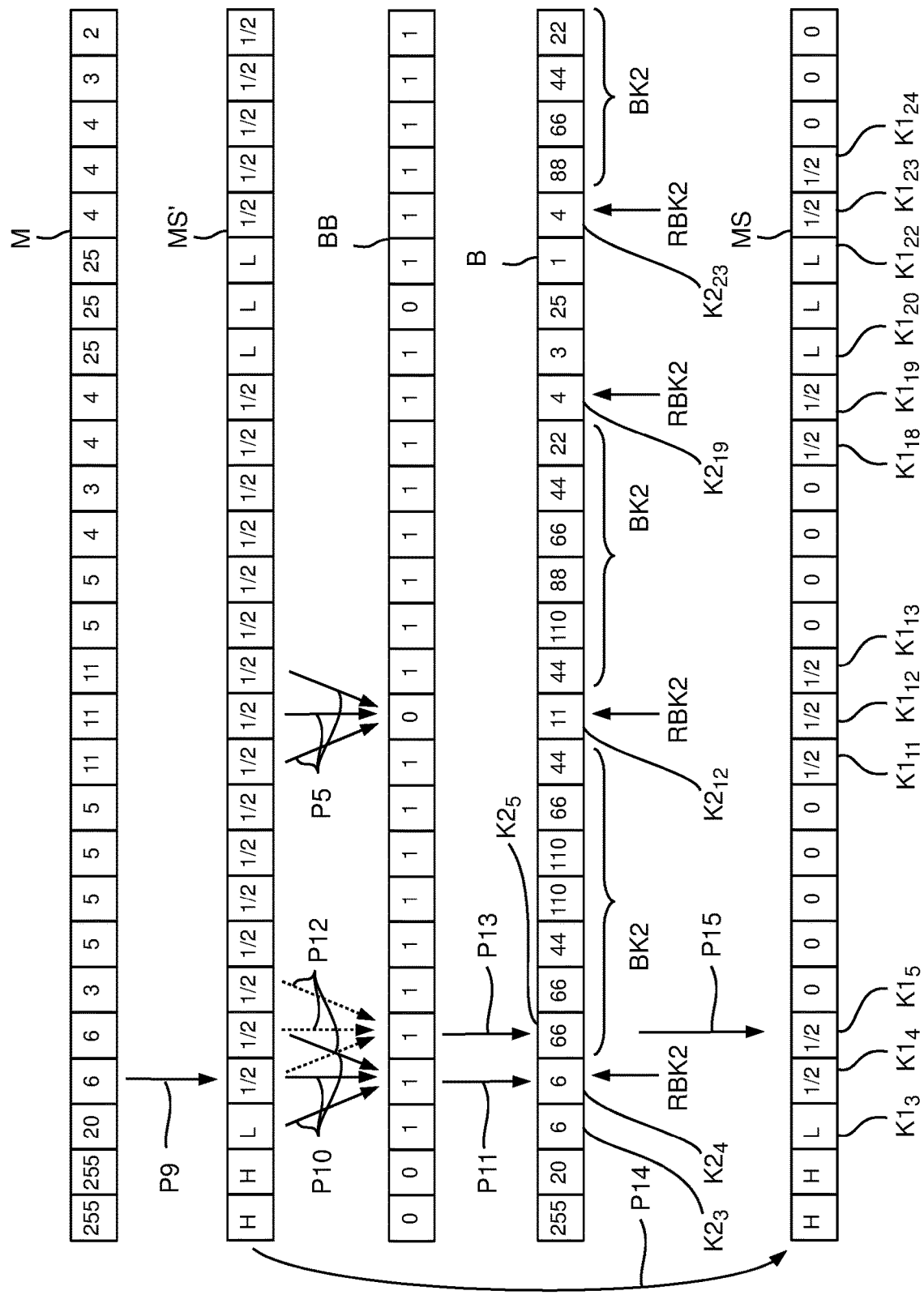
FIG. 18 shows an illustration in accordance with FIG. 16 for elucidating one development of the projector according to certain embodiments of the invention.

Since the threshold value is 10 and the boost factor is 22 in the case of the embodiment described here, the maximum brightness value of a boosted pixel is 220. This brightness value can be represented with the time segments 2/2, 2, 3, 4 and 5 for the illumination modulator 3, with the result that the time segment 1/2 is not required. That means, however, that the time segment 1/2 can also be set for main illumination pixels of boosted image pixels. In a development of the embodiment described in connection with FIG. 16, this is used in such a way that all three assigned illumination pixels of each edge pixel RBK2 are set at least to 1/2. This is shown in FIG. 18, which substantially corresponds to FIG. 16. Therefore, for the description of FIG. 18, reference is made to the explanations above. In contrast to the embodiment from FIG. 16, however, the illumination pixels $K1_5$, $K1_{11}$, $K1_{13}$, $K1_{18}$ and $K1_{24}$ are set to 1/2, with the result that the corresponding edge image pixels $K2_4$, $K2_{12}$, $K2_{19}$ and $K2_{23}$ are illuminated in each case by all three assigned illumination pixels and a sufficient illumination can thus be ensured. The adaption of the brightness of the illuminated edge pixels RBK2 to the brightness of the adjacent unboosted pixels is thus improved again in comparison with the embodiment in accordance with FIG. 16.

As has already been described above, the threshold value and the boost factor are chosen such that the maximum brightness value of a boosted pixel is 220 in order that all boost values can be represented without the time segment 1/2. However, it is also possible to define the threshold value and/or the boost factor such that for boosted pixels brightness values are present which are greater than 220 and for which the time segment 1/2 would thus be required. In this case, by way of example, boost values of greater than 220 can be represented only with the brightness value 220. The difference at the high brightness is imperceptible to an observer. Furthermore or alternatively, it is possible also to represent boost values of greater than 220 using the time segment 1/2 if all assigned first pixels are switched into the second state during the entire frame duration. This applies in particular to boosted pixels whose neighbors and possibly further neighbors are also all boosted pixels.

The description above took account of only the direct neighboring pixels of the main illumination pixel of the first modulator 3, such that in the case of the illustrations in accordance with FIGS. 12-14, 16, 17a-17d and 18, consideration is always given to three first pixels ($K1_3$, $K1_4$ and $K1_5$) for one second pixel ($K2_5$) in the line representation, which in accordance with FIG. 11, taking account of the planar embodiment of the modulators 3, 5, corresponds to nine first pixels of the image modulator 5 ($K1_{34}$, $K1_{35}$, $K1_{36}$, $K1_{44}$, $K1_{45}$, $K1_{46}$, $K1_{54}$, $K1_{55}$, $K1_{56}$) for one second pixel ($K2_{45}$). Of course, further neighboring pixels can also be taken into account, such that e.g. the two nearest neighbors are taken into account. In the line representation in accordance with FIGS. 12-14, 16, 17a-17d and 18, this then corresponds to five first pixels and, when taking account of the planar embodiment of the modulators 3, 5 in accordance with FIG. 11, these are then 25 first pixels.

Figure 19:
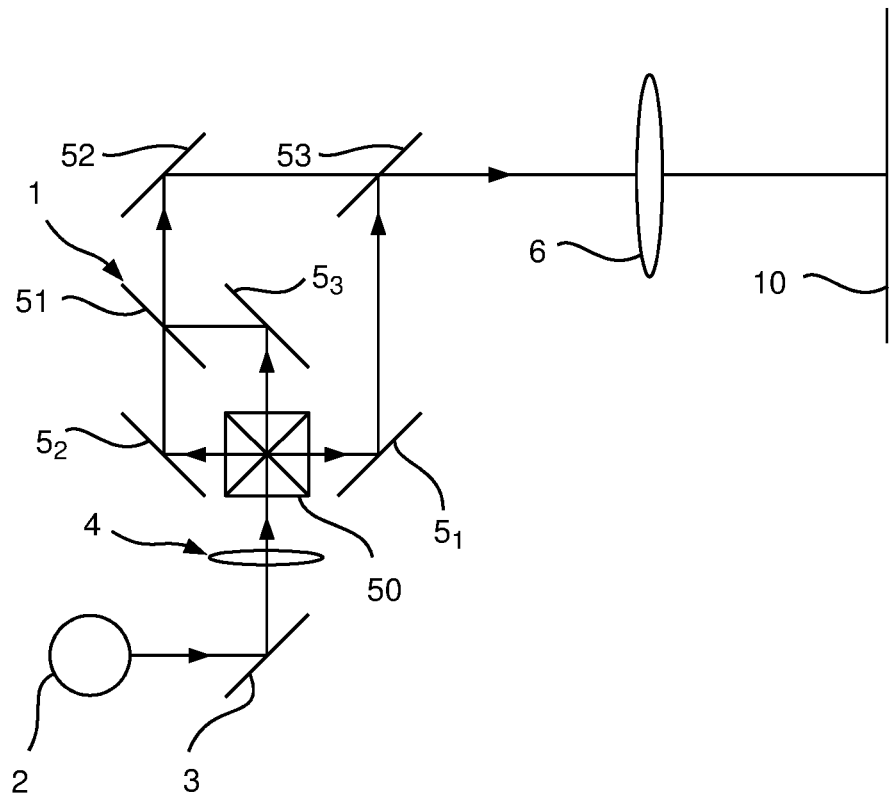
FIG. 19 shows a schematic illustration of a further embodiment of the projector according to certain embodiments of the invention.

FIG. 19 shows a modification of the projector 1 according to the invention in accordance with FIG. 1, identical elements being designated by identical reference signs. In order to simplify the illustration, the control unit 7 has not been depicted. In contrast to the projector in accordance with FIG. 1, three image modulators $5_1$, $5_2$ and $5_3$ and a color splitter cube 50 are provided in the case of the projector in FIG. 19. In this regard, red light can impinge on the image modulator $5_1$, green light can impinge on the image modulator $5_2$ and blue light can impinge on the image modulator $5_3$. The modulation of the image modulators $5_1$, $5_2$ and $5_3$ and of the illumination modulator 3 takes place in the same way as in the case of the projector 1 in accordance with FIG. 1. The light modulated by the image modulators $5_1$, $5_2$ and $5_3$ for the projection is superimposed by way of the two color splitters 51 and 53 and the deflection mirror 52 to form a common beam, which is imaged onto the projection surface 10 by means of the projection optical unit 6.

The light source 2 can emit white light, for example, which is modulated by means of the illumination modulator 3 and is then split in a wavelength-dependent manner on account of the color splitter cube 50 such that, as described, the image modulator $5_1$ is illuminated with red light, the image modulator $5_2$ is illuminated with green light and the image modulator $5_3$ is illuminated with blue light. In this case, the illumination of the image modulators $5_1$-$5_3$ can be carried out either time-sequentially or simultaneously. The assignment of the pixels of the illumination modulator 3 to the pixels of each image modulator $5_1$, $5_2$, $5_3$ can be present in the same way as in the case of the already described embodiments of the projector 1 according to the invention.

Figure 20:
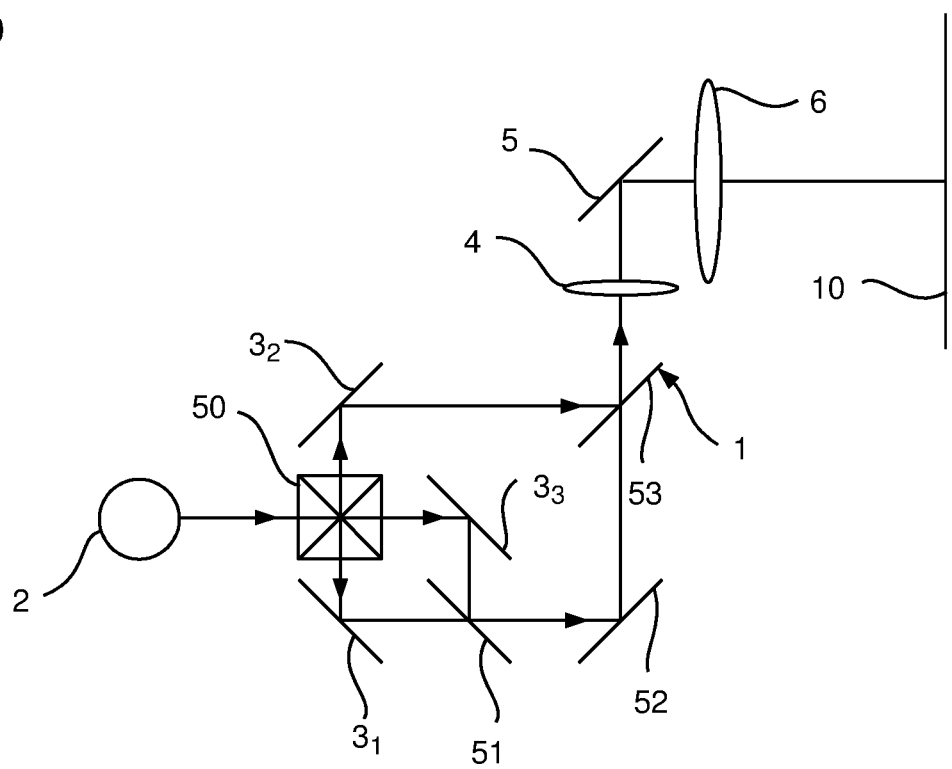
FIG. 20 shows a schematic illustration of a further embodiment of the projector according to certain embodiments of the invention.

FIG. 20 illustrates a modification of the projector 1 according to the invention in the same way as in FIG. 19. In contrast to the projector in accordance with FIG. 19, in the case of the projector in accordance with FIG. 20, three illumination modulators $3_1$, $3_2$ and $3_3$ are provided, which e.g. are provided for red illumination light (illumination modulator $3_1$), green illumination light (illumination modulator $3_2$) and blue illumination light (illumination modulator $3_3$) and respectively modulate the corresponding color. The impingement of red, green and blue light on the illumination modulators $3_1$-$3_3$ can be effected by way of the color splitter cube 50, on which white light from the light source 2 impinges. Via the color splitters 51 and 53 and the deflection mirror 52, the red, green and blue illumination light which is modulated is directed onto the image modulator 5. The light modulated by the image modulator 5 is imaged onto the projection surface 10 by way of the projection optical unit 6.

The illumination modulators $3_1$-$3_3$ can be driven such that the modulated green, blue and red illumination light impinges on the image modulator 5 time-sequentially. Alternatively, it is possible to direct the modulated green, blue and red illumination light simultaneously onto the image modulator 5. The assignment of the pixels of each illumination modulator $3_1$-$3_3$ to the pixels of the image modulator 5 can be present in the same way as in the case of the already described embodiments of the projector 1 according to the invention.

The projector 1 according to the invention can thus be configured such that N first modulators (wherein N is an integer greater than 1) are imaged onto one second modulator (in FIG. 19 N=3) or one first modulator is imaged onto M second modulators (wherein M is an integer greater than 1) (in FIG. 20 M=3). Furthermore, the projector 1 according to the invention can be configured such that N1 first modulators are imaged onto M1 second modulators, wherein N1 and M1 are in each case integers greater than or equal to 1 (N1 and M1 can be identical or different).

With the different types of boosting described, low grayscale or brightness values can be represented well. Difficulties can occur, however, if brightness adaptations have to be carried out in order to ensure a good image representation.

This can involve so-called shading, for example, which is used if the individual pixels on the projection surface are of different sizes and thus appear with different brightnesses to an observer. This can occur in the case of curved projection surfaces or in the case of projection arrangements comprising at least two projectors, the images of which are combined on the projection surface to form a larger overall image. In this case, the images of the individual projectors are often distorted in order to adapt the content of the respective image to that segment of the projection surface which is actually illuminated by the respective projector, said projection surface generally not being rectangular any longer (so-called warping).

In the case of shading, the image content at locations of pixels which are projected small on the projection surface is darkened (while maintaining the color), while the image content at locations of pixels which are projected large on the projection surface is not darkened or is darkened only little. The shading can be realized by way of a (digital) mask, which assigns a (color-neutral) attenuation to each pixel of the respective projector. The image of an individual projector can thus have a homogeneous brightness over the projected segment.

In the case of projection arrangements comprising at least two projectors, the image fields of the different projectors may be unequally bright. In order to adapt the brightnesses, brightness corrections can be assigned to the individual projectors in order to dim the corresponding images as a whole (not spatially resolved). For this purpose, each RGB value can be multiplied by a value of between 0 and 1; this value is fixed for each projector and can vary between different projectors.

Image regions of individual projectors typically overlap. If the projectors were operated with full brightness in these overlap regions, then the image content there would appear to be excessively bright. Therefore, the partial images contributed by the individual projectors are darkened within the overlap regions. This is called blending. The blending is generally realized by way of a digital blending mask for each projector. This mask allocates to each pixel of the projector a value regarding what proportion of the brightness (while maintaining the color) is intended to be represented.

As already described, the modulators 3, 5 are driven with a bit depth of 8 bits (driving with 10 bits is already possible as well).

If brightness values for dark image contents (e.g. having values of less than 5 in 8-bit implementation) are intended to be changed only by a few percent (e.g. 5%) on account of the difficulties described, this is not able to be imaged either in 8-bit implementation or in 10-bit implementation, as will become clear from the following example.

Given a gamma of 2.2, a grayscale value 5 in an 8-bit system corresponds just to 0.0175% of the maximum brightness for grayscale value 255. An attenuation by 5%, with a brightness of 0.0166%, corresponds to a grayscale level of 4.88 and thus remains at the value 5 as grayscale level both in an 8-bit system and in a 10-bit system. The attenuation is therefore not representable and thus not effective.

The higher the grayscale value and thus the brightness of a pixel, the lesser the extent to which this negative effect is perceptible. Precisely in the case of low brightness values, however, this effect results in distinctly visible artefacts and is disturbing for an observer.

In the overlap region or blending region of the image fields of two projectors, areas are then represented as excessively bright or excessively dark (or possibly even with color variation if the rounding errors for the individual values of an RGB triad turn out to be different). This may be irritating in moving scenes, in particular, since movements in the scene are superimposed by a stationary "pattern" in the blending regions. Particularly in flight simulation with rapid roll movements, this is critical and has the effect that the observer does not perceive the simulated situation in the same way as in reality.

If the projector is a system in which the individual modulator supplies a contrast of approximately 1000:1, then values up to grayscale 11 (in 8-bit implementation) can be boosted, as described thoroughly above. Consequently, the brightnesses down to grayscale level 0 cannot be subdivided into 11 gradations (as in an 8-bit system) or into 44 gradations (as in a 10-bit system), but rather into 256 gradations (if the modulator 3, 5 can be driven in 8-bit implementation) or into 1024 gradations (10-bit driving). That means that although the control unit 7 can drive the two modulators 3, 5 only with 8-bit or 10-bit implementation, the representable dark brightnesses can be gradated more finely by a multiple. Consequently, the control unit 7 is able to realize a higher bit depth in reality for the lower grayscale levels. If the brightness adaptation described is thus additionally undertaken in the control unit 7, then this can be transmitted to the modulators 3, 5 without losses (or with a significantly lower loss as a result of discretization) and may thus generate finer brightness gradations than would be possible with known solutions.

Figure 21:
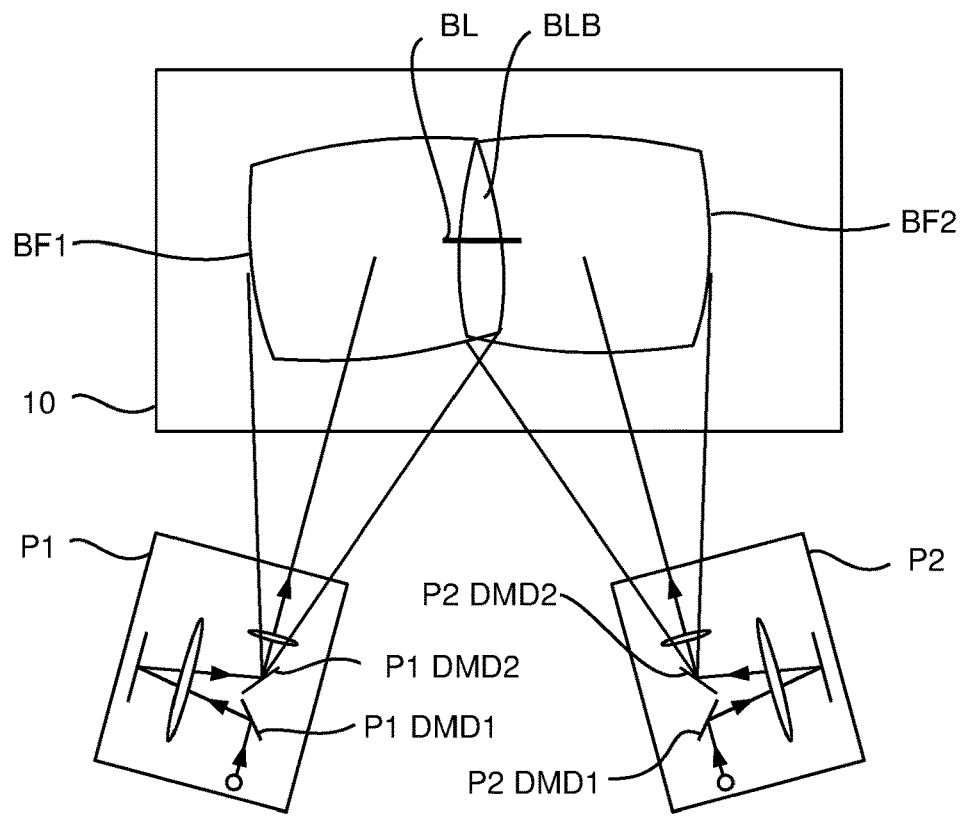
FIG. 21 shows a schematic illustration of a multi-projector device comprising two projectors.

Consideration is given to the blending region BLB between two image fields BF1 and BF2 of the projectors P1 and P2, as is illustrated schematically in FIG. 21. In this case, each of the projectors P1, P2 is constructed in the manner as shown e.g. in FIG. 1. The two image fields BF1 and BF2 of the projectors P1, P2 overlap in the blending region BB on the projection surface 10. The brightness profile along the sectional line BL depicted is considered below.

Figure 22:
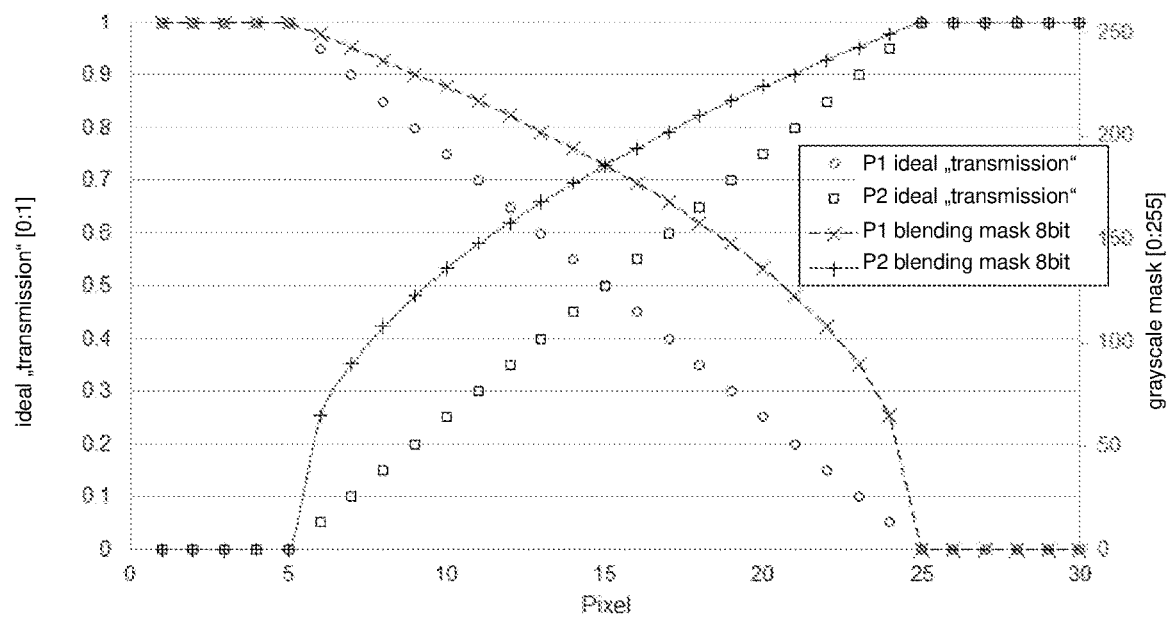
FIG. 22 shows a schematic illustration of the brightness profile along the sectional line from FIG. 21.

The blending region BLB extends along the sectional line BL over 20 pixels, with the result that each projector P1, P2 must dim its represented image from full brightness down to black over these 20 pixels. FIG. 22 shows, for the exemplary sectional line BL (blending edge), an ideal brightness decrease plotted against the projected pixels of the two projectors P1 and P2 (circles=ideal transmission for the projector P1 and squares=ideal transmission for the projector P2). This spatial profile of a "transmission" of the blending mask is to be simulated by a digital blending mask. Projectors P1, P2 having a gamma of 2.2 ($\gamma$=2.2) are assumed. The blending mask is coded in 8-bit implementation. In this case, the value of 255 corresponds to a "transmission" of 100%, i.e. the brightness of the pixels remains unchanged. For values of the blending mask of 0, the "transmission" is 0%, with the result that the brightness of the corresponding pixel is set to black. In accordance with a gamma of 2.2, the "transmission" for a mask value of 186 is precisely 50%. The corresponding values of the ideal transmission for the two projectors are also indicated in FIG. 23 in the columns ""Transmission" P1 ideal" and ""Transmission" P2 ideal" for the pixels 1-30. Furthermore, the mask values for the pixels 1-30 of the blending region BLB are represented in the columns "Mask P1 real 8-bit" and "Mask P2 real 8-bit", wherein the column "Mask P1 real 8-bit" is the mask for the projector P1 and the column "Mask P2 real 8 bit" is the mask for the projector P2.

If it were desired to represent e.g. a grayscale value of 7 (in 8-bit implementation) in the overall image of the projection arrangements comprising at least two projectors (or the multi-projector arrangement), then it is necessary to compute the grayscale value in the blending region BLB of the projectors P1 and P2 with the digital blending masks.

In the case of known solutions, these computed image data are transmitted to the projectors of known multi-projector arrangements—here in 8-bit implementation in the example (see FIG. 23). In order actually to be able to represent such dark image contents in accordance with an ideal gamma curve, the projectors must be configured such that they have a double modulation with boosting.

In our example, the contrast of an individual modulator is 1000:1. For the representation of grayscale level 7 in the blending region BLB, in both projectors P1, P2 in each case one of the two modulators 3, 5 is set to black (in the example, this is in each case the first modulator 3, which is designated by "P1 DMD1" and respectively "P2 DMD1" in FIG. 21). The respective second modulator 5 (here "P1 DMD2" and respectively "P2 DMD2") modulates the "residual light". The corresponding input grayscale values are indicated in FIG. 23 for the pixels 1-30 in the column "Grayscale values P1 real 8-bit" for the modulator "P1 DMD2" and in the column "Grayscale values P2 real 8-bit" for the modulator "P2 DMD2". The grayscale values on the respective second modulator 5 ("P1 DMD2" and "P2 DMD2") are in each case higher than the input values (or input grayscale values) in the corresponding projectors P1, P2 approximately by a factor of 23 (the "boost factor" is approximately 23), as can also be gathered from the column "P1 DMD2 [Boost]" for the second modulator "P1 DMD2" of the first projector P1 and from the column "P2 DMD2 [Boost]" for the second modulator "P2 DMD2" of the second projector P2 in FIG. 23.

The resulting brightnesses for the two projectors are shown in the columns "Brightness P1 real 8-bit" and "Brightness P2 real 8-bit" in FIG. 23. The sum of the brightnesses of the two projectors P1, P2 is presented in the column "Sum real 8-bit" in FIG. 23.

Figure 24:
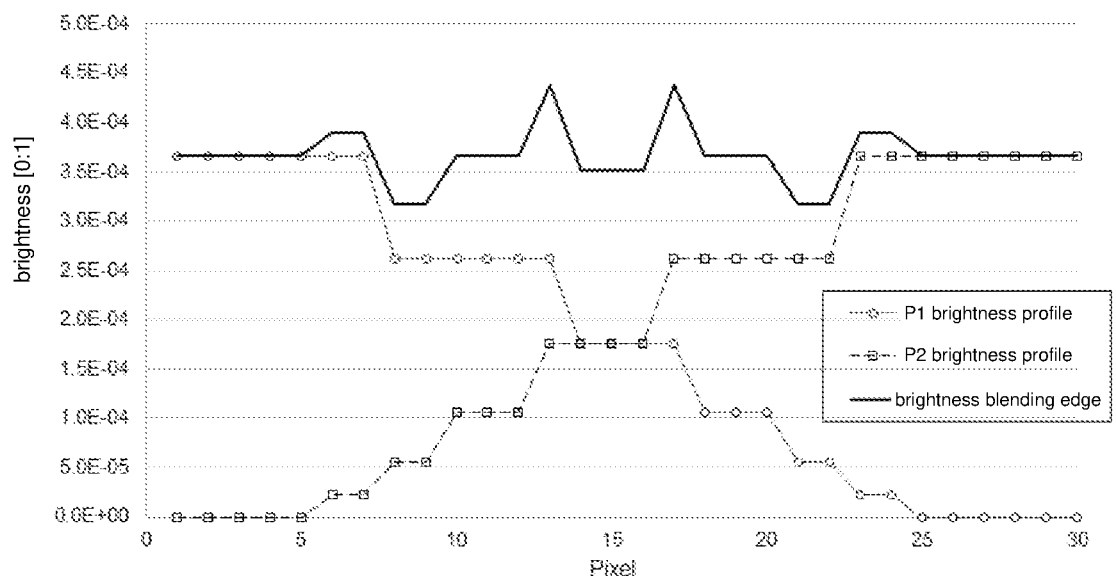
FIG. 24 shows a schematic illustration of the brightness profile along the sectional line from FIG. 21 for the known projector having the values in accordance with FIG. 23.

In FIG. 24, the solid line shows the resulting brightness profile over the blending edge BL, which brightness profile results from the brightness profile of the first projector P1 (circles) and the brightness profile of the second projector P2 (squares).

The example shows that undesired variations in the brightness over the blending edge BL (between −14% and +19%) are clearly visible and thus do not satisfy the demands of "invisible" crossblending between two projectors. This error in the represented brightness is furthermore indicated for the pixels 1-30 in the column "Error" in FIG. 23.

According to the prior art, even with projectors having a boosting capability, it is not possible to realize an "invisible" blending transition between two projectors for a grayscale value of 7.

If, according to the invention, the computation of the blending mask and the calculation of the boosting are combined in a computing unit (e.g. in the control unit 7) and only from there are the two image data transferred to the two image generators (or modulators) 3, 5 of a projector P1, P2, then a higher bit depth used in the computing unit can be used to simulate the dark grayscale levels with a higher accuracy than 8-bit implementation (or 10-bit implementation). In the example, grayscale level 7 (in 8-bit implementation=first resolution with NN levels, wherein NN=256) is once again computed with a blending mask (in 8-bit implementation). Each pixel of the projector P1, P2 can then be assigned a value with an accuracy of the internal bit depth (in the example 16-bit implementation=second resolution with MM levels, where MM=1800), as is illustrated in FIG. 25 for the pixels 1-30 of the blending region BLB.

The columns "Mask P1 real 8-bit" and "Mask P2 real 8-bit" include the same values for the pixels 1-30 of the blending region BLB as in FIG. 23. The columns "P1 (image*Mask) 16-bit" and "P2 (image*Mask) 16-bit" indicate the computed values with 16-bit resolution.

Since the grayscale value 7 to be represented is a boostable grayscale value, here as well one of the two modulators 3 5 is set to black once again for each projector P1, P2. The signal of the respective second modulators 5, 3 is once again output in 8-bit implementation (but increased again by a boost factor of approximately 23). In contrast to the prior art, therefore, an 8-bit grayscale value of between 0 and 7 (in accordance with the image data BD) is not allocated to a grayscale value of 0 and 255 (of the second modulator 5), rather a 16-bit grayscale value (from the columns "P1 (image*Mask) 16-bit" and "P2 (image*Mask) 16-bit") of between 0 and 1799 (grayscale level 7 in 16-bit representation) is allocated to a grayscale value of 0 to 255 (of the second modulator 5). The grayscale values thus determined are indicated for the pixels 1-30 of the blending region BLB in the columns "P1 DMD2 Boost" and "P2 DMD2 Boost".

Figure 26:
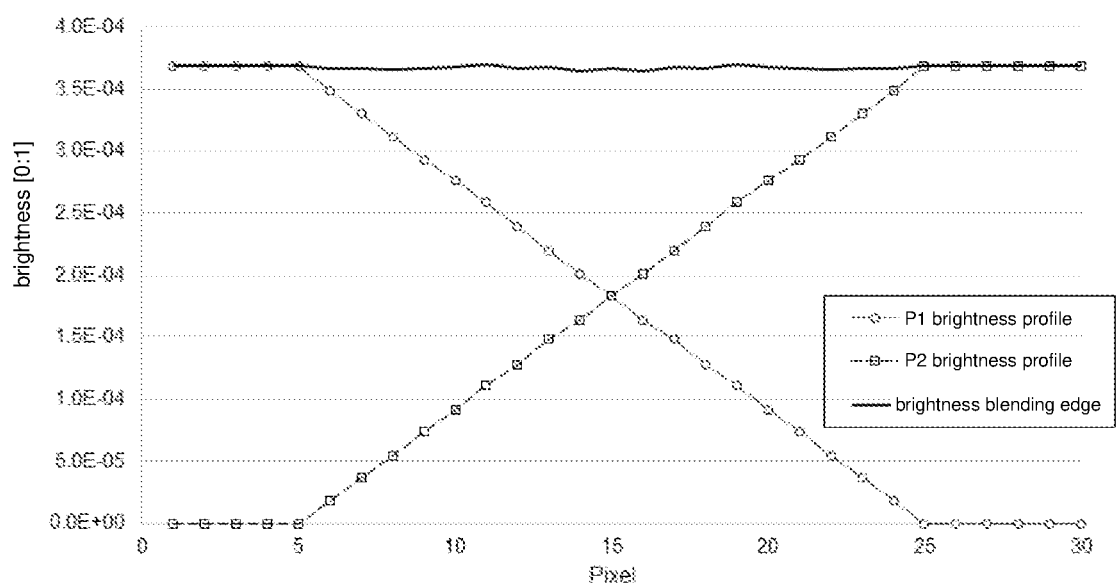
FIG. 26 shows a table having brightness and mask values for a projector according to certain embodiments of the invention comprising two modulators.

Thus, 8 values are no longer mapped onto 256, rather 1800 values are mapped onto 256. A better reproduction of the brightnesses actually required is possible in this way. The result of such a blending transition is illustrated in FIG. 26. In this case, the solid line shows the resulting brightness profile over the blending edge, said brightness profile resulting from the brightness profiles of the first projector (circles in FIG. 26) and the second projector P2 (squares in FIG. 26).

The resulting brightnesses for the two projectors (columns "Brightness P1 real 8-bit" and "Brightness P2 real 8-bit") and also the sum of the brightnesses of the two projectors P1, P2 (column "Sum real 8-bit") are also illustrated in FIG. 25.

The maximum error of the brightnesses for a blending region BLB with the projectors P1, P2 according to the invention is less than 1%, as can be gathered in particular from the column "Error" in FIG. 25.

For a blending region in which more than two projectors participate in the case of known multi-projector arrangements, the disturbance in the blending region for dark scenes is distinctly more dramatic still and the advantage afforded by the solution according to the invention becomes even clearer.

The explanations have been presented for projectors P1, P2 which can take up and process 8 bits. However, the effects remain visible for 10-bit systems as well (both the artefacts described and the achievable improvements).

It is furthermore possible to carry out the computations directly in a computing unit (e.g. in an ASIC) of one of the two modulators 3, 5—for example in the one which effects boosting. In that case, the computing unit merely also has to have an output that makes the corresponding image information (e.g. once again in 8-bit or 10-bit implementation with completely normal video data lines) available to the other modulator. It would be advantageous here to be able directly to use the high bit depth of the computing unit (which is typically 16 bits or more).

Preferably, the decision as to whether or not a pixel is boosted is taken on the basis of the computed value with 16-bit resolution indicated in the columns "P1 (image*Mask) 16-bit" and "P2 (image*Mask) 16-bit". This value is compared with a corresponding boost threshold value in 16-bit resolution (which corresponds to the first threshold value according to the description above, except with higher resolution). If the value is greater than zero and less than the boost threshold value (which can be e.g. 2816 in 16-bit resolution), the value is boosted. This is thus converted or mapped into an 8-bit value that is higher than the 8-bit value that results when the brightness reduction of the corresponding mask P1, P2 is calculated in 8-bit implementation. If the value is greater than the boost threshold value, the value is not boosted and is converted or mapped into the corresponding 8-bit value without any additional increase.

The term overlap region can denote identical area portions of the projection surface 10 which are illuminated by more than one projector. The term blending region can denote the region in which a projector is dimmed from 100% to 0% by way of the blending mask. Often, both regions are identical (but need not be if there is great distortion on account of very oblique projection of the projected image). The blending region is assumed to be e.g. 100-150 pixels along the blending edge BL. However, the compromise between achievable total brightness of the system (small blending region) and as "smooth" a blending region as possible (many pixels) will often be chosen. Therefore, the blending region along the blending edge BL can be 10-200 pixels, 20-180 pixels or 30-150 pixels.

A description is given below of the boosting according to the invention with the higher resolution for a representation with maximum color fidelity even for low brightnesses. Insofar as boosting is described here, this can be carried out in the manner already described with the higher resolution if a brightness change is intended to be carried out in order to realize e.g. shading and/or blending. Such shading and/or blending or some other additional brightness change will not be described in detail once again below, however, since the same disadvantages as already described occur and the same advantages as already described are achieved.

Figure 27:
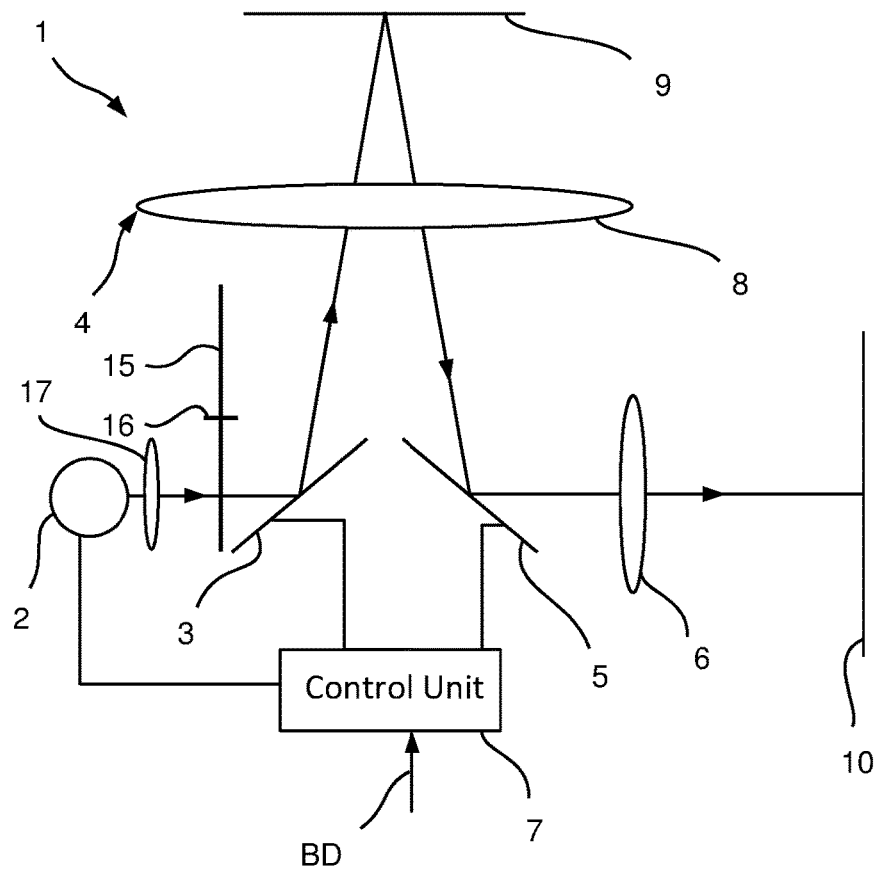
FIG. 27 shows a schematic illustration of one embodiment of the projector according to certain embodiments of the invention.

In the embodiment shown in FIG. 27, the projector 1 according to the invention for projecting images for a predetermined frame duration in each case comprises a light source 2, an illumination optical unit 17, an illumination modulator 3, an imaging optical unit 4, an image modulator 5, a projection optical unit 6 and also a control unit 7.

The two modulators 3, 5 are each embodied as a tilting mirror matrix (also called DMD hereinafter) having a plurality of tilting mirrors arranged in rows and columns, wherein the tilting mirrors can be brought to a first and a second tilting position independently of one another.

Figure 28:
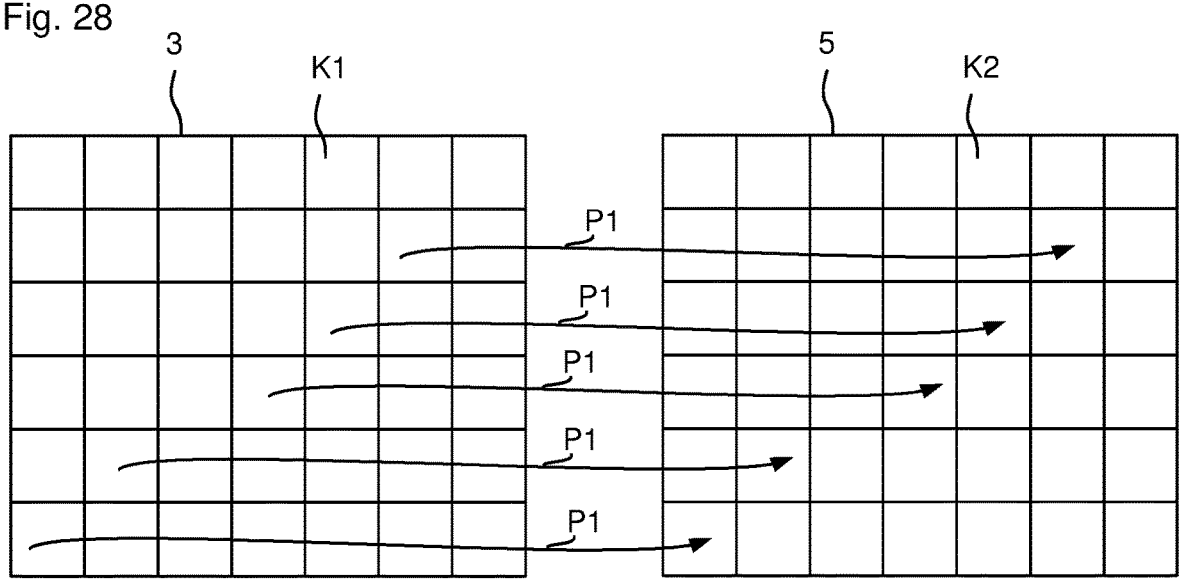
FIG. 28 shows a schematic illustration for elucidating the assignment between the first pixels of the first modulator and the second pixels of the second modulator.

In the exemplary embodiment described, the illumination modulator 3 has a plurality of tilting mirrors K1 (also called illumination pixels hereinafter) and the image modulator 5 has a plurality of tilting mirrors K2 (also called image pixels hereinafter). FIG. 28 illustrates schematically in each case 6×7 tilting mirrors K1, K2. The tilting mirrors K1 and K2 each have identical dimensions, the small number of tilting mirrors K1 and K2 being assumed merely to simplify the illustration. The modulators 3, 5 can, of course, contain very many more tilting mirrors K1, K2 than illustrated.

The imaging optical unit 4 is embodied as a 1:1 imaging optical unit comprising a lens 8 and a mirror 9 and images each tilting mirror K1 of the illumination modulator 3 exactly onto one tilting mirror K2 of the image modulator 5, as is indicated by the arrows P1. Consequently, exactly one image pixel K2 of the image modulator 5 is assigned to each illumination pixel K1 of the illumination modulator 3 on account of the imaging by means of the imaging optical unit 4. It can also be stated that exactly one illumination pixel K1 is assigned to each image pixel K2.

The two modulators 3 and 5 are driven by the control unit 7 on the basis of supplied image data BD for each of the images to be projected successively such that the illumination modulator 3, on which the light (e.g. white light) from the light source 2 impinges, is a light source modulated in a planar fashion for the image modulator 5, which generates or modulates the image to be projected, which is then projected onto a projection surface 10 by means of the projection optical unit 6. In order to provide the light source modulated in a planar fashion, the projector 1 is configured such that the light reflected by the tilting mirrors K1 of the illumination modulator 3 that are in the first tilting position is imaged onto the assigned tilting mirror K2 of the image modulator 5. The light reflected by the tilting mirrors K1 of the illumination modulator 3 that are in the second tilting position is absorbed by a beam trap (not shown) and is thus not imaged onto the image modulator 5. The image generation or modulation is then effected by means of the tilting position of the image pixels (=tilting mirrors K2 of the image modulator 5) since only the light reflected by the image pixels K2 that are in the first tilting position is projected onto the projection surface 10 by way of the projection optical unit 6. The light reflected by the image pixels K2 that are in the second tilting position is not projected onto the projection surface 10, but rather absorbed e.g. in a beam trap (not shown). The image to be projected is thus modulated or generated by way of the tilting position of the image pixels K2, said image being projected by means of the projection optical unit 6. The first tilting position can also be referred to as the on state and the second tilting position can also be referred to as the off state.

Figure 29:
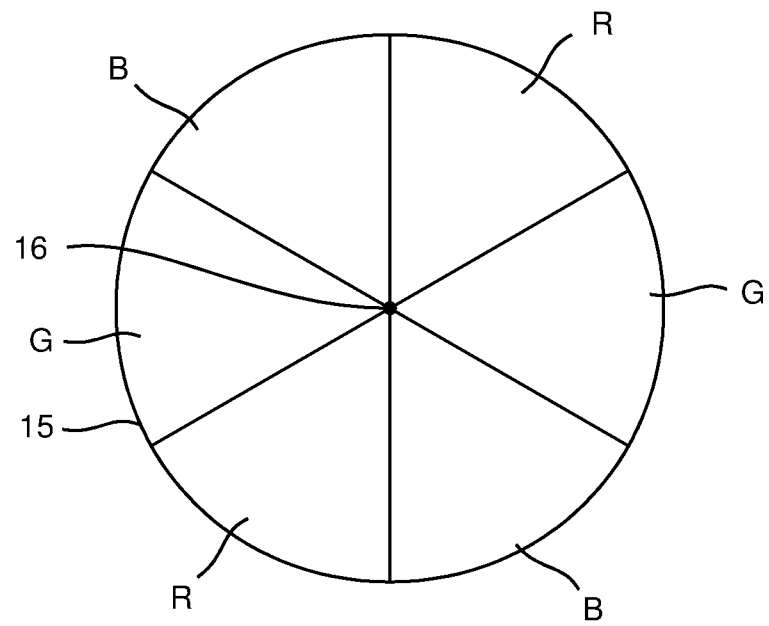
FIG. 29 shows a schematic illustration of the color wheel from FIG. 27.

For colored image generation, a color wheel 15 can be arranged in the beam path between the light source 2 and the first modulator 3. The colors are generated time-sequentially by way of the color wheel 15, which is illustrated schematically with its rotation axis 16. FIG. 29 shows a plan view of the color wheel 15 having six equally sized color segments (which thus extend over an angular range of 60°). The color segments are designated by the upper case letters R, G and B. This is intended to clarify that the corresponding color segment transmits only the red color (at R), the green color (at G) and the blue color (at B), with the result that from the white light from the light source 2 time-sequentially red, green or blue light is incident on the illumination modulator 3. Consequently, red, green and blue partial images can be projected temporally successively by means of the two modulators 3, 5. Said partial images are generated successively in time so rapidly that only the superimposition and hence a color image is perceptible to an observer. This can be achieved, given an image rate or frame rate of f=60 Hz, for example, by the color wheel 15 rotating at a frequency of 120 Hz. As a result, there are four red passes, four green passes and four blue passes within one frame. For each color transition, 15° is subtracted, the so-called spoke. During this time duration, the two modulators 3, 5 are switched to be dark in order to prevent an undefined color projection since a color segment boundary of the color wheel 15 is actually crossing the illumination light. Four time segments with a color wheel segment size of 45° thus remain for a color modulation per color (red, green and blue).

Figure 30:
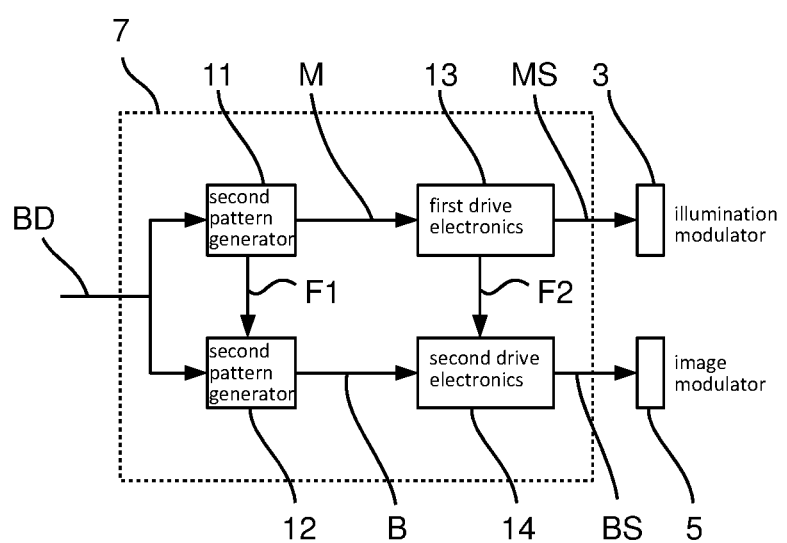
FIG. 30 shows a schematic illustration of the control unit from FIG. 27 for elucidating the generation of pulse-width-modulated pattern and image control data.

The image data BD are present already in digital form with the suitable pixel resolution for the image modulator 5 and are applied simultaneously to a first and a second pattern generator 11 and 12 in the control unit 7, as is shown schematically in FIG. 30. The first pattern generator 11 generates pattern data M on the basis of the supplied image data BD, said pattern data being applied to first drive electronics 13. The first drive electronics 13 generate, on the basis of the pattern data M, pulse-width-modulated illumination control data MS and apply the latter to the illumination modulator 3.

The second pattern generator 12 generates frame data B on the basis of the supplied image data BD, said frame data being applied to second drive electronics 14 for the image modulator 5. The second drive electronics 14 generate pulse-width-modulated image control data BS and apply them to the image modulator 5.

In accordance with the illumination and image control data MS, BS, during the frame duration T for generating the image, the illumination and image pixels K1, K2 are brought to the first and second tilting positions such that the desired image is generated and projected.

As a result of the two modulators 3, 5 being connected in series and as a result of the generation of the illumination and image control data MS, BS as described below, an improvement during the color representation at low brightness values which is a correct as possible is achieved during operation of the projector 1.

Figure 31:
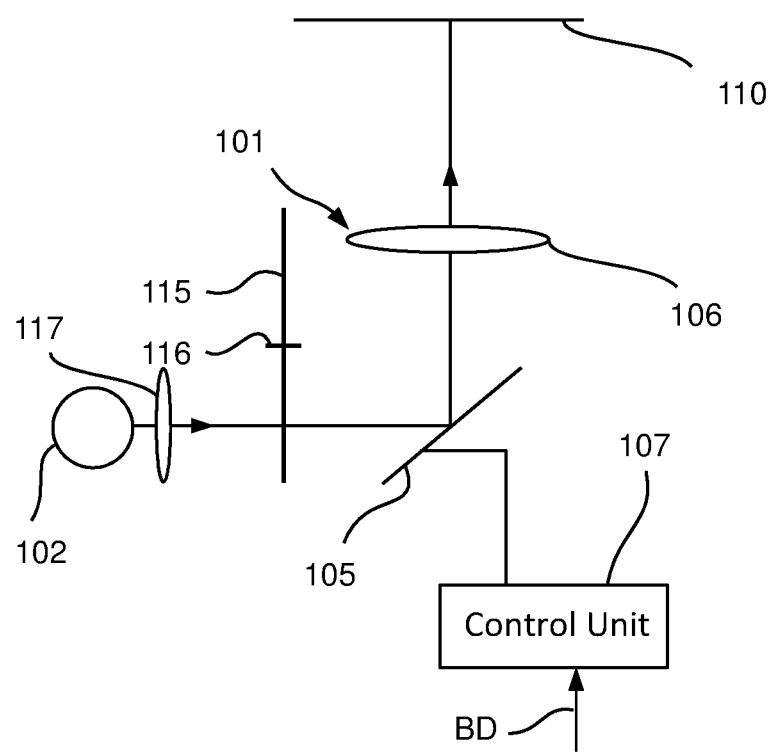
FIG. 31 shows a schematic illustration of a known projector with single modulation.

Projector 101 with Single Modulation in Accordance with FIG. 31

To afford a better understanding of the projector 1 according to the invention, a description is given below of a projector 101 with single modulation, comprising only one modulator 105, used as image modulator (FIG. 31). This projector 101 with single modulation (also referred to hereinafter as 1×DMD prior art) comprises a light source 102, an illumination optical unit 117 and a projection optical unit 106, wherein the modulator 105, which can be embodied as a tilting mirror matrix, is illuminated with light from the light source 102 which has passed through a color wheel 115. The color wheel 115 can be embodied like the color wheel 15, such that the modulator 105 is illuminated time-sequentially with red, green and blue light. The modulator 105 modulates the red, green and blue light temporally successively by means of the mutually independently drivable tilting mirrors of the modulator 105 in order to generate color partial images, which are projected onto a projection surface 110 by means of the projection optical unit 106 and are able to be perceived by an observer only jointly as one color image. The modulation is controlled by a control unit 107 on the basis of supplied image data BD such that a desired brightness and color are achieved for each pixel. The light from the light source 102 is thus guided to the projection surface 110 only once via the modulator 105.

The spectrum S(λ) following a single modulation can be described as follows:

$$S_1(\lambda, g_1) = \int_\Omega d\Omega \int_{Frame} dt \Sigma_{colors\ c\in(r,g,b)} I(\Omega,t,\lambda) \cdot T_B(\Omega,\lambda) \cdot T_C(\Omega,c,\lambda) \cdot D_1(\Omega,t,c,\lambda,g_1) \cdot T_P(\Omega,\lambda) \quad (1)$$

with c color; for example red, green and blue (r, g, b)

$g_1$ grayscale value represented at the image generator or modulator 105, can be numerical triad for r, g, b $D_1(\Omega, t, c, \lambda, g_1)$ transmission or reflection of the image generator 105

$I(\Omega, t, \lambda)$ intensity of the light source 102 t time variable $T_B(\Omega, \lambda)$ transmission of the illumination optical unit 117

$T_C(\Omega, c, \lambda)$ transmission of all color splitters and combiners (here color wheel 115)

$T_P(\Omega, \lambda)$ transmission of the projection optical unit 116

λ wavelength; for example 400 nm to 700 nm

Ω solid angle

The angle dependence of the individual optical elements can typically be eliminated by using an average value over the solid angle Ω in the calculations. Furthermore, the transmissions of the imaging optical units (illumination, projection) can be combined to form a single function: $T_O(\lambda)$ (already averaged over the solid angles). This results in:

$$S_1(\lambda, g_1) = \int_{Frame} dt \Sigma_{c\in(r,g,b)} I(t,\lambda) \cdot T_O(\lambda) \cdot T_C(c,\lambda) \cdot D_1(t,c,\lambda,g_1) \quad (2)$$

In order to convert the represented spectrum of a pixel in terms of color and brightness, use is made of the standard spectral value functions $\bar{x}(\lambda)$, $\bar{y}(\lambda)$ and $\bar{z}(\lambda)$, as described e.g. in DIN EN ISO 11664-1. These are multiplied in each case by the spectra $S(\lambda, g_1)$ and integrated over the wavelengths λ, in order to determine the color values X, Y and Z:

$$X(g_1) = \int_\lambda d\lambda S_1(\lambda, g_1) \cdot \bar{x}(\lambda) \quad (3)$$

$$Y(g_1) = \int_\lambda d\lambda S_1(\lambda, g_1) \cdot \bar{y}(\lambda) \quad (4)$$

$$Z(g_1) = \int_\lambda d\lambda S_1(\lambda, g_1) \cdot \bar{z}(\lambda) \quad (5)$$

The color values are often combined in a vector:

$$\vec{X}(g_1) = \begin{pmatrix} X(g_1) \\ Y(g_1) \\ Z(g_1) \end{pmatrix} \quad (6)$$

The color locus (x, y)($g_1$) of a pixel (as a function of the grayscale value $g_1$) then results as:

$$x(g_1) = \frac{X(g_1)}{X(g_1) + Y(g_1) + Z(g_1)} \quad (7)$$

$$y(g_1) = \frac{Y(g_1)}{X(g_1) + Y(g_1) + Z(g_1)} \quad (8)$$

The brightness of the pixel is described by $Y(g_1)$. Brightness and color locus are often in turn described as a vector:

$$\vec{L}(g_1) = \begin{pmatrix} Y(g_1) \\ x(g_1) \\ y(g_1) \end{pmatrix} \quad (9)$$

The spectra of the individual components of the projector 101 in accordance with FIG. 31 are illustrated in FIGS. 32 to 35. It was assumed here that the DMD 105 has a contrast of 1500:1 in the white.

Figure 32:
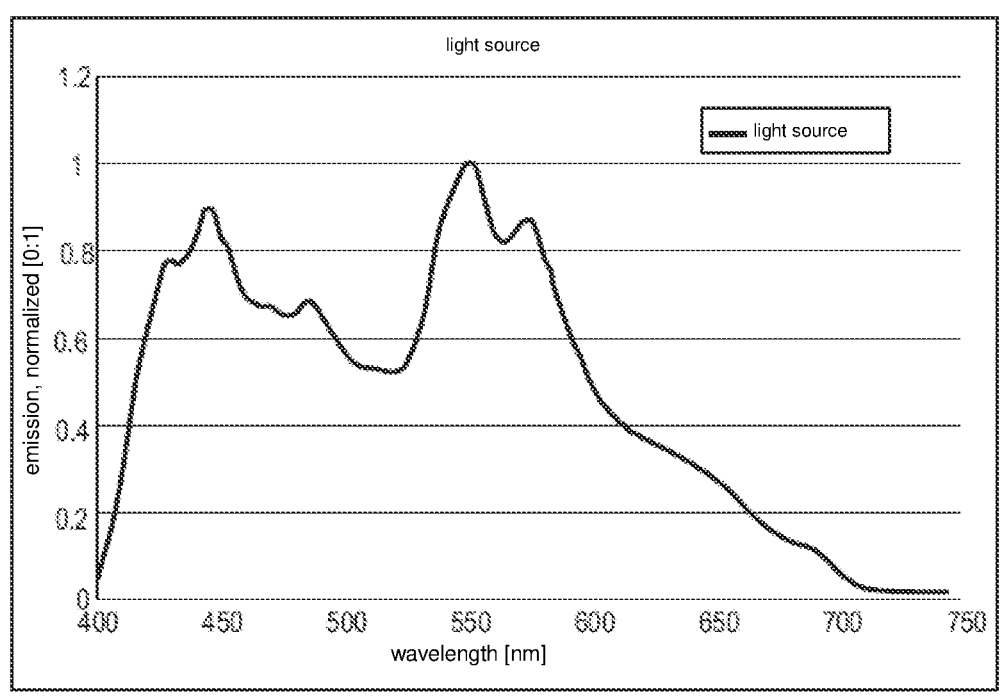
FIG. 32 shows the emission spectrum—normalized to 1—of the light source from FIG. 31.
Figure 33:
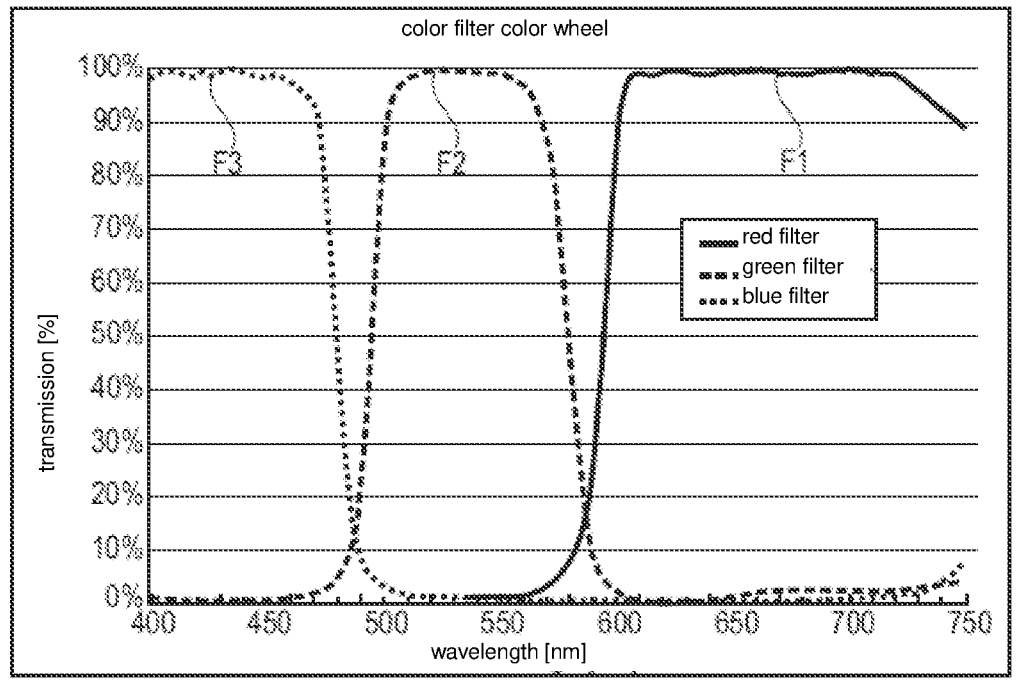
FIG. 33 shows the transmission spectra of the red, green and blue color wheel segments of the color wheel, the transmission being plotted linearly along the y-axis.
Figure 34:
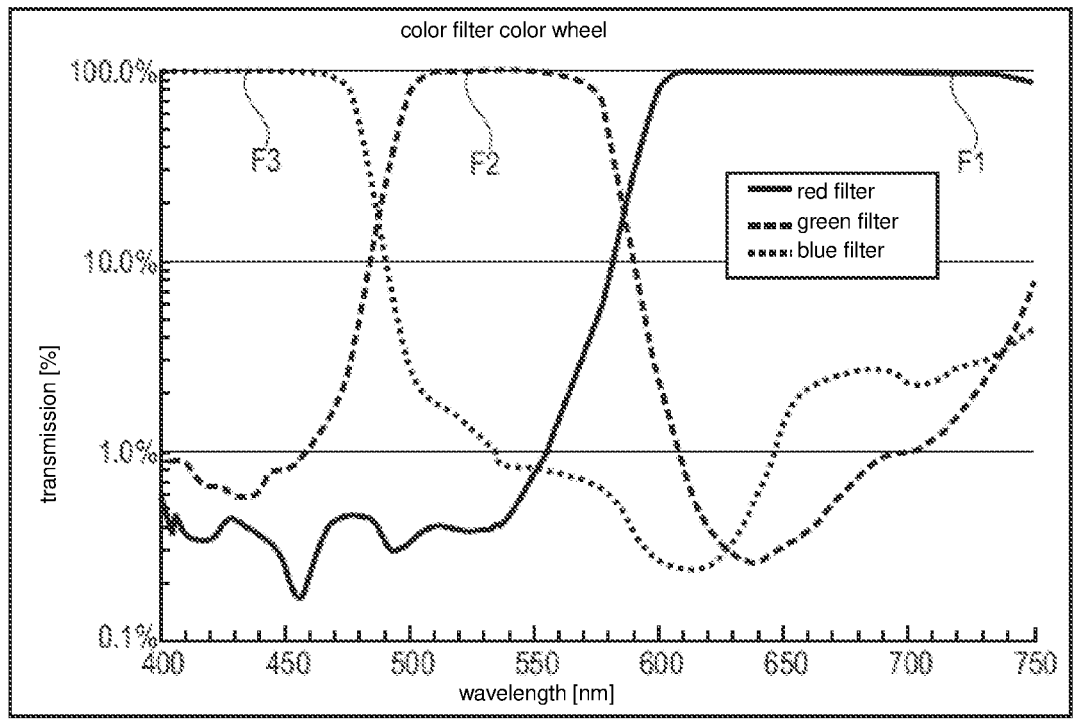
FIG. 34 shows the transmission spectra of the red, green and blue color wheel segments of the color wheel, the transmission being plotted logarithmically along the y-axis.

FIG. 32 shows the emission spectrum of the light source 102 normalized to 1, wherein the wavelength in nm is plotted along the x-axis and the emission normalized to 1 is plotted along the y-axis. FIGS. 33 and 34 each show the transmission spectra of the red color wheel segment (solid line F1), of the green color wheel segment (dashed line F2) and of the blue color wheel segment (dotted line F3) of the color wheel 15 and 115, wherein in FIG. 33 the transmission is plotted linearly along the y-axis and in FIG. 34 the transmission is plotted logarithmically along the y-axis. The wavelength in nm is in each case plotted along the x-axis.

Figure 35:
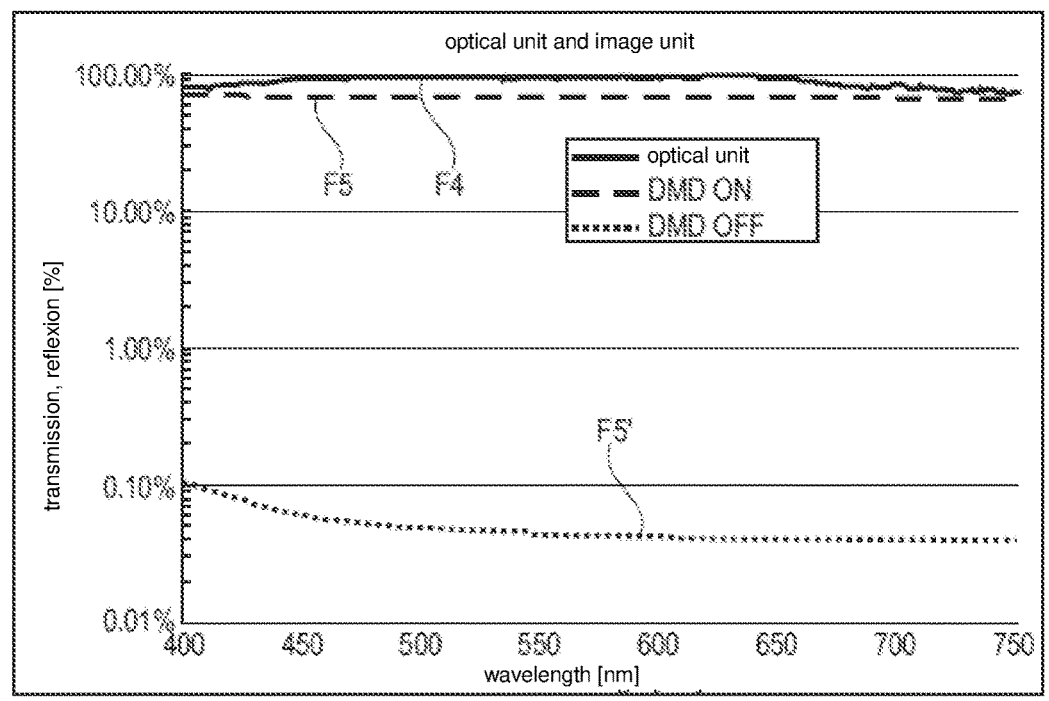
FIG. 35 shows a logarithmic representation of the transmission spectrum of the projection optical unit and of the modulator in the ON state and in the OFF state.

In FIG. 35, in a logarithmic representation, the transmission spectrum of the projection optical unit 106 as solid line F4 and the reflection spectrum of the modulator 105 in the on state as dashed line F5 and in the off state as dotted line F5' are plotted along the y-axis as a function of the wavelength in nm along the x-axis.

For such a system, it is possible to determine the spectrum as a function of the grayscale values $g_r$, $g_g$ and $g_b$ as follows:

$$S_{1DMD}(\lambda, g_r, g_g, g_b) = \int_{Frame} dt \Sigma_{colors\ c\in(r,g,b)} I(\lambda) \cdot T_T(c,\lambda) \cdot D_1(t,\lambda,g_r,g_g,g_b) \cdot T_O(\lambda) \quad (10)$$

In this case, the spectrum for $D_1$ can correspond to that for the ON state or for the OFF state, depending on the chosen grayscale values for the individual colors.

Figure 36:
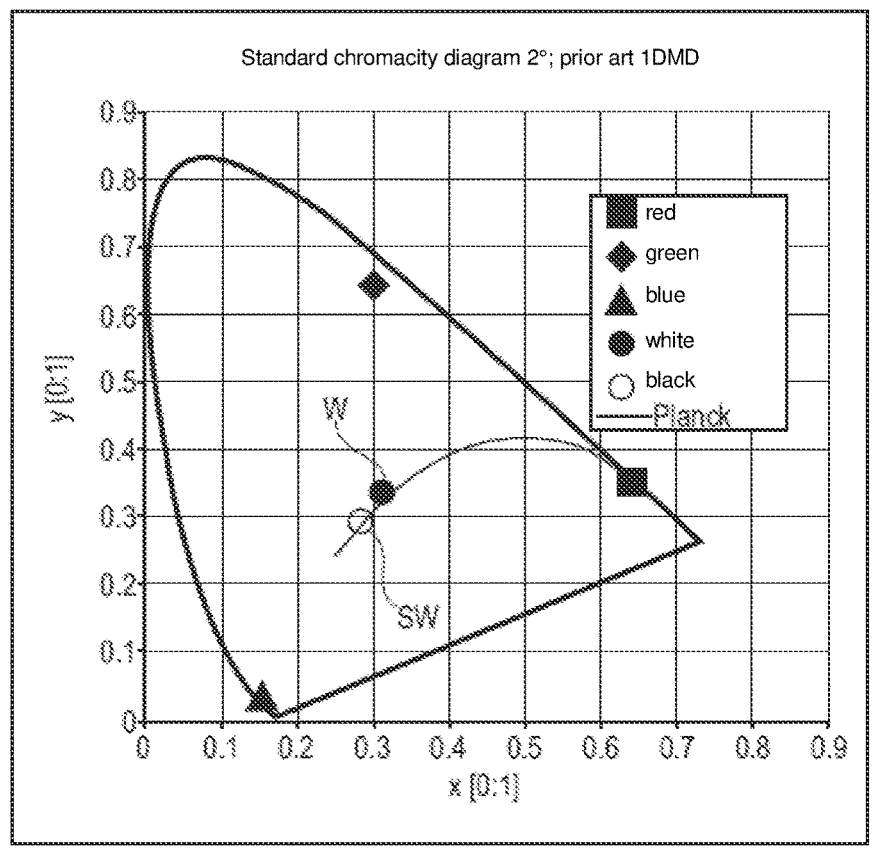
FIG. 36 shows the resulting color space of the projector in accordance with FIG. 31 in a standard chromaticity diagram of the CIE standard colorimetric system.

With the aid of the formulae demonstrated above, for the individual colors it is possible to determine the spectrum and the color loci therefrom. The resulting color space of the projector 101 with single modulation is illustrated in FIG. 36 in a standard chromaticity diagram (for an observer looking at a field of view of 2°) of the CIE standard colorimetric system, wherein the color space of the projector 101 covers all color loci in a triangle having the vertices red, green and blue. In addition, the curve of the radiation of a black body (designated by Planck) is also depicted in FIG. 36. If it is assumed that the proportions of the red, green and blue segments are 41%, 29% and 30%, then the depicted white point W results. The color locus SW is additionally entered, this resulting if the modulator 105 is at black (OFF state) for the entire time of a frame.

Figure 37:
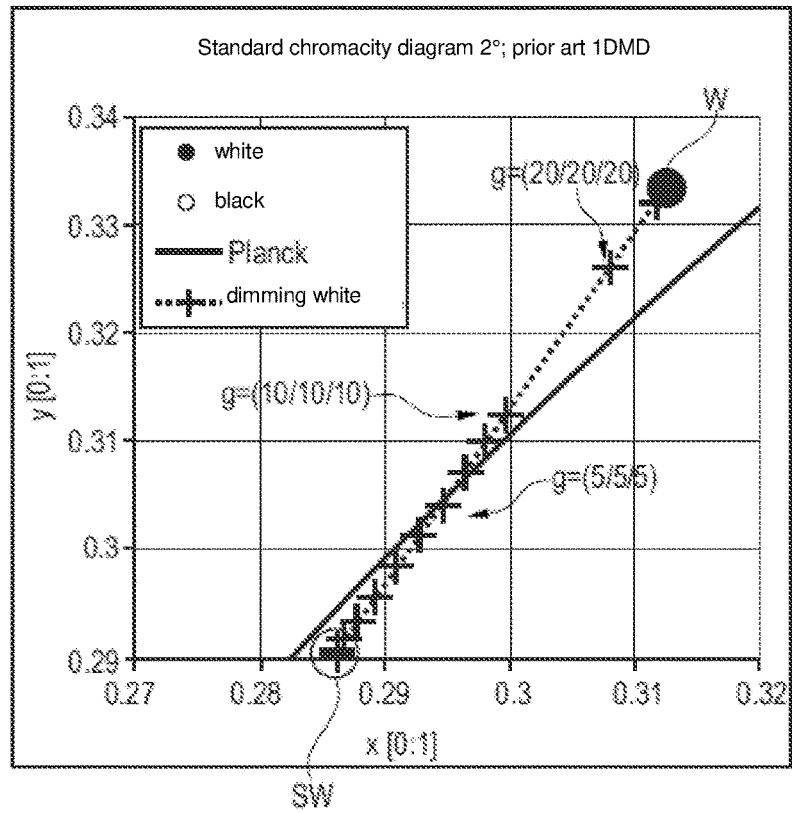
FIG. 37 shows an enlarged illustration of a detail from the illustration in accordance with FIG. 36.

The formula indicated can be used to calculate what color loci and brightnesses result for a dimming of the white triad (255/255/255). Ideally, the color locus does not change in the event of dimming. For white (255/255/255) the color locus should always be the white point. FIG. 37 shows a magnified illustration of the range for 0.29≤y≤0.34 and 0.27≤x≤0.32 from the color space from FIG. 36, wherein the color loci for the gray triads for g (20/20/20) to g (0/0/0) (that is to say the white values dimmed down to zero) are depicted as "+" signs. This reveals, however, that for one gray triad (20/20/20) already the color deviation (Δxy) in x and y is greater than a typically assumed perception threshold of 0.003 (given a gamma of 2.2; formula regarding gamma is indicated in the description further below, e.g. formula 15; $\Delta xy = \sqrt{x^2 + y^2}$).

Figure 38:
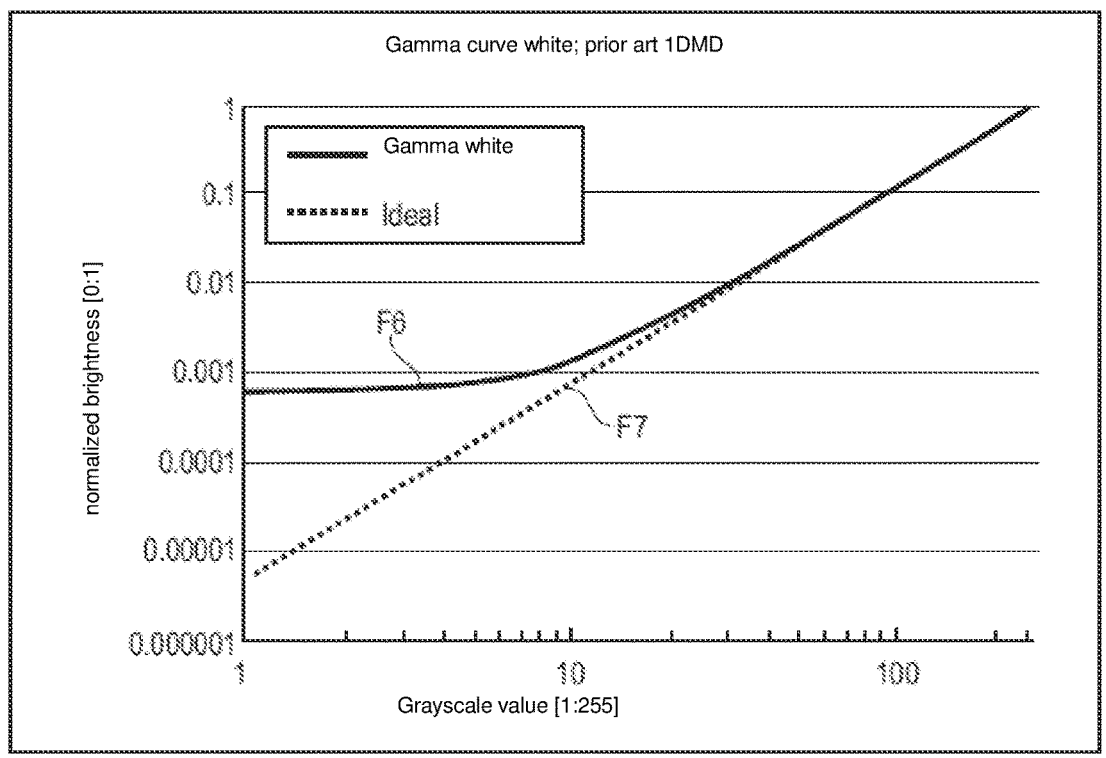
FIG. 38 shows the profile of the gamma curve for the projector in accordance with FIG. 31.

FIG. 38 shows the brightnesses ascertained using the above formula for the exemplary projection system according to the prior art as γ-curve F6 (gamma curve F6) for white, the grayscale values, which can assume values of 1 to 255, being plotted along the x-axis and the brightness maximized to 1 being plotted along the y-axis. The gamma curve F6 is the solid line and the ideal gamma curve F7 is depicted as a dotted line.

The shown color loci g (20/20/20), g (10/10/10), g (5/5/5) for the dimming in FIG. 37 and also the profile of the gamma curve F6 in FIG. 38 show that the projector 101 with single modulation is e.g. not suitable for a multi-projector arrangement since an "invisible" superimposition of two edge regions of the projected images from two (or more) projectors is not possible.

Figure 39:
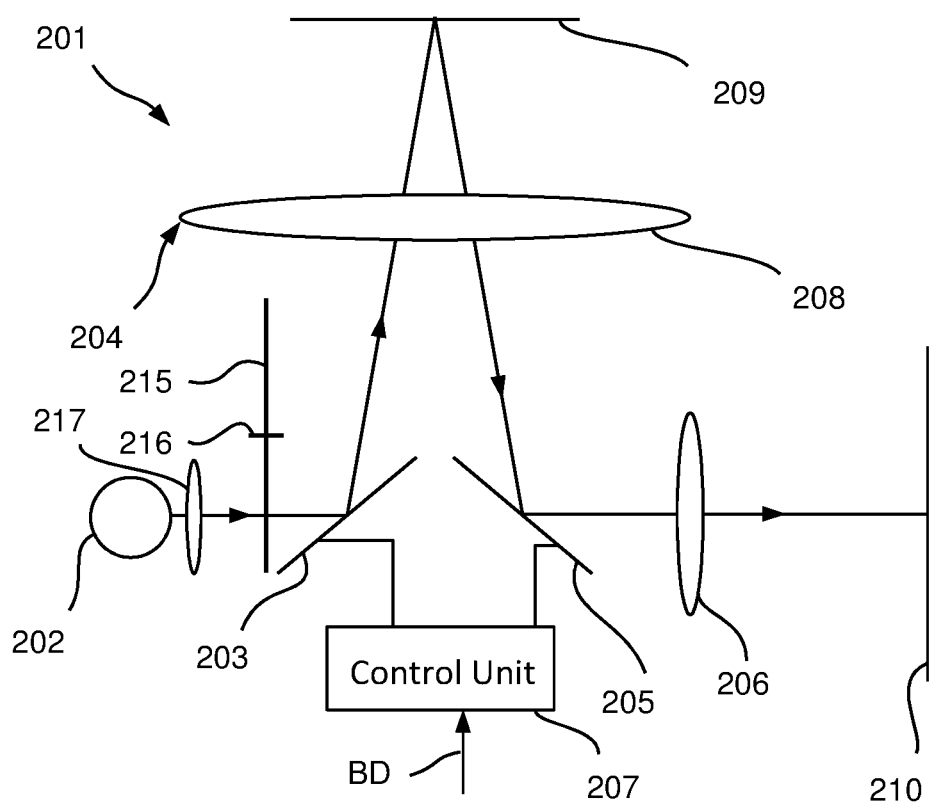
FIG. 39 shows an illustration of a known projector with double modulation.

Projector 201 with Double Modulation in Accordance with FIG. 39

With the use of two modulators 203, 205, connected in series, as is the case for the projector 201 with double modulation in FIG. 39, the contrast increases.

The projector 201 (also referred to hereinafter as 2×DMD prior art) is constructed basically identically to the projector 1 in FIG. 27. Therefore, identical or similar elements are designated by reference signs that are greater than the corresponding reference signs in FIG. 27 by 200. Only the differences are described below, essentially concerning the control unit 207 and the driving of the modulators 203, 205.

The spectrum $S(\lambda)$ following a double modulation by means of the projector 201 can be described as follows:

$$S(\lambda, g_1, g_2) = \int_\Omega d\Omega \int_{Frame} dt \Sigma_{colors\ c \in (r,g,b)} I(\Omega, t, \lambda) \cdot T_B(\Omega, \lambda) \cdot T_C(\Omega, c, \lambda) \cdot D_1(\Omega, t, c, \lambda, g_1) \cdot T_Z(\Omega, \lambda) \cdot D_2(\Omega, t, c, \lambda, g_2) \cdot T_P(\Omega, \lambda) \quad (11)$$

with
- c Color; for example red, green and blue (r, g, b)
- $g_1$ Grayscale value represented at the first image generator 203, can be numerical triad for r, g, b
- $D_1(\Omega, t, c, \lambda, g_1)$ Transmission or reflection of the first image generator 203
- $I(\Omega, t, \lambda)$ Intensity of the light source 202
- t Time variable
- $T_B(\Omega, \lambda)$ Transmission of the illumination optical unit 217
- $T_C(\Omega, c, \lambda)$ Transmission of all color splitters and combiners and also color wheels 215
- $T_P(\Omega, \lambda)$ Transmission of the projection optical unit 206
- $\lambda$ Wavelength; for example 400 nm to 700 nm
- $\Omega$ Solid angle
- $g_2$ Grayscale value represented at the second image generator 205, can be numerical triad for r, g, b
- $D_2(\Omega, t, c, \lambda, g_2)$ Transmission or reflection of the second image generator 205
- $T_Z(\Omega, \lambda)$ Transmission of the intermediate imaging 204 between first and second modulators 203,205

Here, too, the angle dependence of the individual optical elements can typically be eliminated by using an average value over the solid angle $\Omega$ in the calculations. Furthermore, the transmissions of the imaging optical units (illumination, projection, intermediate imaging) can be combined to form a single function: $T_O(\lambda)$ (already averaged over the solid angle). This results in:

$$S(\lambda, g_1, g_2) = \int_{Frame} dt \Sigma_{c \in (r,g,b)} I(t, \lambda) \cdot T_O(\lambda) \cdot T_C(c, \lambda) \cdot D_1(t, c, \lambda, g_1) \cdot D_2(t, c, \lambda, g_2) \quad (12)$$

Analogously to the above explanations concerning single modulation (formulae (3) to (9)) for the spectrum of a represented pixel ascertained above, the color values $\vec{X}(g_1, g_2)$ and the color locus (x, y)($g_1, g_2$) can be ascertained by way of the standard spectral value functions $\bar{x}(\lambda)$, $\bar{y}(\lambda)$ and $\bar{z}(\lambda)$.

The spectra of the individual components have already been presented in the illustrations in FIGS. 32 to 35. It was assumed here that the two modulators 203, 205 have a contrast by 1500:1 in the white.

Analogously to equation (2), the spectrum as a function of the grayscale values $g_{1r}$, $g_{1g}$ and $g_{1b}$ of the first modulator 203 and the grayscale values a $g_{2r}$, $g_{2g}$ and $g_{2b}$ of the second modulator 205 following a double modulation can generally be described as (the angle dependence from (1) has already been eliminated):

$$S_{double}(\lambda, g_{1r}, g_{1g}, g_{1b}, g_{2r}, g_{2g}, g_{2b}) = \int_{Frame} dt \Sigma_{colors\ c \in (r,g,b)} I(\lambda) \cdot T_C(c, \lambda) \cdot D_1(t, \lambda, g_{1r}, g_{1g}, g_{1b}) \cdot D_2(t, \lambda, g_{2r}, g_{2g}, g_{2b}) \cdot T_O(\lambda) \quad (13)$$

For a double modulation according to the above-described example with two DMDs, the expression can be simplified as:

$$S_{2\times DMD, priorart}(\lambda, t_{00,r}, t_{01,r}, t_{10,r}, t_{00,g}, t_{01,g}, t_{10,g}, t_{00,b}, t_{01,b}, t_{10,b}) = \quad (14)$$

$$\frac{1}{\tau_r + \tau_g + \tau_b} \cdot \sum_{c \in (r,g,b)} \tau_c \cdot I(\lambda) \cdot T_C(c, \lambda) \cdot T_O(\lambda) \cdot$$

$$\{t_{00,c} \cdot D_1(\lambda, "black") \cdot D_2(\lambda, "black") + t_{01,c} \cdot D_1(\lambda, "black") \cdot D_2(\lambda, "white") + t_{10,c} \cdot D_1(\lambda, "white") \cdot D_2(\lambda, "black") + (\tau_c - t_{00,c} - t_{01,c} - t_{10,c}) \cdot D_1(\lambda, "white") \cdot D_2(\lambda, "white")\}$$

In the case of image generators 203, 205 with pulse width modulation, the time t for which a pixel forwards the light (ON state) with respect to the total time of the frame $\tau$ reveals what percentage of the light (for one color) reaches the projection screen 210. In the above formulae, "white" denotes the ON state and "black" denotes the OFF state of the corresponding pixel. By way of the gamma value γ, a grayscale level g can be assigned to such a time. For an 8-bit representation this results in the following:

$$g = 255 \cdot \left(\frac{t}{\tau}\right)^{1/\gamma} \quad (15)$$

For the two modulators i∈{1, 2} and the colors c∈{r, g, b} it holds true that:

$$g_{i,c} = 255 \cdot \left(\frac{t_{i,c}}{\tau_c}\right)^{1/\gamma} \quad (16)$$

It is assumed here that the frame time $\tau_c$ is identical for both DMDs.

Figure 40:
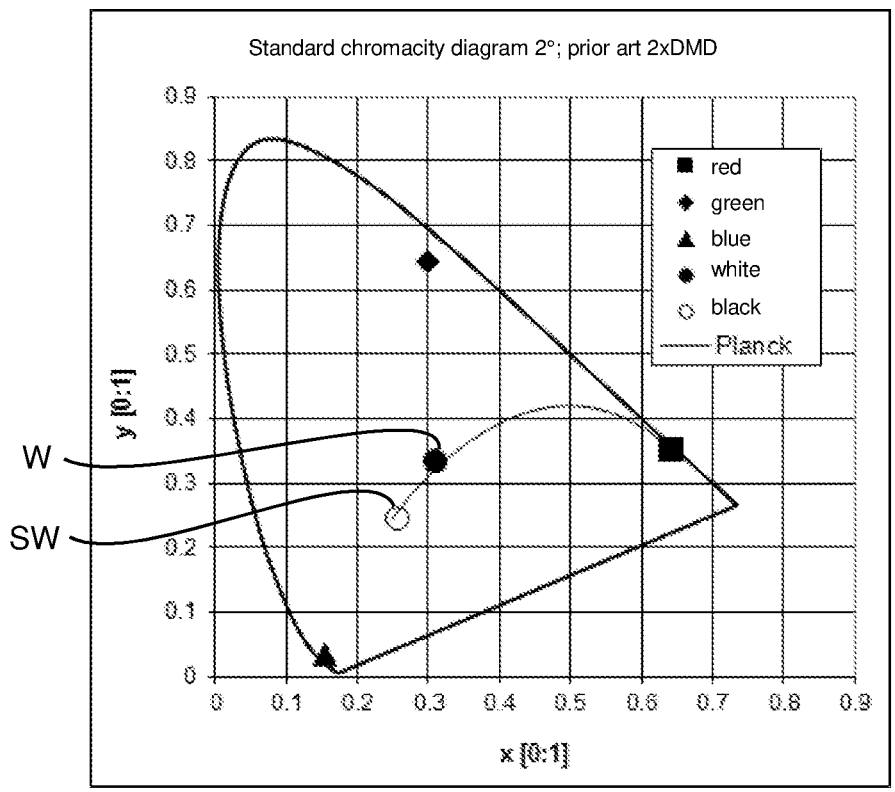
FIG. 40 shows the resulting color space of the projector in accordance with FIG. 39 in the same way as in FIG. 36.

With the aid of the formula (14) demonstrated above, for the individual colors it is possible to determine the spectrum and the color loci therefrom. The resulting color space is illustrated in FIG. 40 in the same way as in FIG. 36. If it is assumed that the proportions of the red, green and blue segments are 41%, 29% and 30%, then the depicted white point W results. The color locus SW is additionally entered, this resulting if the DMDs (or the corresponding pixel(s)) is at black (OFF state) for the entire time of a frame. In order to simplify the description, reference is made below only to the modulators. Of course, this always also relates to the individual pixels or tilting mirrors of the modulators.

In the case of a double modulation, for each color c both modulators 203, 205 can be switched to black for a time $t_{00,c}$; for a time $t_{01,c}$ the first modulator 203 can be switched to black and the second modulator 205 can be switched to white; conversely, for a time $t_{10,c}$ the first modulator 203 can be switched to white and the second modulator 205 can be switched to black; finally, for a time $t_{11,c}$ both modulators 203, 205 can be switched to white. The following holds true here:

$$t_{00,c} + t_{01,c} + t_{10,c} + t_{11,c} = \tau_c \text{ where } c \in \{r,g,b\} \quad (17)$$

In this example, the first modulator 203 serves as illumination of the second modulator 205. That means that the (first) illumination modulator 203 provides light whenever the (second) imaging modulator 205 requires light. It is evident from this that $t_{01,c} = 0$ for all colors. Furthermore, the illumination modulator 203 should forward light as seldom as possible if the imaging modulator 205 is at black ($t_{10,c} \gg \tau_c$). The illumination modulator 203 can for example be at white for a fixed (constant) time longer than the imaging modulator 205; alternatively, the illumination modulator 203 can be switched between black and white at fixed times (with the result that once again the required illumination of the imaging modulator 205 is covered). In this example:

$$t_{10,c} = \min\{0.012 \cdot \tau_c; \tau_c - t_{11,c}\} \quad (18)$$

In the case of a DMD with phased reset for the modulators 203, 205 this takes account of an intermediate imaging in which, although a pixel-to-pixel assignment is ensured, the reset zones of the two DMDs 203, 205 are not identical.

Furthermore, there is a functional relationship between the time $t_{10,c}$ for which the illumination modulator 203 is at white when the imaging modulator 205 is at black; it thus holds true that: $t_{10,c} \, t_{10,c}(t_{11,c})$. The above expression is thus simplified as:

$$t_{00,c} + t_{10,c}(t_{11,c}) + t_{11,c} = \tau_c \text{ where } c \in \{r,g,b\} \quad (19)$$

Formula (15) can thus be used to calculate the times $t_{11,c}$ (the corresponding pixels of both DMDs 203, 205 are ON), which are required for a grayscale value (r, g, b) to be represented. The times at which only the first DMD 203 is ON are evident from (17). The remaining time for a color ($\tau_c$) is calculated according to (18).

Equation (14) can thus be rearranged as:

$$S_{2 \times DMD, Sdt}(\lambda, t_{11,r}, t_{11,g}, t_{11,b}) = \quad (20)$$

$$\frac{1}{\tau_r + \tau_g + \tau_b} \cdot \sum_{c \in (r,g,b)} \tau_c \cdot I(\lambda) \cdot T_C(c, \lambda) \cdot T_O(\lambda) \cdot$$

$$\{(\tau_c - t_{11,c} - t_{10,c}(t_{11,c})) \cdot D_1(\lambda, ''black'') \cdot D_2(\lambda, ''black'') +$$

$$t_{10,c}(t_{11,c}) \cdot D_1(\lambda, ''white'') \cdot D_2(\lambda, ''black'') +$$

$$t_{11,c} \cdot D_1(\lambda, ''white'') \cdot D_2(\lambda, ''white'')\}$$

In this case, $T_C(c, \lambda)$ describes the transmission by the various filters c of the color wheel and the states "black" and "white" correspond to the black and white states, respectively, of the two DMDs.

Figure 41:
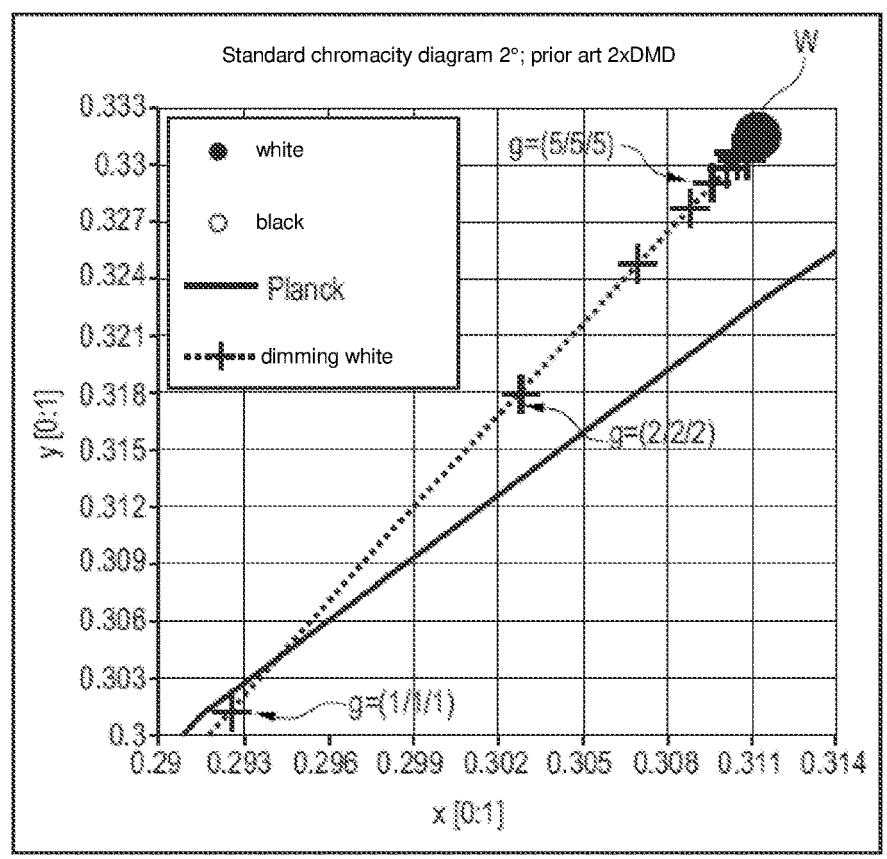
FIG. 41 shows an enlarged illustration of a detail from the color space in accordance with FIG. 40.
Figure 42:
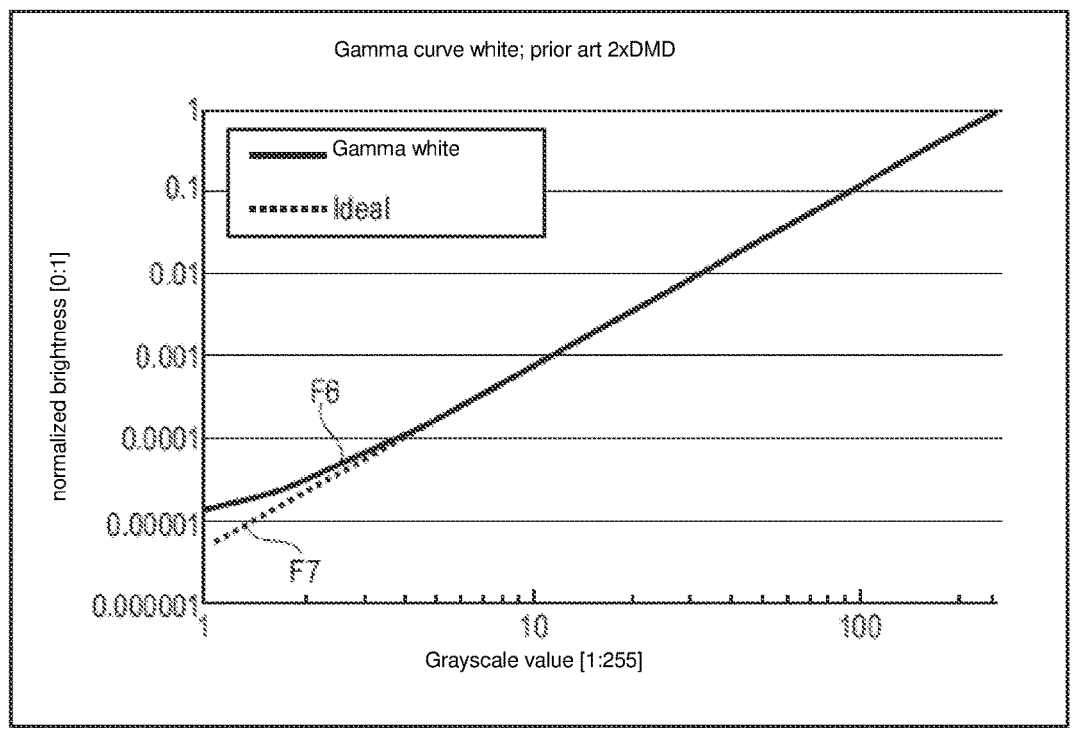
FIG. 42 shows the gamma curve for the projector in accordance with FIG. 39.
Figure 43:
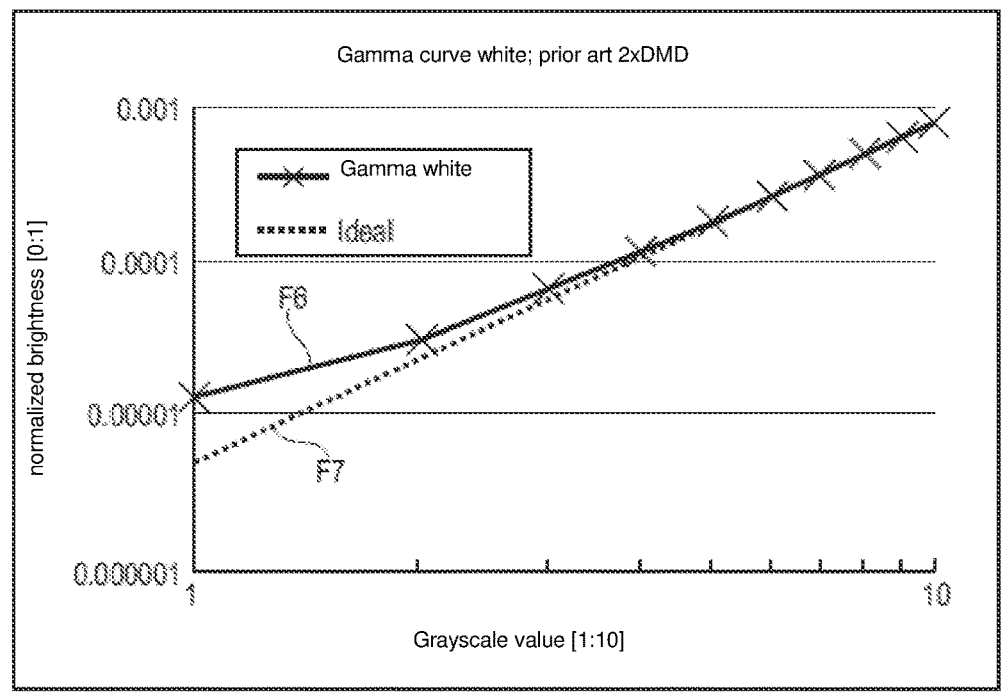
FIG. 43 shows an enlarged illustration of the illustration from FIG. 42 for the grayscale range of 1 to 10.

Formula (19) indicated can be used to calculate what color loci and brightnesses result for a dimming of the white triad (255/255/255). FIG. 41 shows a magnified illustration of the range for $0.333 \leq y \leq 0.3$ and $0.29 \leq x \leq 0.314$ from the color space from FIG. 40, the color loci for the gray triads (5/5/5) to (1/1/1) being depicted. It is evident from this illustration that the color deviations (that is to say the changes in the color locus) are significantly smaller than in the case of a single modulation (by comparison with FIG. 37). It is only in the case of a gray triad of (5/5/5) that the color deviations in x and y in the case of the modulator 201 with double modulation are greater than a typically assumed perception threshold of 0.003 (given a gamma of 2.2). FIG. 42 shows for the modulator 201 with double modulation, in the same way as in FIG. 38, that the ideal gamma curve F7 is matched in the case of the modulator 201 with double modulation (curve F6) significantly better than in the case of a single modulation. The deviations for dark grayscale levels are still considerable, however, as can be gathered from FIG. 43, which shows the gamma curves F6, F7 for white for the grayscale values of 1 to 10 in the same way as in FIG. 42.

For both examples according to the prior art, the resulting color loci and brightnesses are summarized in the table below (in this case, in the German text the decimal places are demarcated using "." instead of a ",", this being assumed to be equivalent in the present description):

| RGB input | | | Ideal | 1xDMD prior art | | | 2xDMD prior art | | |
|---|---|---|---|---|---|---|---|---|---|
| R | G | B | L | L | x | y | L | x | y |
| 255 | 255 | 255 | 1 | 1 | 0.313 | 0.333 | 1 | 0.311 | 0.331 |
| 20 | 20 | 20 | 0.00370 | 0.00436 | 0.308 | 0.326 | 0.00371 | 0.311 | 0.331 |
| 10 | 10 | 10 | 0.00080 | 0.00147 | 0.300 | 0.312 | 0.00081 | 0.311 | 0.331 |
| 9 | 9 | 9 | 0.00064 | 0.0013 | 0.298 | 0.310 | 0.00065 | 0.311 | 0.331 |
| 8 | 8 | 8 | 0.00049 | 0.00116 | 0.296 | 0.307 | 0.00050 | 0.311 | 0.331 |
| 7 | 7 | 7 | 0.00037 | 0.00103 | 0.295 | 0.304 | 0.00038 | 0.310 | 0.330 |
| 6 | 6 | 6 | 0.00026 | 0.00093 | 0.293 | 0.301 | 0.00027 | 0.310 | 0.330 |
| 5 | 5 | 5 | 0.00018 | 0.00084 | 0.291 | 0.298 | 0.00018 | 0.310 | 0.329 |
| 4 | 4 | 4 | 0.00011 | 0.00077 | 0.289 | 0.296 | 0.00012 | 0.309 | 0.328 |
| 3 | 3 | 3 | 5.69E−05 | 0.00072 | 0.288 | 0.293 | 6.535E−05 | 0.307 | 0.325 |
| 2 | 2 | 2 | 2.33E−05 | 0.00069 | 0.287 | 0.292 | 3.176E−05 | 0.303 | 0.318 |
| 1 | 1 | 1 | 5.08E−06 | 0.00067 | 0.286 | 0.291 | 1.35E−05 | 0.293 | 0.301 |
| 0 | 0 | 0 | 0 | 0.00067 | 0.286 | 0.290 | 4.45E−07 | 0.259 | 0.242 |

This table shows a compilation of the color loci and brightnesses for the two exemplary systems 101, 201 according to the prior art depending on predefined RGB input values.

Representing dark image contents correctly in terms of color necessitates—e.g. in multi-projector arrangements—both that the color loci are maintained over a dimming and that the brightnesses are as near as possible to the ideal gamma curve.

The described difficulty of representing correct brightnesses for low brightnesses can be overcome by so-called "boosting", wherein one of the two modulators 3, 5 is switched to black and the second modulator advantageously modulates only unavoidable residual light from the modulator switched to black such that low brightness values can be generated more accurately. Said residual light furthermore has a spectral characteristic that is dependent on the respective projector 1. Therefore, according to the invention, the residual light will be modulated such that at the same time as the correct brightness, the correct colors are reproduced as well.

A so-called "black point" SW can be assigned to the projector 1. The "black point" describes the color locus for a black image. The color loci of white point W and black point SW are typically not identical in the case of a real projector. While the white point W (generally) results from the primary colors (from the sum of the corresponding color values), the black point SW results from a finite contrast of the image generators 3, 5. Said contrast is generally wavelength-dependent. In the case of image generators 3, 5 based on liquid crystals, the contrast is typically lower in the blue than in the red, with the result that the black point SW is usually "bluer" than the white point. For tilting mirror matrices 3, 5 such as are used in the case of the projector 1 in accordance with FIG. 27, the contrast is influenced by the area below the tilting mirrors and also by the mirror edges. Here, too, generally more blue than red light reaches the projection surface 10.

On account of these properties, the color locus of each projected color during dimming shifts in the direction of the black point SW in an undesired manner. Even "pure" colors—such as red, green or blue—have, e.g. at a grayscale level of 1, a color locus which no longer corresponds to the primary color but rather is already close to the black point.

If one of the modulators 3, 5 (e.g. the first modulator 3) is switched to black, the following arises as a resulting spectrum from (13):

$$S_{double+Boos}(\lambda, g_{2r}, g_{2g}, g_{2b}) = \int_{Frame} dt \Sigma_{colors\ c\epsilon(r,g,b)} I(\lambda) \cdot T_C(c,\lambda) \cdot D_1(\lambda,\text{"black"}) \cdot D_2(t,\lambda,g_{2r},g_{2g},g_{2b}) \cdot T_O(\lambda) \quad (21)$$

The resulting color values can be ascertained analogous to equations (3) to (6) here as well:

$$\vec{X}_{double+Boost}(g_{2r}, g_{2g}, g_{2b}) = \begin{pmatrix} \int_\lambda d\lambda S_{double+Boost}(\lambda, g_{2r}, g_{2g}, g_{2b}) \cdot x(\lambda) \\ \int_\lambda d\lambda S_{double+Boost}(\lambda, g_{2r}, g_{2g}, g_{2b}) \cdot y(\lambda) \\ \int_\lambda d\lambda S_{double+Boost}(\lambda, g_{2r}, g_{2g}, g_{2b}) \cdot z(\lambda) \end{pmatrix} = \begin{pmatrix} X_{double+Boost}(g_{2r}, g_{2g}, g_{2b}) \\ Y_{double+Boost}(g_{2r}, g_{2g}, g_{2b}) \\ Z_{double+Boost}(g_{2r}, g_{2g}, g_{2b}) \end{pmatrix} \quad (22)$$

The values $g_{2r}$, $g_{2g}$ and $g_{2b}$ are sought, then, which approximate a target color value $\vec{X}_{target}$ as accurately as possible. $g_{2r}, g_{2g}, g_{2b} \epsilon [0, 1, \ldots, 255]$ is therefore determined such that $\|\vec{X} - \vec{X}_{double+Boost}(g_{2r}, g_{2g}, g_{2b})\|$ becomes minimal. Therefore, in the case of a predefined RGB triad (or image data BD) of a (dark) image point (which has e.g. a brightness value which is less than a first threshold value) of an image to be represented, the control unit 7 sets the signal (illumination control data BS) for the first image generator 3 to black and determines the color triad $g_{2r}$, $g_{2g}$ and $g_{2b}$ and therefrom the image control data BD for the second modulator 5 such that the color difference with respect to the predefined RGB triad (or with respect to the image data BD) becomes minimal.

In this case, $\|\cdot\|$ is a norm describing the separation between two color values. This norm can be defined for example as the magnitude of the color vector. Alternatively, firstly according to formula (9) the vectors $\vec{L}_{double+Boost}(g_{2r}, g_{2g}, g_{2b})$ and $\vec{L}_{target}$ are calculated and then the norm of the difference vector is in turn formed. In this case, this norm $\|\vec{L}\|$ can weight the individual components of the vector differently:

$$\|\vec{L}\| = \left\| \begin{pmatrix} L_1 \\ L_2 \\ L_3 \end{pmatrix} \right\| := \sqrt{\alpha \cdot (L_1)^2 + \beta \cdot (L_2)^2 + \gamma \cdot (L_3)^2} \quad (23)$$

In order for example to weight the brightness ($L_1$) of a represented color differently than the color locus ($L_2$ and $L_3$), $\alpha \neq 1$ and $\beta = \gamma = 1$ can be chosen. Furthermore, for $L_2$ and $L_3$, in a departure from (9), instead of the xy color coordinates, it is also possible to use u'v' color coordinates according to DIN EN ISO 11664-5.

For the image modulation by means of the two modulators 3, 5 with pulse width modulation (PWM), therefore, in equation (14) $t_{10,c} = t_{11,c} = 0$ and the following results for equation (17):

$$t_{00,c} + t_{01,c} = \tau_c \text{ where } c\epsilon\{r,g,b\} \quad (24)$$

Formula (14) is then simplified as:

$$S_{2\times DMD}(\lambda, t_{01,r}, t_{01,g}, t_{01,b}) = \quad (25)$$

$$\frac{1}{\tau_r + \tau_g + \tau_b} \cdot \sum_{c\epsilon(r,g,b)} \tau_c \cdot I(\lambda) \cdot T_C(c, \lambda) \cdot T_O(\lambda) \cdot$$

$$\{(\tau_c - t_{01,c}) \cdot D_1(\lambda, \text{"black"}) \cdot D_2(\lambda, \text{"black"}) + t_{01,c} \cdot D_1(\lambda, \text{"black"}) \cdot D_2(\lambda, \text{"white"})\}$$

The times $t_{01,r}$, $t_{01,g}$, $t_{01,b}$ are sought, then, which allow a sought value for $\vec{X}_{target}$ to be represented. Using equations (3) to (6), the above equation can be rearranged to form the following requirement:

Find $t_{01,c} \epsilon [0:\tau_c]$ where $c\epsilon\{r, g, b\}$, such that $\|\vec{X}_{target} - \vec{X}_{2\times DMD}(t_{01,r}, t_{01,g}, t_{01,b})\|$ becomes minimal where $$\vec{X}_{2\times DMD}(\tau_{01,r}, t_{01,g}, t_{01,b}) = \quad (26)$$

$$\frac{1}{\tau_r + \tau_g + \tau_b} \cdot \sum_{c\epsilon(r,g,b)} \{(\tau_c - \tau_{01,c}) \cdot \vec{X}_{00,c} + t_{01,c} \cdot \vec{X}_{01,c}\}$$

In this case:

$$\vec{X}_{00,c} = \frac{\tau_c}{\tau_r + \tau_g + \tau_b} \int d\lambda \quad (27)$$

$$I(\lambda) \cdot T_C(c, \lambda) \cdot D_1(\lambda, \text{"black"}) \cdot D_2(\lambda, \text{"black"}) \cdot T_O(\lambda) \cdot \begin{pmatrix} x(\lambda) \\ y(\lambda) \\ z(\lambda) \end{pmatrix}$$

$$\vec{X}_{01,c} = \frac{\tau_c}{\tau_r + \tau_g + \tau_b} \int d\lambda \quad (28)$$

$$I(\lambda) \cdot T_C(c, \lambda) \cdot D_1(\lambda, \text{"black"}) \cdot D_2(\lambda, \text{"white"}) \cdot T_O(\lambda) \cdot \begin{pmatrix} x(\lambda) \\ y(\lambda) \\ z(\lambda) \end{pmatrix}$$

These vectors $\vec{X}_{00,c}$ and $\vec{X}_{01,c}$ are variables which can be determined for example experimentally for the projector 1.

If use is made of the spectra for lamp, DMDs, optical system and color filter such as were employed in the case of the projector 201 with double modulation according to the prior art, it is possible to calculate the times $t_{01,r}$, $t_{01,g}$, $t_{01,b}$ for which given target colors can be projected. The times can be converted by way of equation (16) into grayscale values (=on time duration of the corresponding pixel of the second modulator 5) of the respective colors. In general, no natural numbers between 0 and 255 result here. It is necessary here either to choose the nearest natural numbers as $g_{2r}$, $g_{2g}$, $g_{2b}$ for the second modulator (or the nearest representable grayscale value if the modulator has a higher bit depth than 8 bits). Alternatively, the required grayscale value can be represented by way of spatial and/or temporal dithering.

For the example, the calculated grayscale values at the two modulators are compiled in the table below depending on RGB input values: an 8-bit representation is once again assumed here, wherein R1, G1, B1 are the ON times of the first modulator 3 for the respective color and R2, G2, B2 are the ON times of the second modulator 5 for the respective color.

is greatly increased or boosted to (83.1/70.5/33.9) (or rounded to whole numbers (83/71/34), this being significantly greater than the RGB input value (7/7/7). For these pixels, the second modulator 5 thus modulates the unavoidable residual light from the first modulator 3.

If, in this case, a brightness change were carried out owing to blending in the same way as described in connection with FIG. 21, given an 8-bit resolution for e.g. the brightness value of 7 for pixel No. 10 of the projector P1 in accordance with FIG. 22 this would result in a reduction by 10% and thus to 6.67, which would be represented as 7 again in 8-bit implementation. Consequently, this brightness change would not be representable. According to the invention, however, it can be represented by means of the boosting with increased resolution, as was described in connection with FIGS. 21-26. Therefore, the boosting with increased resolution is also used in the exemplary embodiments described here regarding representation with color fidelity at low brightness values.

For colors which are not "too close" to the primary colors, $\|\vec{X}_{target} - \vec{X}_{2 \times DMD}(t_{01,r}, t_{01,g}, t_{01,b})\| = 0$ can be satisfied. This is the case if the matrix equation results in solutions for $t_{01,c} \in [0, \tau_c]$. This becomes clear if the requirement is rearranged as:

| RGB input | | | Ideal | 2xDMD + Boost | | | | | | | | | | | |
|---|---|---|---|---|---|---|---|---|---|---|---|---|---|---|---|
| R | G | B | L | R1 | G1 | B1 | R2 | G2 | B2 | t01r/Tr | t01g/Tg | t01b/Tb | L | x | y |
| 255 | 255 | 255 | 1 | 255 | 255 | 255 | 255 | 255 | 255 | | | | 1 | 0.311 | 0.331 |
| 20 | 20 | 20 | 0.00370 | 20.1 | 20.1 | 20.1 | 20 | 20 | 20 | | | | 0.00371 | 0.311 | 0.331 |
| 10 | 10 | 10 | 0.00080 | 10.1 | 10.1 | 10.1 | 10 | 10 | 10 | | | | 0.00081 | 0.311 | 0.331 |
| 9 | 9 | 9 | 0.00064 | 9.05 | 9.05 | 9.05 | 9 | 9 | 9 | | | | 0.00065 | 0.311 | 0.331 |
| 8 | 8 | 8 | 0.00049 | 0 | 0 | 0 | 158.7 | 134.7 | 64.7 | 0.8062 | 0.7481 | 0.5362 | 0.00050 | 0.311 | 0.331 |
| 7 | 7 | 7 | 0.00037 | 0 | 0 | 0 | 83.1 | 70.5 | 33.9 | 0.6008 | 0.5575 | 0.3994 | 0.00037 | 0.311 | 0.331 |
| 6 | 6 | 6 | 0.00026 | 0 | 0 | 0 | 39.4 | 33.4 | 16.0 | 0.4278 | 0.3970 | 0.2843 | 0.00026 | 0.311 | 0.331 |
| 5 | 5 | 5 | 0.00018 | 0 | 0 | 0 | 16.3 | 13.8 | 6.6 | 0.2863 | 0.2656 | 0.1900 | 0.00018 | 0.311 | 0.331 |
| 4 | 4 | 4 | 0.00011 | 0 | 0 | 0 | 5.5 | 4.7 | 2.2 | 0.1750 | 0.1623 | 0.1159 | 0.00011 | 0.311 | 0.331 |
| 3 | 3 | 3 | 5.69E−05 | 0 | 0 | 0 | 1.4 | 1.2 | 0.5 | 0.0926 | 0.0859 | 0.0611 | 5.77E−05 | 0.311 | 0.331 |
| 2 | 2 | 2 | 2.33E−05 | 0 | 0 | 0 | 0.2 | 0.2 | 0.1 | 0.0376 | 0.0348 | 0.0245 | 2.36E−05 | 0.311 | 0.331 |
| 1 | 1 | 1 | 5.08E−06 | 0 | 0 | 0 | 0.006 | 0.005 | 0.002 | 0.0077 | 0.0071 | 0.0046 | 5.14E−06 | 0.311 | 0.331 |
| 0 | 0 | 0 | 0 | 0 | 0 | 0 | 0 | 0 | 0 | 0 | 0 | 0 | 4.45E−07 | 0.259 | 0.242 |

Figure 44:
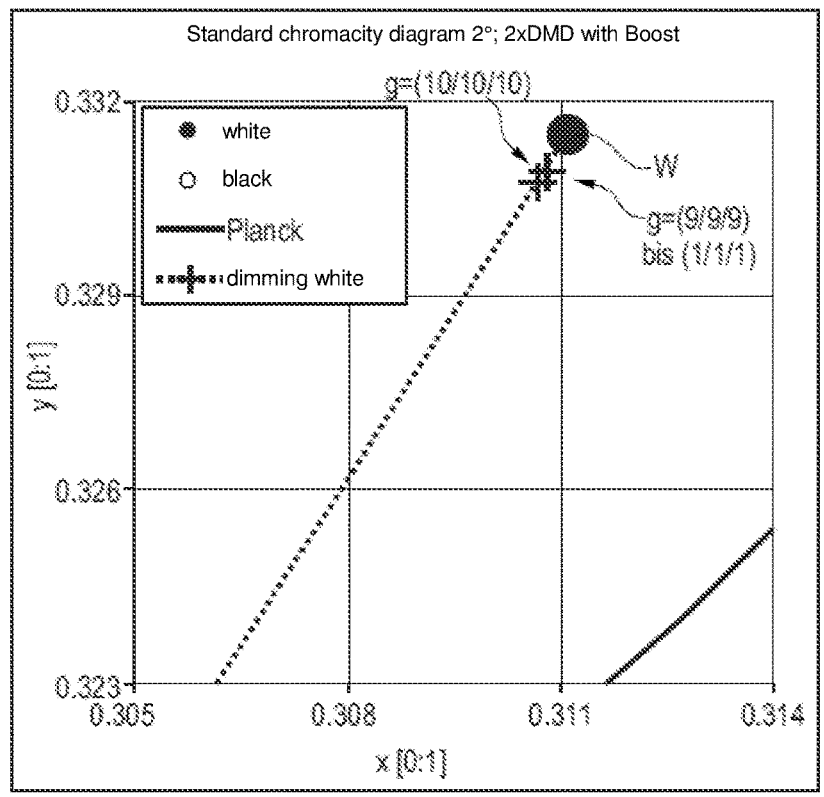
FIG. 44 shows a detail from the color space for the projector according to certain embodiments of the invention in the same way as the illustration in FIG. 36.
Figure 45:
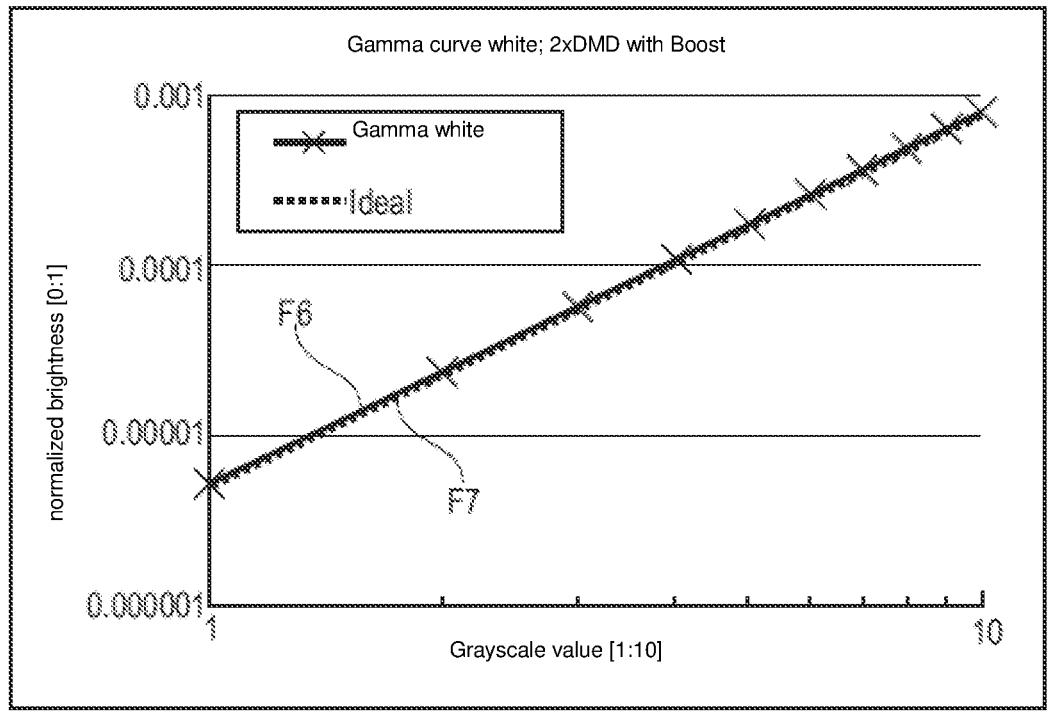
FIG. 45 shows the gamma curve for the projector according to certain embodiments of the invention.

It is evident that compared with the solutions according to the prior art, the color loci vary or deviate from the ideal value to a lesser extent (the coordinates of the last non-boosted color (9/9/9) were used as target color in the example). This is illustrated for the gray triads (10/10/10) to (1/1/1) in FIG. 44 in the same way as in FIG. 37 and FIG. 41. This reveals that the gray triads (9/9/9) to (1/1/1) lie at the same color locus and the gray triad (10/10/10) lies very close to the same color locus, with the result that the color deviations lie below a perception threshold of 0.003. Furthermore, the brightnesses in accordance with the ideal gamma curve F7 are additionally matched significantly better, as is shown in FIG. 45 in the same way as in FIGS. 37, 42 and 43. In this regard, the gamma curve F6—depicted by a solid line—for white for the grayscale values of 1 to 10 lies on the ideal fit with gamma curve F7, which is depicted as a dotted line. The "boosting" carried out for this purpose can likewise be gathered from this table. For e.g. an RGB input of (7/7/7), the corresponding pixel of the first modulator 3 is switched to black or OFF with (0/0/0) and, by contrast, the corresponding pixel of the second modulator 5

$$\frac{1}{\tau_r + \tau_g + \tau_b} \cdot \quad (29)$$

$$\left( \vec{X}_{01,r} - \vec{X}_{00,r} \quad \vec{X}_{01,g} - \vec{X}_{00,g} \quad \vec{X}_{01,b} - \vec{X}_{00,b} \right)^T \begin{pmatrix} t_{01,r} \\ t_{01,g} \\ t_{01,b} \end{pmatrix} =$$

$$\vec{X}_{target} - \frac{1}{\tau_r + \tau_g + \tau_b} \sum_{c \in (r,g,b)} \tau_c \cdot \vec{X}_{00,c}$$

This expression can be inverted and gives the solutions for the times $t_{01,r}$, $t_{01,g}$, $t_{01,b}$:

$$\begin{pmatrix} t_{01,r} \\ t_{01,g} \\ t_{01,b} \end{pmatrix} = \hat{M}^{-1} \cdot \vec{X} \quad (30)$$

where $$\hat{M} = \frac{1}{\tau_r + \tau_g + \tau_b} \cdot \left( \vec{X}_{01,r} - \vec{X}_{00,r} \quad \vec{X}_{01,g} - \vec{X}_{00,g} \quad \vec{X}_{01,b} - \vec{X}_{00,b} \right)^T \quad (31)$$

and $$\vec{X} = \vec{X}_{target} - \frac{1}{\tau_r + \tau_g + \tau_b} \cdot \sum_{c \in (r,g,b)} \tau_c \cdot \vec{X}_{00,c} \qquad (32)$$

On account of the described time-sequential colored illumination of the two modulators 3, 5, the projector 1 according to the invention has a red color channel, a green color channel and a blue color channel, wherein all the color channels have the two modulators 3, 5 and the imaging optical unit 4. They differ only in the position of the color wheel 15, which ensures that red, green or blue light is incident on the modulators 3, 5. On account of the described wavelength dependence of the contrast of the modulators 3, 5, each of said color channels has the undesired property that the generated color locus shifts depending on the brightness set. This is disadvantageous precisely in the case of low brightness values to be generated and is compensated for according to the invention in the manner described.

Figure 46:
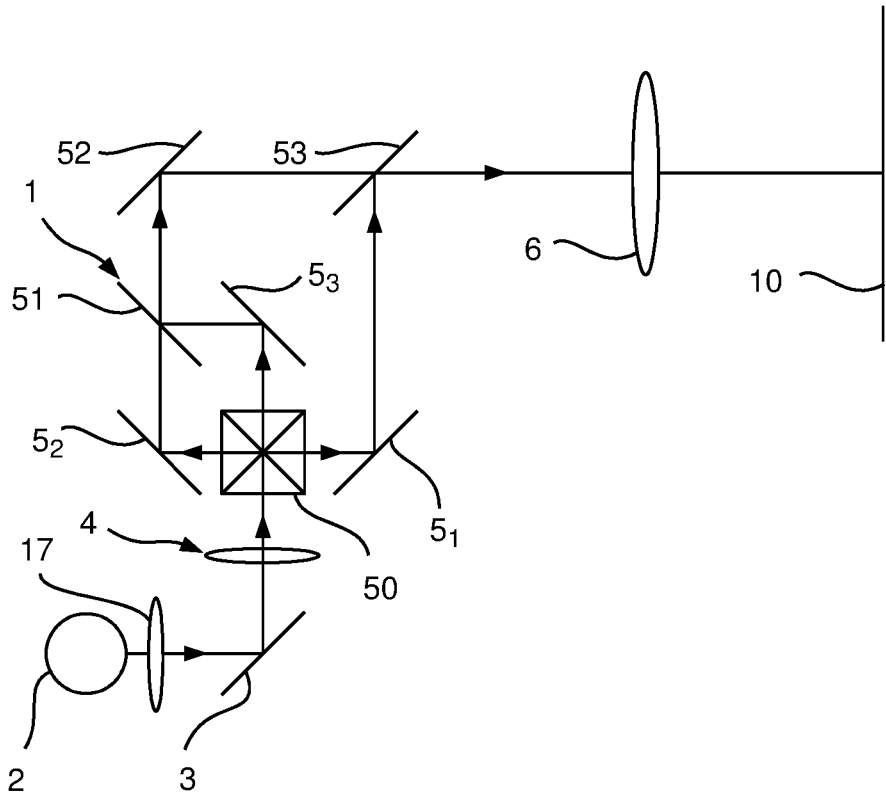
FIG. 46 shows a further embodiment of the projector according to certain embodiments of the invention.

In the case of a second exemplary embodiment of the projector 1, as shown in FIG. 46, the light is firstly directed via a first modulator 3 ("illumination"). The light is then split into a red, a green and a blue color component by means of a color splitter cube 50. The color components are respectively directed via a further modulator $5_1$, $5_2$, $5_3$ (the imaging modulator $5_1$ modulates the red color component, the imaging modulator $5_2$ modulates the green color component and the imaging modulator $5_3$ modulates the blue color component). The modulated light is then combined via the mirrors 51, 52, 53 and directed to a projection surface 10 via a projection optical unit 6. The modulators 3, $5_1$, $5_2$, $5_3$ are four DMDs in this example. In order to simplify the illustration, the control unit 7 is not depicted.

In the case of such a "1→3" arrangement, equation (21) can be written as:

$$S_{1 \to 3}(\lambda, g_1, g_{2r}, g_{2g}, g_{2b}) = \int_{Frame} dt I(\lambda) \cdot D_1(t, \lambda, g_1) \cdot T_O(\lambda) \cdot \sum_{colors\ c \in (r,g,b)} T_{C,c}(\lambda) \cdot D_{2c}(t, \lambda, g_{2c}) \qquad (33)$$

In this case, $T_{C,c}(\lambda)$ shall be the transmission for the color channel c∈(r,g,b) including the color splitters 50 and color combiners 51-53. $D_{2c}(t, \lambda, g_{2c})$ describes the reflectivities of the three imaging DMDs $5_1$-$5_3$.

For the representation of bright image contents, the illumination DMD 3 must be at white at least at the times when one of the imaging DMDs $5_1$-$5_3$ is at white. In darker scenes, in particular, that has the effect that the primary colors—or highly colored image contents—are desaturated in terms of color.

For the representation of dark image contents, as already in the first exemplary embodiment, boosting can be carried out, wherein e.g. the illumination DMD 3 is set to black and the boosting is effected by way of the three imaging DMDs $5_1$-$5_3$.

If equation (29) is written in a representation with DMD times, then the following holds true for the representation of dark image contents by means of boosting (analogously to (25) in the first exemplary embodiment):

$$S_{1 \to 3DMD}(\lambda, t_{01,r}, t_{01,g}, t_{01,b}) = \qquad (34)$$
$$\frac{1}{\tau} \cdot I(\lambda) \cdot T_O(\lambda) \cdot D_1(\lambda, "black") \cdot \sum_{c \in (r,g,b)} T_{C,c}(\lambda) \cdot$$
$$\{(\tau - t_{01,c}) \cdot D_{2c}(\lambda, "black") + t_{01,c} \cdot D_{2c}(\lambda, "white")\}$$

In this case, $\tau = \tau_r = \tau_g = \tau_b$.

Once again the times $t_{01,r}$, $t_{01,g}$, $t_{01,b}$ are sought, then, which allow a sought value for $\vec{X}_{target}$ to be represented. Using equations (3) to (6), the above equation can be rearranged to form the following requirement:

Find $t_{01,c} \in [0:\tau_c]$ where c∈{r, g, b}, such that $\|\vec{X}_{target} - \vec{X}_{1 \to 3DMD}(t_{01,r}, t_{01,g}, t_{01,b})\|$ becomes minimal, where $$\vec{X}_{1 \to 3DMD}(t_{01,r}, t_{01,g}, t_{01,b}) = \frac{1}{\tau} \sum_{c \in (r,g,b)} \left\{ (t_c - t_{01,c}) \cdot \vec{X}_{00,c} + t_{01,c} \cdot \vec{X}_{01,c} \right\} \qquad (35)$$

In this case:

$$\vec{X}_{00,c} = \int d\lambda \qquad (36)$$
$$I(\lambda) \cdot T_O(\lambda) \cdot D_1(\lambda, "black") \cdot D_{2c}(\lambda, "black") \cdot T_{C,c}(\lambda) \cdot \begin{pmatrix} \bar{x}(\lambda) \\ \bar{y}(\lambda) \\ \bar{z}(\lambda) \end{pmatrix}$$

$$\vec{X}_{01,c} = \int d\lambda \qquad (37)$$
$$I(\lambda) \cdot T_O(\lambda) \cdot D_1(\lambda, "black") \cdot D_{2c}(\lambda, "white") \cdot T_{C,c}(\lambda) \cdot \begin{pmatrix} \bar{x}(\lambda) \\ \bar{y}(\lambda) \\ \bar{z}(\lambda) \end{pmatrix}$$

These vectors $\vec{X}_{00,c}$ and $\vec{X}_{01,c}$ are variables which can be determined for example experimentally for the projector 1.

Figure 47:
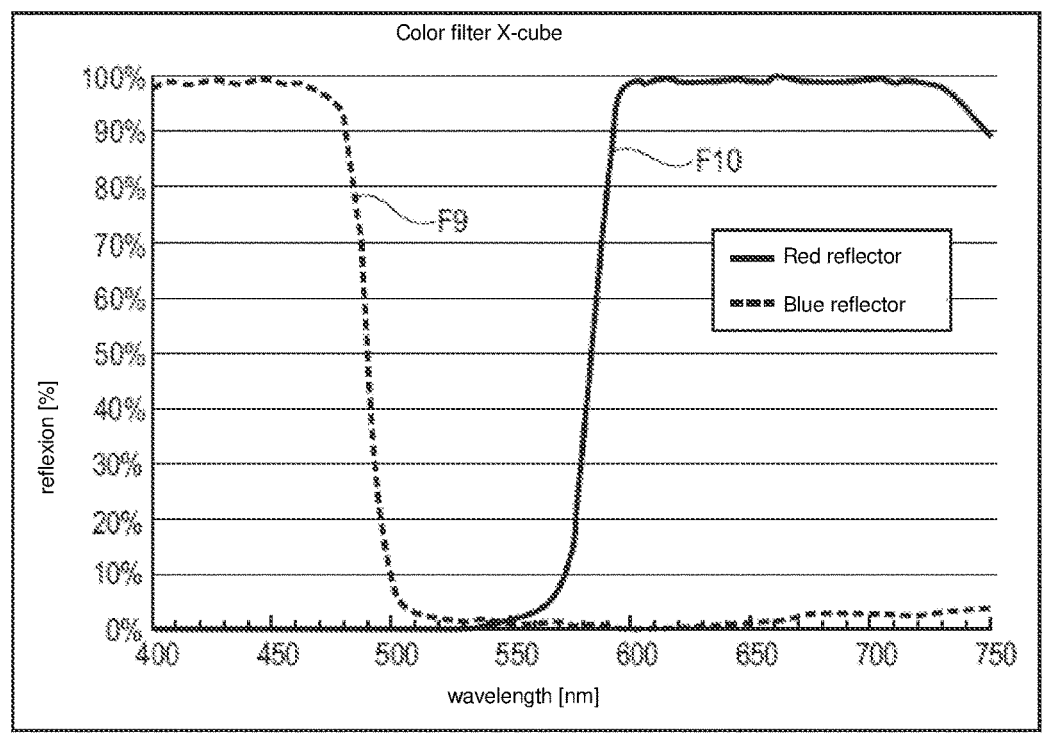
FIG. 47 shows an illustration of the reflection behavior of the color splitter cube from FIG. 46.
Figure 48:
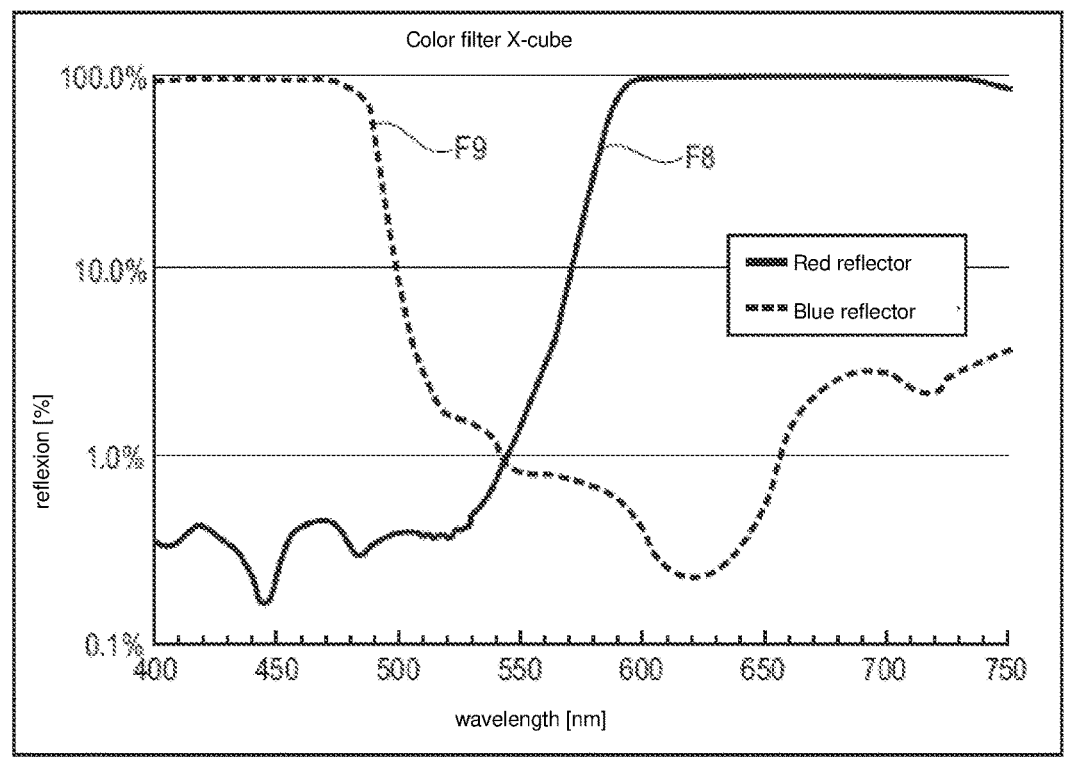
FIG. 48 shows a further illustration of the reflection behavior of the color splitter cube from FIG. 46.

If use is again made of the spectra for lamp, DMDs and optical system, such as were employed in the case of the projector 201 with double modulation according to the prior art (the spectra of the color channels of the color splitter cube 50 or of the X-cube 50 are illustrated in FIGS. 47 and 48; $T_{C,c}(\lambda)$ can be calculated therefrom), then it is possible to calculate the times $t_{01,r}$, $t_{01,g}$, $t_{01,b}$ in order then to project the given target colors as accurately as possible. In FIGS. 47 and 48, the reflection of the red reflector is depicted as a solid line F8 and the reflection of the blue reflector is depicted as a dotted line F9, the wavelength in nm being plotted along the x-axis and the reflection being plotted along the y-axis. The reflection is plotted linearly in FIG. 47 and the reflection is plotted logarithmically in FIG. 48.

The times can once again be converted by way of equation (16) into grayscale values of the respective colors. In general, no natural numbers between 0 and 255 result here. It is necessary here either to choose the nearest natural numbers as $g_{2r}$, $g_{2g}$, $g_{2b}$ for the second modulator $5_1$, $5_2$, $5_3$ (or the nearest representable grayscale value if the modulator has a higher bit depth than 8 bits). Alternatively, the required grayscale value can be represented by way of spatial and/or temporal dithering.

The grayscale values thus calculated for the modulators 3, $5_1$, $5_2$, $5_3$ are compiled in FIG. 49 for white and in FIG. 50 for red depending on RGB input values. In this case, a "1→3" arrangement without driving according to the invention, which is designated as 1-3 DMD prior art, is compared with the projector 1 according to the invention in accordance with FIG. 46, which is designated as 1-3 DMD+boost.

Figure 51:
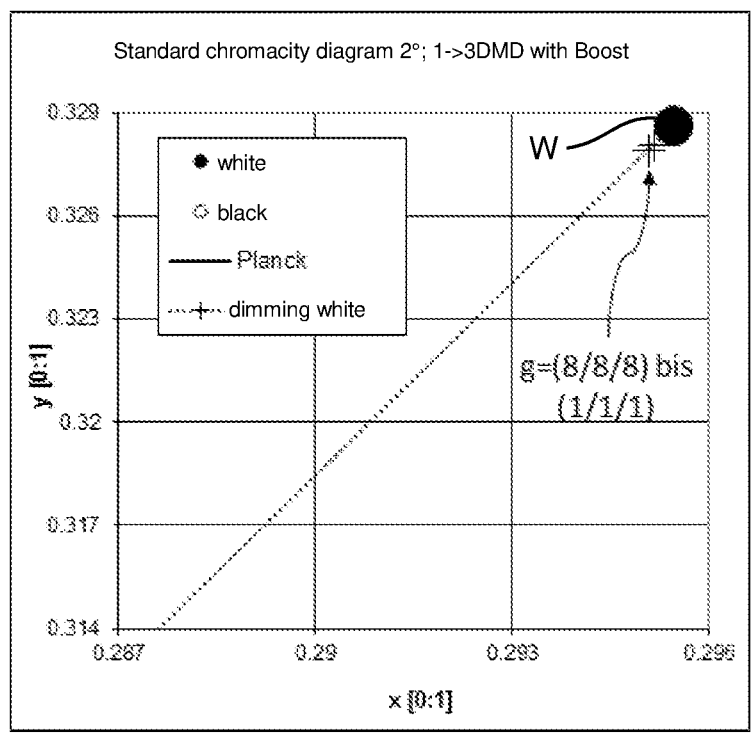
FIG. 51 shows the illustration of a detail from the color space for the projector according to certain embodiments of the invention.
Figure 52:
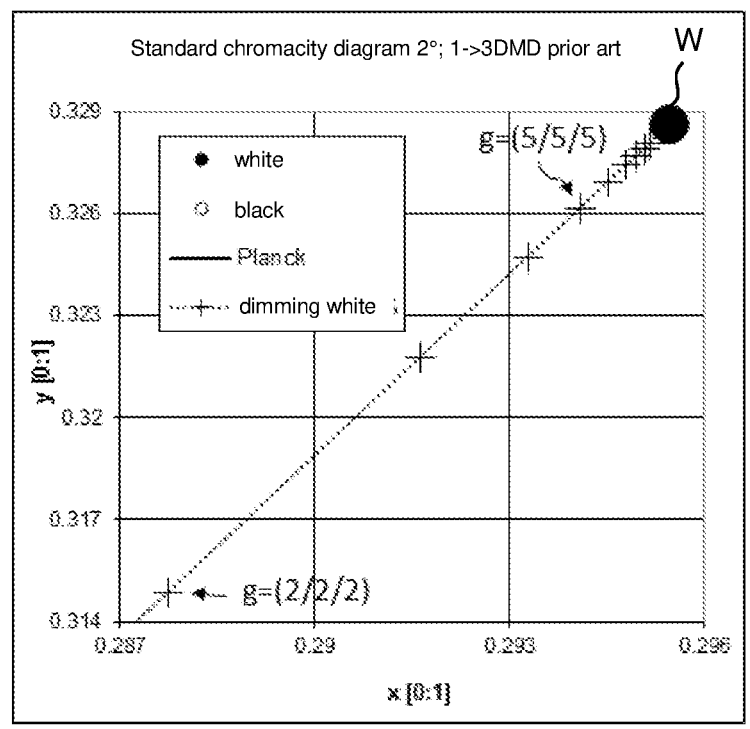
FIG. 52 shows the illustration of a color space of a known projector with double modulation for comparison in relation to FIG. 51.
Figure 53:
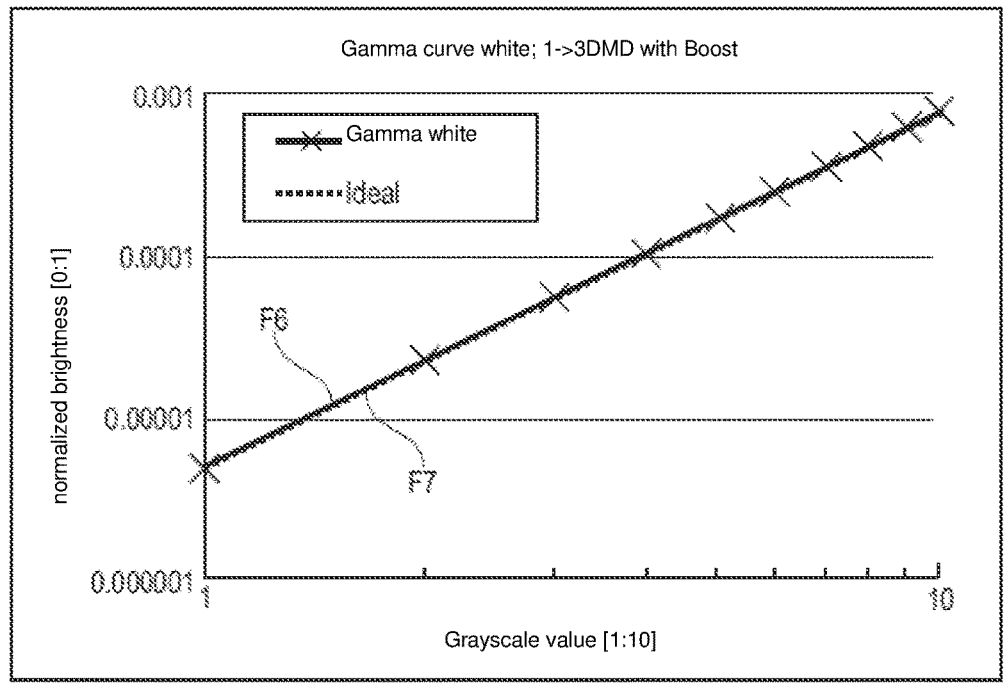
FIG. 53 shows the profile of the gamma curve of the projector according to certain embodiments of the invention.
Figure 54:
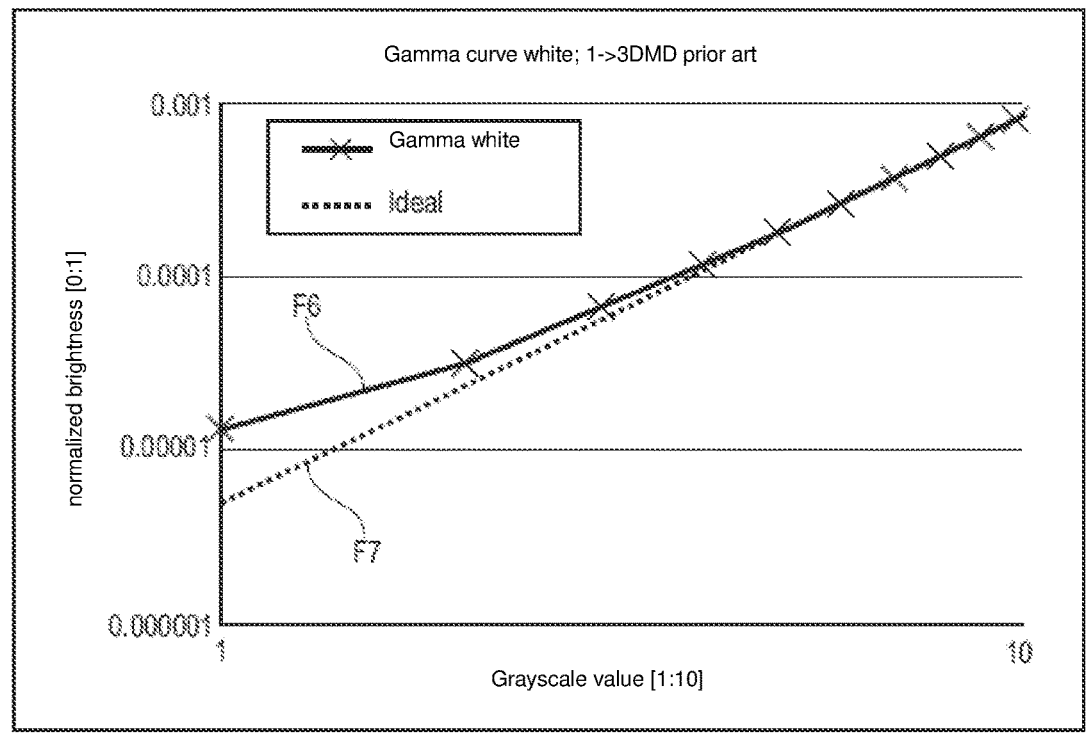
FIG. 54 shows the profile of the gamma curve of a known projector with double modulation.

The stabilization of the color locus in the case of the projector 1 according to the invention can also be gathered from a comparison of the relevant range of the color space for dimming from white (255/255/255) to black (0/0/0) for the projector 1 in FIG. 51 with the same range of the color space for a projector with a "1→3" arrangement without the driving according to the invention in FIG. 52. The illustration in FIGS. 51 and 26 corresponds e.g. to the illustration in FIG. 41. A comparison of the gamma curve for white in accordance with FIG. 53 for the projector 1 according to the invention with the corresponding gamma curve for white for a prior art "1-3" projector in accordance with FIG. 54 for the grayscale levels 1 to 10 shows clearly how well the ideal gamma curve F7 is approximated by the projector 1 according to the invention. In FIGS. 53 and 54, the ideal gamma curves F7 are illustrated by a dotted line in each case and the gamma curves F6 actually achieved are illustrated by a solid line (in the same way as e.g. in FIG. 42).

Figure 55:
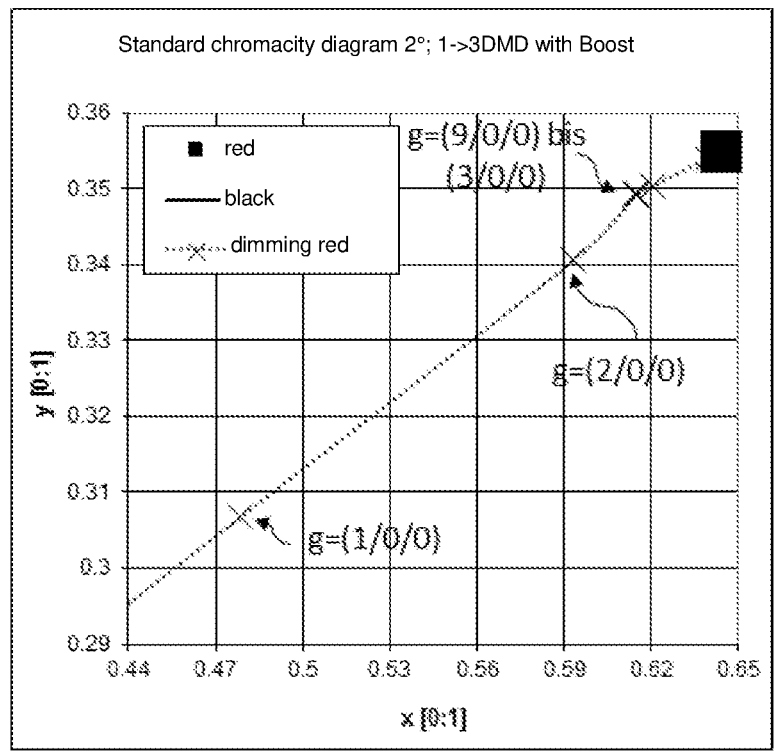
FIG. 55 shows a detail from the standard chromaticity diagram for the projector according to certain embodiments of the invention.
Figure 56:
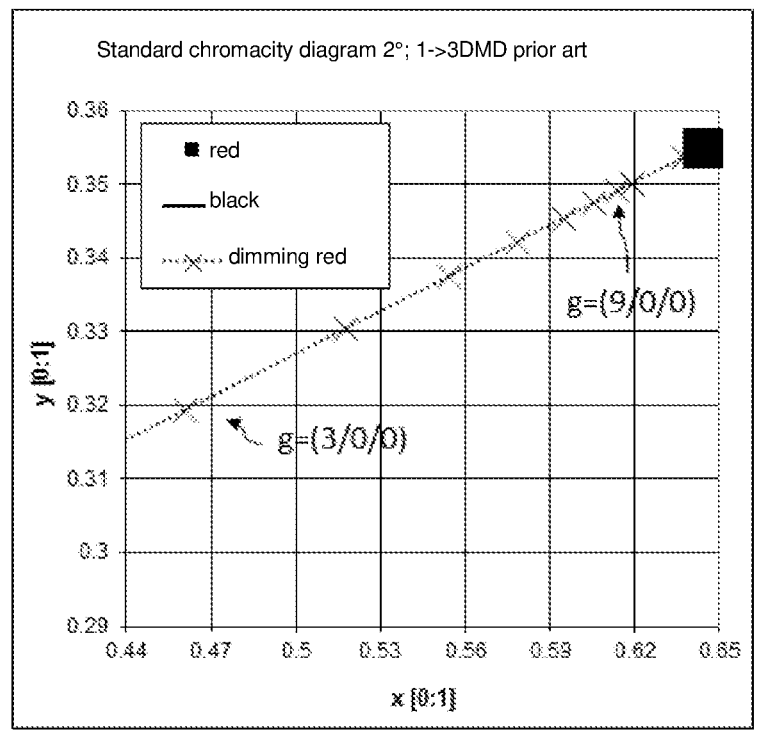
FIG. 56 shows a detail from the standard chromaticity diagram for a known projector with double modulation.
Figure 57:
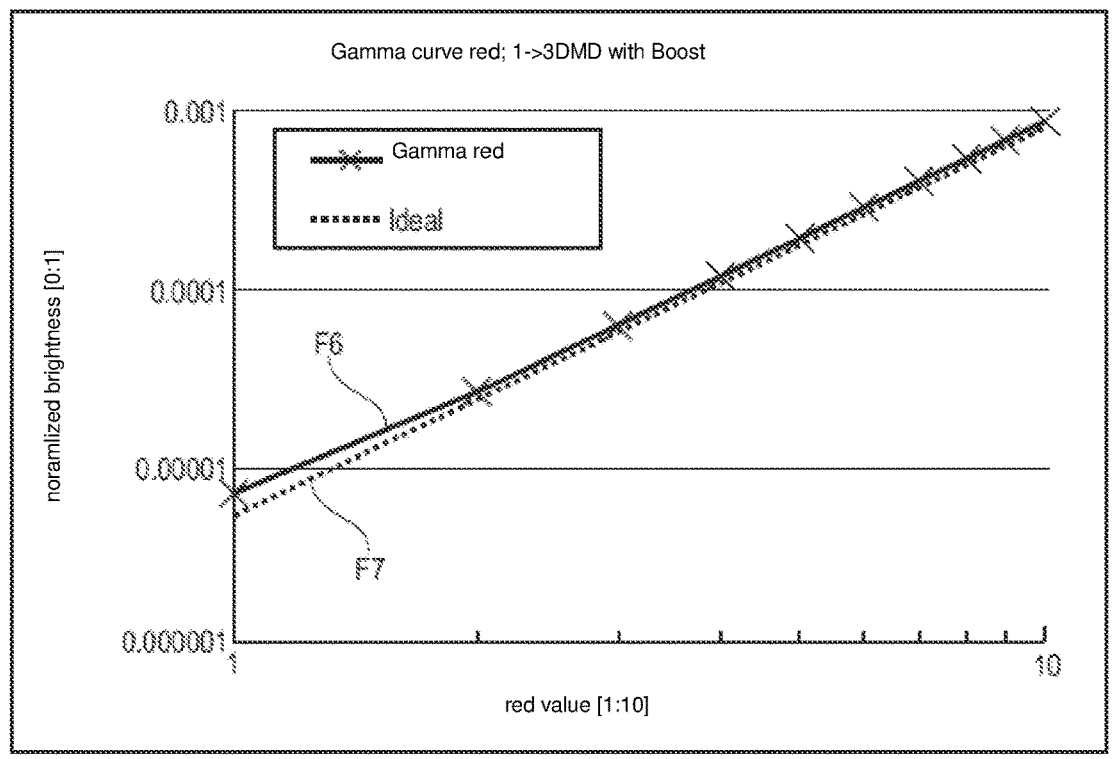
FIG. 57 shows the gamma curve for red for the projector according to the invention.
Figure 58:
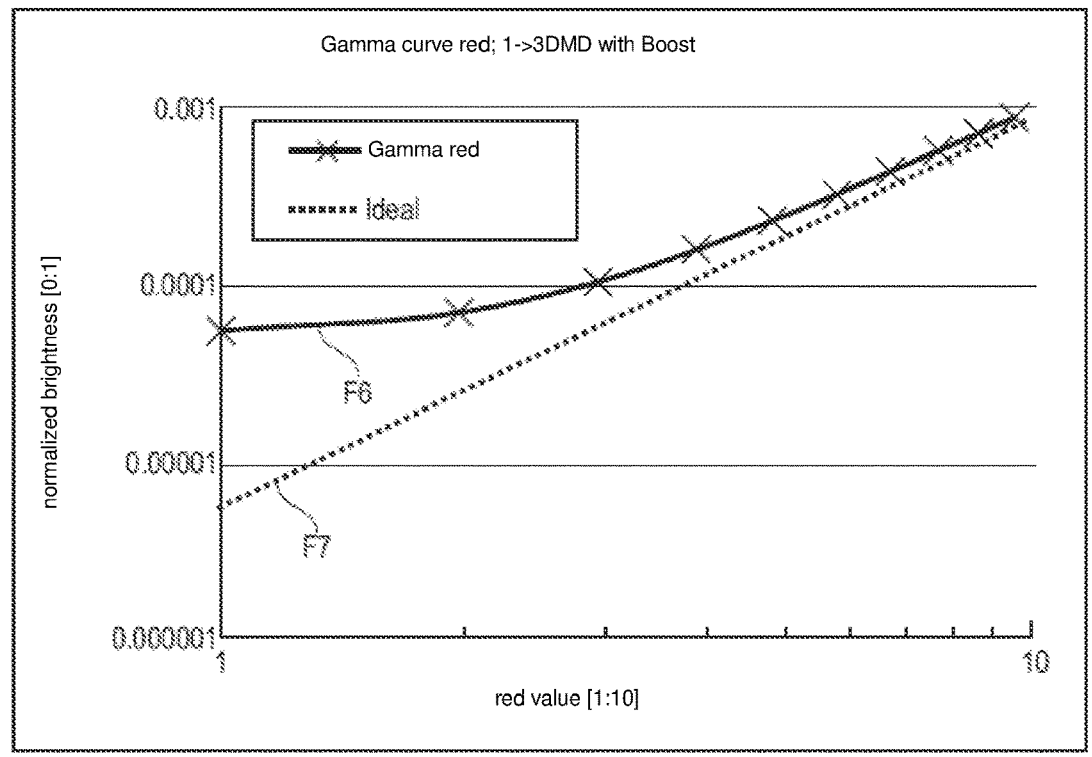
FIG. 58 shows the gamma curve for red for a known projector with double modulation.

This exemplary embodiment reveals once again especially the advantages of the solution according to the invention. This becomes clear if consideration is given to the dimming of colors that differ distinctly from white. For dark red hues for example—according to the prior art—green and blue light (corresponding to the contrast in this spectral range) is also forwarded via the first modulator 3 and results in desaturation of the colors. As a result of the boosting presented here, the first modulator 3 (shared for all colors) remains at black, while only the residual light thereof—split into color channels—is manipulated by the second modulators. FIGS. 55 and 56 then show, in the same way as FIGS. 51 and 52, the dimming from red (255/0/0) to black (0/0/0) for the "1-3" projector 1 according to the invention (FIG. 55) and a corresponding prior art "1-3" projector in FIG. 56. The gamma curve F6 for red for the "1-3" projector 1 according to the invention is shown in FIG. 57. The corresponding gamma curve F6 for a prior art "1-3" projector is shown in FIG. 58. Here the actual gamma curves F6 are again illustrated by a solid line and the ideal gamma curves F7 by dotted lines, in the same way as illustrated in FIGS. 53 and 54. A comparison of FIGS. 31 and 32 shows clearly what improvement is achieved by means of the projector 1 according to the invention. Moreover, reference can be made to the numbers in FIG. 50.

The projector 1 in accordance with FIG. 46 also has a red, a green and a blue color channel, wherein the first modulator 3 is part of all three color channels. The imaging modulator $5_1$ is part of the red color channel, the imaging modulator $5_2$ is part of the green color channel and the imaging modulator $5_3$ is part of the blue color channel.

Figure 59:
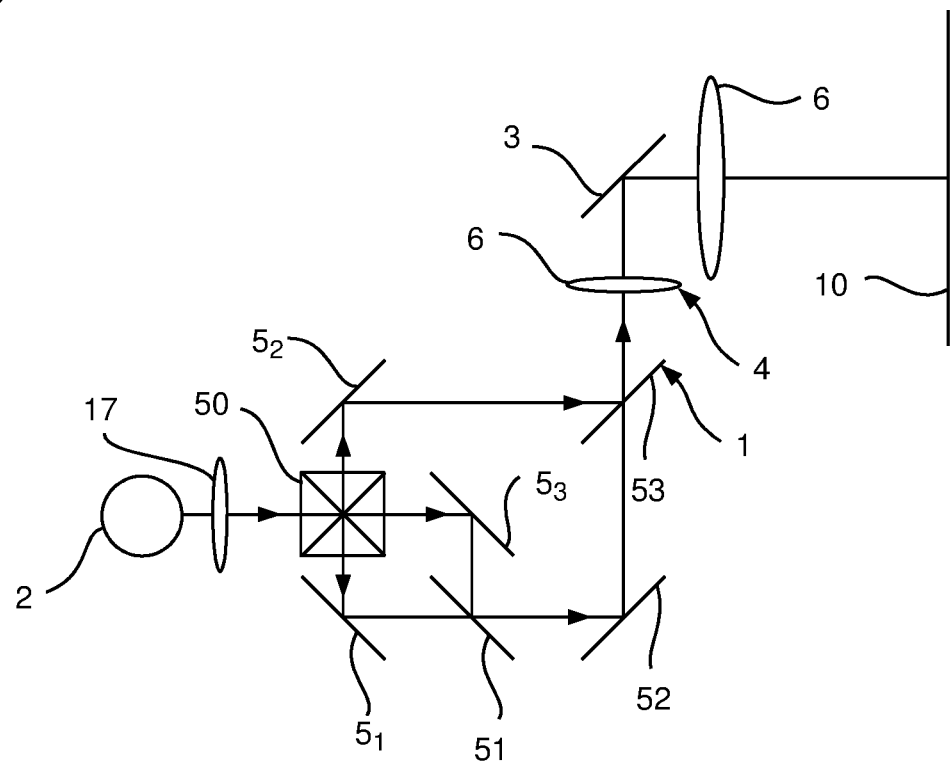
FIG. 59 shows a further exemplary embodiment of the projector according to certain embodiments of the invention.

The light from the light source 2 can alternatively also firstly be spectrally split, then be directed via three imaging modulators $5_1$, $5_2$, $5_3$, then be combined and guided via a "clean-up" modulator 3, and finally be projected, as is shown in FIG. 59 (in order to simplify the illustration, the control unit 7 is not depicted). In the above description of the modulator 1 from FIG. 46 and the formulae, it is merely necessary to interchange "illumination modulator" and "clean-up" modulator.

In this exemplary embodiment, the "clean-up" modulator 3 is part of all three color channels. The imaging modulator $5_1$ is part of the red color channel, the imaging modulator $5_2$ is part of the green color channel and the imaging modulator $5_3$ is part of the blue color channel.

In a further exemplary embodiment, consideration is given to a projector 1 (FIG. 60; in order to simplify the illustration, the control unit 7 is not depicted) in which the light is firstly split into a red, a green and a blue color component. Then the light is directed via three (color-specific) modulators $3_1$, $3_2$, $3_3$ ("illumination") and subsequently via three (likewise color-specific) modulators $5_1$, $5_2$, $5_3$ ("imaging"). Afterward, the light is again combined and directed via a projection optical unit 6 to a projection surface 10. The modulators $3_1$-$3_3$, $5_1$-$5_3$ are six DMDs in this example. In this exemplary embodiment, the modulators $3_1$ and $5_1$ are part of the red color channel, the modulators $3_2$ and $5_2$ are part of the green color channel and the modulators $3_3$ and $5_3$ are part of the blue color channel.

In the case of such a "3→3" arrangement, equation (21) can be written as:

$$S_{3 \to 3}(\lambda, g_{1r}, g_{1g}, g_{1b}, g_{2r}, g_{2g}, g_{2b}) = \int_{Frame} dt I(\lambda) \cdot T_O(\lambda) \cdot \sum_{colors\ c\in(r,g,b)} T_{C,c}(\lambda) \cdot D_{1c}(t, \lambda, g_{1c}) \cdot D_{2c}(t, \lambda, g_{2c}) \qquad (38)$$

In this case, $T_{C,c}(\lambda)$ shall be the transmission for the color channel $c\in(r,g,b)$ including the color splitters and color combiners. $D_{1c}(t, \lambda, g_{1c})$ and $D_{2c}(t, \lambda, g_{2c})$ describe the reflectivities of the three illumination and imaging DMDs $3_1$-$3_3$, $5_1$-$5_3$.

For the representation of bright image contents, the illumination DMDs $3_1$-$3_3$ will be at white at least at the times when the imaging DMD $5_1$-$5_3$ that is assigned in terms of color is at white (analogously to a 1→1 DMD system).

If equation (29) is written in a representation with DMD times, then the following holds true for the representation of dark image contents by means of boosting (analogously to (25) in the first exemplary embodiment):

$$S_{3 \to 3DMD}(\lambda, t_{01,r}, t_{01,g}, t_{01,b}) = \qquad (39)$$

$$\frac{1}{\tau} \cdot I(\lambda) \cdot T_O(\lambda) \cdot \sum_{c\in(r,g,b)} T_{C,c}(\lambda) \cdot D_{1c}(\lambda, ''black'') \cdot$$

$$\{(\tau - t_{01,c}) \cdot D_{2c}(\lambda, ''black'') + t_{01,c} \cdot D_{2c}(\lambda, ''white'')\}$$

In this case, $\tau = \tau_r = \tau_g = \tau_b$.

Once again the times $t_{01,r}$, $t_{01,g}$, $t_{01,b}$ are sought, then, which allow a sought value for $\vec{X}_{target}$ to be represented. Using equations (3) to (6), the above equation can be rearranged to form the following requirement:

Find $t_{01,c} \in [0:\tau_c]$ where $c\in\{r, g, b\}$, such that $\|\vec{X}_{target} - \vec{X}_{3 \to 3DMD}(t_{01,r}, t_{01,g}, t_{01,b})\|$ becomes minimal, where $$\vec{X}_{3 \to 3DMD}(t_{01,r}, t_{01,g}, t_{01,b}) = \qquad (40)$$

$$\frac{1}{\tau} \cdot \sum_{c\in(r,g,b)} \{(\tau_c - t_{01,c}) \cdot \vec{X}_{00,c} + t_{01,c} \cdot \vec{X}_{01,c}\}$$

In this case:

$$\vec{X}_{00,c} = \int d\lambda \qquad (41)$$

$$I(\lambda) \cdot T_O(\lambda) \cdot D_{1c}(\lambda, ''black'') \cdot D_{2c}(\lambda, ''black'') \cdot T_{C,c}(\lambda) \cdot \begin{pmatrix} \bar{x}(\lambda) \\ \bar{y}(\lambda) \\ \bar{z}(\lambda) \end{pmatrix}$$

$$\vec{X}_{01,c} = \int d\lambda \qquad (42)$$

$$I(\lambda) \cdot T_O(\lambda) \cdot D_{1c}(\lambda, ''black'') \cdot D_{2c}(\lambda, ''black'') \cdot T_{C,c}(\lambda) \cdot \begin{pmatrix} \bar{x}(\lambda) \\ \bar{y}(\lambda) \\ \bar{z}(\lambda) \end{pmatrix}$$

Figure 60:
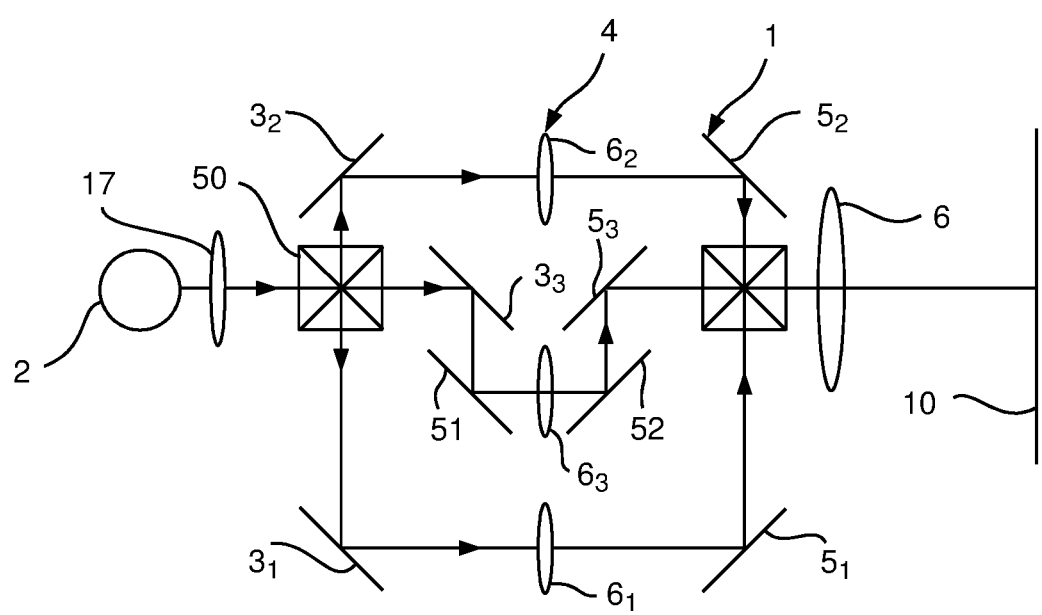
FIG. 60 shows a further exemplary embodiment of the projector according to certain embodiments of the invention.

These vectors $\vec{X}_{00,c}$ and $\vec{X}_{01,c}$ are variables which can be determined for example experimentally for a projector 1 in accordance with FIG. 60.

A description is given below of exemplary embodiments that use image generators or modulators which set the brightnesses by way of damping. For such image generators that damp light depending on the grayscale value during an entire frame, it is possible to dispense with a time dependence in the formulae. Systems comprising LCD or LCoS image generators are typically involved here.

The transmission (or reflectivity in the case of an LCoS) can be described in a simplified way such that there is a background transmission U and also a modulated transmission $T_D(\lambda)$:

$$D_D(\lambda, g) = U(\lambda) + \left(\frac{g}{255}\right)^\gamma \cdot T_D(\lambda) \quad (43)$$

There is no time dependence since the transmission remains constant during a frame (for the sake of simplicity, we assume that "fractional" grayscale values g can be represented by way of temporal dithering; an explicit time dependence can thus be omitted). γ corresponds to the value for gamma, which is chosen as 2.2 in the following example and reproduces the relationship between the input grayscale level and the resulting brightness.

Analogously to equation (13) for image generators with pulse width modulation, a double modulation for damping image generators can be written as:

$$S_{D,double}(\lambda, g_{1r}, g_{1g}, g_{1b}, g_{2r}, g_{2g}, g_{2b}) = \Sigma_{colors\ c\in(r,g,b)} I(\lambda) \cdot T_C(c,\lambda) \cdot D_{D1}(t,\lambda,g_{1c}) \cdot D_{D2}(t,\lambda,g_{2c}) \cdot T_O(\lambda) \quad (44)$$

One possible arrangement is analogous to projector 1 in accordance with FIG. 46 and has a first modulator 3, which illuminates three further (colored) modulators 5₁, 5₂, 5₃ (modulators for the colors red, green and blue). The modulators 3 and 5₁-5₃ from FIG. 46 are LCD or LCoS modulators in the case of the exemplary embodiment now described. This results in the following:

$$S_{D,1\to3}(\lambda, g_1, g_{2r}, g_{2g}, g_{2b}) = I(\lambda) \cdot D_{D1}(\lambda, g_1) \cdot T_O(\lambda) \cdot \Sigma_{colors\ c\in(r,g,b)} T_{C,c}(\lambda) \cdot D_{D2c}(\lambda, g_{2c}) \quad (45)$$

For dark image contents, boosting can be effected here, too, by the first (shared) modulator 3 being switched to black. Use of (43) results in the following:

$$S_{D,1\to3}(\lambda, g_{2r}, g_{2g}, g_{2b}) = \quad (46)$$

$$I(\lambda) \cdot U_1(\lambda) \cdot T_O(\lambda) \cdot \sum_{c\in(r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$

What are sought, then, are the variables $g_{2r}$, $g_{2g}$, $g_{2b}$ which allow a sought value for $\vec{X}_{target}$ to be represented. Using equations (3) to (6), the above equation can be rearranged to form the following requirement:

Find $g_{2,c} \in [0:255]$ where $c\in\{r, g, b\}$, such that $\|\vec{X}_{target} - \vec{X}_{D,1\to3}(g_{2r}, g_{2g}, g_{2b})\|$ becomes minimal, where $$\vec{X}_{D,1\to3}(g_{2r}, g_{2g}, g_{2b}) = \sum_{c\in(r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\} \quad (47)$$

In this case:

$$\vec{X}_{00,c} = \int d\lambda\, I(\lambda) \cdot T_O(\lambda) \cdot U_1(\lambda) \cdot U_{2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \quad (48)$$

$$\vec{X}_{01,c} = \int d\lambda\, I(\lambda) \cdot T_O(\lambda) \cdot U_1(\lambda) \cdot T_{D2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \quad (49)$$

These vectors $\vec{X}_{00,c}$ and $\vec{X}_{01,c}$ are variables which can be determined for example experimentally for the projector 1.

What is thus involved here once again is a linear equation system for the variables $$\left(\frac{g_{2r}}{255}\right)^\gamma, \left(\frac{g_{2g}}{255}\right)^\gamma,$$

and $$\left(\frac{g_{2b}}{255}\right)^\gamma,$$

which can be solved with respect to the grayscale values $g_{2r}$, $g_{2g}$, $g_{2b}$ sought.

The explanations are analogously applicable to an arrangement in which the light is firstly split and guided via three image generators 5₁, 5₂, 5₃ in order then to be combined and guided via a "clean-up" modulator 3 (as e.g. in FIG. 60).

A further possible arrangement for LCD or LCoS modulators is analogous to the projector 1 in accordance with FIG. 60 and has three first (colored) modulators 3₁, 3₂, 3₃, downstream of which three further (colored) modulators 5₁, 5₂, 5₃ are disposed. This results in the following:

$$S_{D,3\to3}(\lambda, g_{1r}, g_{1g}, g_{1b}, g_{2r}, g_{2g}, g_{2b}) = I(\lambda) \cdot T_O(\lambda) \cdot \Sigma_{colors\ c\in(r,g,b)} D_{D1c}(\lambda, g_{1c}) \cdot T_{C,c}(\lambda) \cdot D_{D2c}(\lambda, g_{2c}) \quad (50)$$

For dark image contents, boosting can be effected here, too, by the first modulators 3₁-3₃ being switched to black. Use of (43) results in the following:

$$S_{D,3\to3}(\lambda, g_{2r}, g_{2g}, g_{2b}) = \quad (51)$$

$$I(\lambda) \cdot U_{1c}(\lambda) \cdot T_O(\lambda) \cdot \sum_{c\in(r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$

What are sought again, then, are the variables $g_{2r}$, $g_{2g}$, $g_{2b}$ which allow a sought value for $\vec{X}_{target}$ to be represented. Using equations (3) to (6), the above equation can be rearranged to form the following requirement:

Find $g_{2,c} \in [0:255]$ where $c\in\{r, g, b\}$, such that $\|\vec{X}_{target} - \vec{X}_{D,3\to3}(g_{2r}, g_{2g}, g_{2b})\|$ becomes minimal, where $$\vec{X}_{D,3\to3}(g_{2r}, g_{2g}, g_{2b}) = \sum_{c\in(r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\} \quad (52)$$

In this case:

$$\vec{X}_{00,c} = \int d\lambda\, I(\lambda) \cdot T_O(\lambda) \cdot U_{1c}(\lambda) \cdot U_{2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \quad (53)$$

$$\vec{X}_{01,c} = \int d\lambda\, I(\lambda) \cdot T_O(\lambda) \cdot U_{1c}(\lambda) \cdot T_{D2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \quad (54)$$

These vectors $\vec{X}_{00,c}$ and $\vec{X}_{01,c}$ are variables which can be determined for example experimentally for a projection system 1.

What is thus involved here once again is a linear equation system for the variables $$\left(\frac{g_{2r}}{255}\right)^{\gamma}, \left(\frac{g_{2g}}{255}\right)^{\gamma},$$

und $$\left(\frac{g_{2b}}{255}\right)^{\gamma},$$

which can be solved with respect to the grayscale values $g_{2r}$, $g_{2g}$, $g_{2b}$ sought.

In the description, only dimming of white and red has been discussed in the examples. Generally, a double modulation also enables a lower desaturation of the primary colors during dimming. The effect is all the better, the shorter the illumination can be for dark colors. The advantage becomes clear particularly in the case of a 1→3 DMDs arrangement (see e.g. FIGS. 49 and 24).

No modulation of residual light is carried out in the case of the projector 201 with double modulation in accordance with FIG. 39 according to the prior art; there, for non-black image contents, both image generators are set such that they are not at black.

If boosting were carried out such that for the boosted grayscale values only a factor by which these grayscale values must be greater is specified, the desired correction of the color locus variation would lead to poor results. The reasons for this are:

Even the boosted primary colors have a different color locus than the original primary colors. A factor can therefore take account of only the brightness differences and not the color.

The second modulator (the one which effects boosting) also has a finite contrast. Therefore, dark boosted values must be represented darker than what is established by way of the factor.

The two reasons mentioned become all the more important, the more the black point deviates from the white point and the lower the contrast of the second (boosting) modulator.

At least factors which are different for each color should be predefined.

In order to correctly generate the brightnesses in the case of dark but non-boosted values (which are typically too bright if the RGB input values are forwarded directly to the second image generator), it is possible here, too, already to damp the values output to the second image generator. This can also already be derived from the described formalism according to equation (11).

The solution presented is also applicable to systems which have secondary colors (or spokes). The solutions for driving the boosted values remain unambiguous if there is restriction to boosting by way of the primary colors (linear relationship between three values of color valences of the target color and three grayscale values for primary colors).

In the exemplary embodiments with DMDs as modulators, it is not necessary for all the modulators to be DMDs. Since one of the modulators of the double modulation is at black, this modulator can also be a modulator on the basis of dimming (such as e.g. LCD or LCoS). Only the considerations regarding the ON and OFF times are DMD-specific.

It is not necessary to effect boosting only if all three color components can be boosted (that is to say are darker than the contrast of the first modulator). Rather, the set of formulae can be used even if only one or two of the three colors can be boosted. In this case, the times $t_{11,c}$ and $t_{10,c}$ of the corresponding color c are not equal to zero. On account of the discretization in a representation of colors, here as well there is a solution for the (more than three sought) times which results in a minimal color and brightness deviation (or a solution which is better than according to the prior art).

In principle, color-sequential imaging can also be carried out with LCD or LCoS. In that case, in the formulae the relative duration of the colors can be taken into account by way of a prefactor.

The set of formulae can also be applied to systems in which the colors are generated by way of colored light sources (such as laser, LED, laser phosphor, . . . ). In this case, spectra mentioned above for light source and color filter should be combined in a single spectrum for the colored light source.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A projector for projecting an image, comprising:
a first modulator, which has a plurality of first pixels capable of being impinged on by light from a light source;
a second modulator, which is disposed downstream of the first modulator and has a plurality of second pixels;
an imaging optical unit, which images the first modulator onto the second modulator,
wherein the first and second pixels are switchable independently of one another in each case into a first state, in which light incident on them is used for image generation, and into a second state, in which light incident on them does not serve for image generation, in order pixel-individually to modulate the light for generating the image,
a projection optical unit, which is configured to image light coming from the second modulator onto a projection surface in order to project the image, as a result of which each second pixel is assigned to an image point of the projected image; and
a control unit, which drives the first and second modulators on the basis of supplied image data, the control unit configured to drive the first and second modulators for a range of minimum possible to maximum possible brightness of the image data with a first resolution of NN levels, wherein NN is an integer greater than one,
wherein the control unit is configured such that each second pixel is assigned at least one first pixel in such a way that the imaging optical unit causes the second pixel:
a) to be impinged on by light from the respectively assigned first pixel if the assigned first pixel is switched into the first state, in order actively to illuminate the second pixel, and b) not to be impinged on by light from the respectively assigned first pixel if the assigned first pixel is switched into the second state, in order to not actively illuminate the second pixel such that only unavoidable residual light is incident on the second pixel, wherein the control unit is configured to drive the modulators such that for at least one second pixel which is assigned to an image point which, on the basis of the image data, is intended to have a brightness value which is greater than zero, wherein the control unit is further configured such that either:

c) the at least one second pixel is switched into the second state and the assigned first pixel(s) are switched into the first state for a brightness modulation only during a time segment(s) in which the at least one second pixel is switched into the second state, such that residual light modulated by the at least one second pixel then emanates and contributes to the image generation, wherein the control unit is configured to drive the assigned first pixel(s) on the basis of an increased brightness value, or d) the assigned first pixel(s) are switched into the second state at least at time segments in which the at least one second pixel is switched into the first state, such that no active illumination is effected and the at least one second pixel modulates the residual light, wherein the control unit is configured to drive the residual-light-modulating second pixel on the basis of an increased brightness value, and wherein the control unit is further configured to:

e) apply a predefined brightness change to the brightness value in accordance with the image data for the image point such that a changed brightness value having a second resolution, which is greater than the first resolution, is calculated, and f) convert the changed brightness value into the increased brightness value such that it has the first resolution and is greater than a notional comparison value having the first resolution that arises if the predefined brightness change is applied to the brightness value in accordance with the image data, such that the control unit is configured to drive one of the modulators in either step c) or step d) with the increased brightness value having the first resolution.

2. The projector as claimed in claim 1, wherein the control unit is further configured to multiply the brightness value in accordance with the image data (BD) by a value that determines the brightness change.

3. The projector as claimed in claim 1, wherein an individual brightness change is stored for each image point and is accessed by the control unit during the calculation of the changed brightness value.

4. The projector as claimed in claim 1, wherein the brightness change is a brightness reduction.

5. The projector as claimed in claim 1, wherein the brightness change is applied in order to carry out an adaptation of the brightness in an image field overlap region with either a further projector or an adaptation to the brightness of a further projector or both thereof.

6. The projector as claimed in claim 1, wherein the brightness change is applied in order to compensate for a variation of the brightness of the imaged second pixels, said variation being caused by a variation of a size of the second pixels imaged onto the projection surface.

7. The projector as claimed in claim 1, wherein the increased brightness value is at least 10 times the brightness value of the comparison value if NN is equal to 256.

8. The projector as claimed in claim 1, wherein the control unit drives the two modulators by means of pulse-width-modulated control data.

9. The projector as claimed in claim 1, wherein the control unit is further configured to:

in step e) apply a predefined brightness change to the brightness value in accordance with the image data for each image point such that a changed brightness value having a second resolution, which is greater than the first resolution, is calculated, and compare the changed brightness value with a boost threshold value, and if the changed brightness value is less than the boost threshold value, performs step f).

10. The projector as claimed in claim 9, wherein the control unit, if the changed brightness value is equal to or greater than the boost threshold value, converts the changed brightness value into a brightness value having the first resolution, without carrying out an additional increase.

11. The projector as claimed in claim 10, wherein the control unit is configured to determine the at least one second pixel that modulates the residual light in accordance with step c) by the following steps, comprising:

i) at least one second pixel is selected which is assigned to an image point whose brightness value predefined by the image data and the predefined brightness change is greater than zero and less than or equal to the boost threshold value, and ii) a selected second pixel is determined as a residual-light-modulating second pixel if all assigned first pixels, on account of the image data and the predefined brightness change, are driven in each case in accordance with a brightness value that is less than a predetermined second threshold value, wherein the second threshold value is chosen such that the time segment(s) when the first pixels are to be switched into the first state do not overlap the time segment(s) when the residual-light-modulating second pixel is to be switched into the first state, in order to modulate the residual light.

12. The projector as claimed in claim 11, wherein the control unit performs step ii) for a second pixel selected in step i) only if at least one of k neighboring pixels of the selected second pixel is assigned to an image point whose brightness value predefined by the image data and the predefined brightness change is greater than the boost threshold value, wherein k is a natural number greater than or equal to 1.

13. The projector as claimed in claim 9, wherein the control unit is configured to determine the at least one second pixel that modulates the residual light in accordance with step c) by the following steps, comprising:

i) at least one second pixel is selected which is assigned to an image point whose brightness value predefined by the image data and the predefined brightness change is greater than zero and less than or equal to the boost threshold value, and ii) a selected second pixel is determined as a residual-light-modulating second pixel if all assigned first pixels, on account of the image data and the predefined brightness change, are driven in each case in accordance with a brightness value that is less than a predetermined second threshold value, wherein the second threshold value is chosen such that the time segment(s) when the first pixels are to be switched into the first state does or do not overlap the time segment(s) when the residual-light-modulating second pixel is to be switched into the first state, in order to modulate the residual light.

14. The projector as claimed in claim 13, wherein the control unit performs step ii) for a second pixel selected in step i) only if at least one of k neighboring pixels of the selected second pixel is assigned to an image point whose brightness value predefined by the image data and the predefined brightness change is greater than the boost threshold value, wherein k is a natural number greater than or equal to 1.

15. The projector as claimed in claim 1, comprising
a plurality of color channels in order to generate color partial images of the image to be projected,
wherein a first color channel includes the first modulator, the second modulator and the imaging optical unit, and
wherein each of the other color channels comprise:
the first modulator or a further first modulator, which has a plurality of first pixels capable of being driven independently of one another in order to modulate light capable of impinging on the first modulator;
the imaging optical unit or a further imaging optical unit; and
the second modulator or a further second modulator, which has a plurality of second pixels capable of being driven independently of one another and which, by means of the imaging optical unit, is capable of being impinged on by the light modulated by the first modulator and modulates this light via the second pixels in order to generate a color partial image,
wherein the control unit drives each color channel such that one of the color partial images is generated, and the projection optical unit is configured to image the generated color partial images onto a projection surface such that the color partial images are perceptible as a projected multicolored image,
wherein each color channel is configured for generating a color partial image of a predetermined primary color,
wherein the color locus of the predetermined primary color varies with the brightness to be generated, and
wherein the control unit drives each color channel such that for at least one image point in the multicolored image which, in accordance with the image data, is intended to have a predetermined target color locus and a predetermined target brightness, the color locus shift of the predetermined target color locus that is caused by the color channel or the color channels is compensated for with the target brightness being maintained.

16. The projector as claimed in claim 15, wherein the control unit is configured to provide a greater compensation during the driving of the color channels as target brightness decreases.

17. The projector as claimed in claim 16, wherein the control unit has, for target color loci generatable via the projector with assigned target brightnesses, predetermined and stored correction values for the color channels, wherein the control unit is configured to use the correction values for compensation during the driving of the color channels.

18. The projector as claimed in claim 15, wherein the control unit has, for target color loci generatable via the projector with assigned target brightnesses, predetermined and stored correction values for the color channels, wherein the control unit is configured to use the correction values for compensation during the driving of the color channels.

19. A projector for projecting an image, comprising:
a first modulator, which has a plurality of first pixels capable of being impinged on by light from a light source;
a second modulator, which is disposed downstream of the first modulator and has a plurality of second pixels;
an imaging optical unit, which images the first modulator onto the second modulator,
wherein the first and second pixels are switchable independently of one another in each case into a first state, in which light incident on them is used for image generation, and into a second state, in which light incident on them does not serve for image generation, in order pixel-individually to modulate the light for generating the image,
a projection optical unit, which is configured to image light coming from the second modulator onto a projection surface in order to project the image, as a result of which each first pixel is assigned to an image point of the projected image; and
a control unit that drives the two modulators on the basis of supplied image data,
wherein the control unit is configured to drive the modulators for a range of minimum possible to maximum possible brightness of the image data with a first resolution of NN levels, wherein NN is an integer greater than one,
wherein each first pixel is assigned at least one second pixel by the control unit in such a way that the imaging optical unit,
a) if the first pixel is switched into the first state, causes the at least one second pixel to be impinged on by light from the first pixel, in order actively to illuminate the second pixel, and
b) if the first pixel is switched into the second state, causes the at least one second pixel not to be impinged on by light from the first pixel, in order not actively to illuminate the second pixel, with the result that only unavoidable residual light is incident on the second pixel,
wherein the control unit is configured to drive the modulators such that for at least one first pixel which is assigned to an image point which, on the basis of the image data, is intended to have a brightness value which is greater than zero,
c) the at least one first pixel is switched into the second state and the assigned second pixel(s) is or are switched into the first state only during the time segment(s) in which the at least one first pixel is switched into the second state, with the result that no active illumination is effected and the assigned second pixel(s) modulate(s) the residual light, wherein the control unit drives the residual-light-modulating second pixel(s) on the basis of an increased brightness value, or
d) the assigned second pixel(s) are switched into the second state for brightness modulation at least at the time segments in which the at least one first pixel is switched into the first state, with the result that residual light modulated by the assigned second pixel(s) then emanates and contributes to the image generation, wherein the control unit drives the at least one first pixel on the basis of an increased brightness value, wherein the control unit is further configured to:
- e) apply a predefined brightness change to the brightness value in accordance with the image data for the image point such that a changed brightness value having a second resolution, which is greater than the first resolution, is calculated, and
- f) convert the changed brightness value into the increased brightness value such that it has the first resolution and is greater than a notional comparison value having the first resolution that arises if the predefined brightness change is applied to the brightness value in accordance with the image data, with the result that the control unit drives one of the modulators in step c) or d) with the increased brightness value having the first resolution.

* * * * *

UNITED STATES PATENT AND TRADEMARK OFFICE
CERTIFICATE OF CORRECTION

PATENT NO. : 10,791,306 B2
APPLICATION NO. : 16/731410
DATED : September 29, 2020
INVENTOR(S) : Christoph Nieten et al.

It is certified that error appears in the above-identified patent and that said Letters Patent is hereby corrected as shown below:

In the Specification

Column 26, Line 13: Delete "$J_{prior\,art}(g) := U + (1-U) \cdot \left(\dfrac{g}{255}\right)^{\gamma}$"

And replace with -- $I_{prior\,art}(g) := U + (1-U) \cdot \left(\dfrac{g}{255}\right)^{\gamma}$ --

Column 28, Lines 20-35: Delete "
$$I_{Boost2}(g) = \begin{cases} U^2 & \text{for } g = 0 \rightarrow (g_1 = 0, g_2' = 0) \\ U \cdot \left(U + (1-U) \cdot \left(\dfrac{g_2'}{255}\right)^{\gamma}\right) & \text{for } 0 < g \leq g_{Limit} \rightarrow \left(g_1 = 0,\, g_2' = 255 \cdot \left[\dfrac{\left(\dfrac{g}{255}\right)^{\gamma} - U}{1-U}\right]^{\frac{1}{\gamma}}\right) \\ U + (1-U) \cdot \left(\dfrac{g_2}{255}\right)^{\gamma} & \text{for } g > g_{Limit} \rightarrow \left(g_1 = 255,\, g_2' = 255 \cdot \left[\dfrac{\left(\dfrac{g}{255}\right)^{\gamma} - U}{1-U}\right]^{\frac{1}{\gamma}}\right) \end{cases}$$
"

Signed and Sealed this
Tenth Day of September, 2024

*Katherine Kelly Vidal*
Katherine Kelly Vidal
*Director of the United States Patent and Trademark Office*

CERTIFICATE OF CORRECTION (continued)

$$I_{Boost\,2}(g) = \begin{cases} U^2 & \text{for } g=0 \rightarrow (g_1=0, g_2'=0) \\ U \cdot \left\{ U + (1-U) \cdot \left(\frac{g_2'}{255}\right)^\gamma \right\} & \text{for } 0 < g \leq g_{Limit} \rightarrow \left( g_1=0, g_2'=255 \cdot \left[ \frac{\left(\frac{g}{255}\right)^\gamma - U}{1-U} \right]^{\frac{1}{\gamma}} \right) \\ U + (1-U) \cdot \left(\frac{g_2'}{255}\right)^\gamma & \text{for } g > g_{Limit} \rightarrow \left( g_1=255, g_2'=255 \cdot \left[ \frac{\left(\frac{g}{255}\right)^\gamma - U}{1-U} \right]^{\frac{1}{\gamma}} \right) \end{cases}$$

And replace with --

Column 30, Line 43: Delete "$I_{theor}(g) = I_{2 \times DMD}(g_1 = 0, g_2^*)$"

And replace with -- $I_{theor}(g) = I_{2xDMD}(g_1 = 0, g_2^*)$ --

Column 31, Lines 22-24: Delete

"$\left(\frac{g}{255}\right)^\gamma = \frac{1}{T}\{T_1 \cdot U^2 + T_2 \cdot U + T_3\} = \frac{(T_{RGB} - \tau) \cdot U^2 + (\tau - n_2 \cdot t_{min}) \cdot U + n_2 \cdot t_{min}}{T_{RGB}}$"

And replace with

-- $\left(\frac{g}{255}\right)^\gamma = \frac{1}{T}\{T_1 \cdot U^2 + T_2 \cdot U + T_3\} = \frac{(T_{RGB} - \tau) \cdot U^2 + (\tau - n_2 \cdot t_{min}) \cdot U + n_2 \cdot t_{min}}{T_{RGB}}$ --

Column 31, Lines 51-66: Delete

"$I_{Boost3}(g) =$ $\begin{cases} U^2 & \text{for } g=0 \rightarrow (g_1 = g_2^* = 0) \\ \frac{n_2 \cdot t_{min} \cdot U \cdot (1-U)}{T_{RGB}} + U^2 & \text{for } 0 < g \leq g_{Limit} \rightarrow \left( g_1 = 0, n_2 = \left[\left[ \frac{T_{RGB} \cdot \left(\left(\frac{g}{255}\right)^\gamma - U^2\right)}{t_{min} \cdot U \cdot (1-U)} \right]\right] \right) \\ \frac{(T_{RGB} - \tau) \cdot U^2 + (\tau - n_2 \cdot t_{min}) \cdot U + n_2 \cdot t_{min}}{T_{RGB}} & \text{for } g_{Limit} < g \leq g_{Dither} \rightarrow \left( g_1 = 1, n_2 = \left[\left[ \frac{T_{RGB} \cdot \left(\frac{g}{255}\right)^\gamma - (T_{RGB} - \tau) \cdot U^2 - \tau \cdot U}{t_{min} \cdot (1-U)} \right]\right] \right) \\ \text{Normal } DMD - \text{Double modulation} & \text{for } g_{Dither} < g \leq 255 \end{cases}$"

And replace with $$I_{Boost3}(g) = \begin{cases} U^2 & \text{for } g=0 \to (g_1 = g_2^* = 0) \\ \frac{n_2 \cdot t_{min} \cdot U \cdot (1-U)}{T_{RGB}} + U^2 & \text{for } 0 < g \le g_{Limit} \to \left(g_1 = 0, n_2 = \left\lceil \frac{T_{RGB} \cdot \left(\left(\frac{g}{255}\right)^\gamma - U^2\right)}{t_{min} \cdot U \cdot (1-U)} \right\rceil\right) \\ \frac{(T_{RGB} - \tau) \cdot U^2 + (\tau - n_2 \cdot t_{min}) \cdot U + n_2 \cdot t_{min}}{T_{RGB}} & \text{for } g_{Limit} < g \le g_{Dither} \to \left(g_1 = 1, n_2 = \left\lceil \frac{T_{RGB} \cdot \left(\frac{g}{255}\right)^\gamma - (T_{RGB} - \tau) \cdot U^2 - \tau \cdot U}{t_{min} \cdot (1-U)} \right\rceil\right) \\ \text{Normal DMD -- Double modulation} & \text{for } g_{Dither} < g \le 255 \end{cases}$$

Column 48, Line 15 Equation 14: Delete

"$S_{2 \times DMD, prior art}(\lambda, t_{00,r}, t_{01,r}, t_{10,r}, t_{00,g}, t_{01,g}, t_{10,g}, t_{00,b}, t_{01,b}, t_{10,b}) =$
$\frac{1}{\tau_r + \tau_g + \tau_b} \cdot \sum_{c \in (r,g,b)} \tau_c \cdot I(\lambda) \cdot T_C(c, \lambda) \cdot T_O(\lambda) \cdot$
$\{t_{00,c} \cdot D_1(\lambda, "black") \cdot D_2(\lambda, "black") + t_{01,c} \cdot D_1(\lambda, "black") \cdot D_2(\lambda, "white") + t_{10,c} \cdot D_1(\lambda, "white") \cdot D_2(\lambda, "black") +$
$(\tau_c - t_{00,c} - t_{01,c} - t_{10,c}) \cdot D_1(\lambda, "white") \cdot D_2(\lambda, "white")\}$,"

And replace with

-- $S_{2xDMD, prior\ art}(\lambda, t_{00,r}, t_{01,r}, t_{10,r}, t_{00,g}, t_{01,g}, t_{10,g}, t_{00,b}, t_{01,b}, t_{10,b}) = \frac{1}{\tau_r + \tau_g + \tau_b} \cdot \sum_{c \in (r,g,b)} \tau_c \cdot I(\lambda) \cdot T_C(c, \lambda) \cdot T_O(\lambda) \cdot \{t_{00,c} \cdot D_1(\lambda, "black") \cdot D_2(\lambda, "black") + t_{01,c} \cdot D_1(\lambda, "black") \cdot D_2(\lambda, "white") + t_{10,c} \cdot D_1(\lambda, "white") \cdot D_2(\lambda, "black") + (\tau_c - t_{00,c} - t_{01,c} - t_{10,c}) \cdot D_1(\lambda, "white") \cdot D_2(\lambda, "white")\}$ --

Column 48, Line 64: Delete "$t_{00,c}$; for a time$_{01,c}$"
And replace with -- $t_{00,c}$; for a time $t_{01,c}$ --

Column 49, Line 12: Delete "($t_{10,c}$»$\tau_c$)"
And replace with -- ($t_{10,c} \ll \tau_c$) --

Column 49, Line 20 Equation 18: Delete "$t_{10,c} = \min\{0.012 \cdot \tau_c; \tau_c - \tau_{11,c}\}$"
And replace with -- $t_{10,c} = \min\{0.012 \cdot \tau_c; \tau_c - t_{11,c}\}$ --

Column 49, Line 27: Delete "holds true that: $t_{10,c}$ $t_{10,c}(t_{11,c})$."
And replace with -- holds true that: $t_{10,c} = t_{10,c}(t_{11,c})$ --

CERTIFICATE OF CORRECTION (continued)
U.S. Pat. No. 10,791,306 B2

Column 49, Line 56 Equation 20: Delete

"$$S_{2\times DMD,SdT}(\lambda, t_{11,r}, t_{11,g}, t_{11,b}) = \frac{1}{\tau_r + \tau_g + \tau_b} \cdot \sum_{c \in (r,g,b)} \tau_c \cdot I(\lambda) \cdot T_C(c,\lambda) \cdot T_O(\lambda) \cdot$$
$$\{(\tau_c - t_{11,c} - t_{10,c}(t_{11,c})) \cdot D_1(\lambda, "black") \cdot D_2(\lambda, "black") +$$
$$t_{10,c}(t_{11,c}) \cdot D_1(\lambda, "white") \cdot D_2(\lambda, "black") +$$
$$t_{11,c} \cdot D_1(\lambda, "white") \cdot D_2(\lambda, "white")\}$$", And replace with --$$S_{2xDMD,SdT}(\lambda, t_{11,r}, t_{11,g}, t_{11,b}) = \frac{1}{\tau_r + \tau_g + \tau_b} \cdot \sum_{c \in (r,g,b)} \tau_c \cdot I(\lambda) \cdot T_C(c,\lambda) \cdot T_O(\lambda) \cdot \{(\tau_c - t_{11,c} - t_{10,c}(t_{11,c})) \cdot D_1(\lambda,"black") \cdot D_2(\lambda,"black") + t_{10,c}(t_{11,c}) \cdot D_1(\lambda,"white") \cdot D_2(\lambda,"black") + t_{11,c} \cdot D_1(\lambda,"white") \cdot D_2(\lambda,"white")\}$$--

Column 51, Line 34 Equation 21: Delete

"$$S_{double+Boost}(\lambda, g_{2r}, g_{2g}, g_{2b}) = \int_{Frame} dt \sum_{colors\ c \in (r,g,b)} I(\lambda) \cdot T_C(c,\lambda) \cdot D_1(\lambda,"black") \cdot D_2(t,\lambda,g_{2r},g_{2g},g_{2b}) \cdot T_O(\lambda)$$", And replace with --$$S_{double+Boost}(\lambda, g_{2r}, g_{2g}, g_{2b}) = \int_{Frame} dt \sum_{colors\ c \in (r,g,b)} I(\lambda) \cdot T_C(c,\lambda) \cdot D_1(\lambda,"black") \cdot D_2(t,\lambda,g_{2r},g_{2g},g_{2b}) \cdot T_O(\lambda)$$--

Column 51, Line 39 Equation 22: Delete "

$$\vec{X}_{double+Boost}(g_{2r}, g_{2g}, g_{2b}) = \begin{pmatrix} \int_\lambda d\lambda S_{double+Boost}(\lambda, g_{2r}, g_{2g}, g_{2b}) \cdot x(\lambda) \\ \int_\lambda d\lambda S_{double+Boost}(\lambda, g_{2r}, g_{2g}, g_{2b}) \cdot y(\lambda) \\ \int_\lambda d\lambda S_{double+Boost}(\lambda, g_{2r}, g_{2g}, g_{2b}) \cdot z(\lambda) \end{pmatrix} = \begin{pmatrix} X_{double+Boost}(g_{2r}, g_{2g}, g_{2b}) \\ Y_{double+Boost}(g_{2r}, g_{2g}, g_{2b}) \\ Z_{double+Boost}(g_{2r}, g_{2g}, g_{2b}) \end{pmatrix}$$

"

CERTIFICATE OF CORRECTION (continued)
U.S. Pat. No. 10,791,306 B2

$$\vec{X}_{double+Boost}(g_{2r}, g_{2g}, g_{2b}) = \begin{pmatrix} \int_\lambda d\lambda\, S_{double+Boost}(\lambda, g_{2r}, g_{2g}, g_{2b}) \cdot \bar{x}(\lambda) \\ \int_\lambda d\lambda\, S_{double+Boost}(\lambda, g_{2r}, g_{2g}, g_{2b}) \cdot \bar{y}(\lambda) \\ \int_\lambda d\lambda\, S_{double+Boost}(\lambda, g_{2r}, g_{2g}, g_{2b}) \cdot \bar{z}(\lambda) \end{pmatrix}$$

$$= \begin{pmatrix} X_{double+Boost}(g_{2r}, g_{2g}, g_{2b}) \\ Y_{double+Boost}(g_{2r}, g_{2g}, g_{2b}) \\ Z_{double+Boost}(g_{2r}, g_{2g}, g_{2b}) \end{pmatrix}$$

And replace with -- --

Column 51, Line 57: Delete " $\|\vec{X} - \vec{X}_{double+Boost}(g_{2r}, g_{2g}, g_{2b})\|$ ,"

And replace with -- $\|\vec{X}_{target} - \vec{X}_{double+Boost}(g_{2r}, g_{2g}, g_{2b})\|$ --

Column 52, Line 45 Equation 26: Delete

" $\vec{X}_{2\times DMD}(\tau_{01,r}, t_{01,g}, t_{01,b}) = \frac{1}{\tau_r + \tau_g + \tau_b} \cdot \sum_{c \in (r,g,b)} \{(\tau_c - \tau_{01,c}) \cdot \vec{X}_{00,c} + t_{01,c} \cdot \vec{X}_{01,c}\}$ "

And replace with $\vec{X}_{2xDMD}(t_{01,r}, t_{01,g}, t_{01,b}) = \frac{1}{\tau_r + \tau_g + \tau_b} \cdot \sum_{c \in (r,g,b)} \{(\tau_c - t_{01,c}) \cdot \vec{X}_{00,c} + t_{01,c} \cdot \vec{X}_{01,c}\}$

-- --

Column 52, Line 55 Equation 27: Delete

" $\vec{X}_{00,c} = \frac{\tau_c}{\tau_r + \tau_g + \tau_b} \int d\lambda\ I(\lambda) \cdot T_C(c, \lambda) \cdot D_1(\lambda, \text{"black"}) \cdot D_2(\lambda, \text{"black"}) \cdot T_O(\lambda) \cdot \begin{pmatrix} x(\lambda) \\ y(\lambda) \\ z(\lambda) \end{pmatrix}$ "

And replace with $\vec{X}_{00,c} = \frac{\tau_c}{\tau_r + \tau_g + \tau_b} \int d\lambda\ I(\lambda) \cdot T_C(c, \lambda) \cdot D_1(\lambda, \text{"black"}) \cdot D_2(\lambda, \text{"black"}) \cdot T_O(\lambda) \cdot \begin{pmatrix} \bar{x}(\lambda) \\ \bar{y}(\lambda) \\ \bar{z}(\lambda) \end{pmatrix}$

-- --

CERTIFICATE OF CORRECTION (continued)
U.S. Pat. No. 10,791,306 B2

Column 52, Line 56 Equation 28: Delete

"$$\vec{X}_{01,c} = \frac{\tau_c}{\tau_r + \tau_g + \tau_b} \int d\lambda$$

$$I(\lambda) \cdot T_C(c,\lambda) \cdot D_1(\lambda, "black") \cdot D_2(\lambda, "white") \cdot T_O(\lambda) \cdot \begin{pmatrix} x(\lambda) \\ y(\lambda) \\ z(\lambda) \end{pmatrix}$$ ,"

And replace with

-- $$\vec{X}_{01,c} = \frac{\tau_c}{\tau_r + \tau_g + \tau_b} \int d\lambda \, I(\lambda) \cdot T_C(c,\lambda) \cdot D_1(\lambda, "black") \cdot D_2(\lambda, "white") \cdot T_O(\lambda) \cdot \begin{pmatrix} \bar{x}(\lambda) \\ \bar{y}(\lambda) \\ \bar{z}(\lambda) \end{pmatrix}$$ --

Column 54, Line 45 Equation 29: Delete

"$$\frac{1}{\tau_r + \tau_g + \tau_b} \cdot$$

$$(\vec{X}_{01,r} - \vec{X}_{00,r} \quad \vec{X}_{01,g} - \vec{X}_{00,g} \quad \vec{X}_{01,b} - \vec{X}_{00,b})^T \cdot \begin{pmatrix} t_{01,r} \\ t_{01,g} \\ t_{01,b} \end{pmatrix} =$$

$$\vec{X}_{target} - \frac{1}{\tau_r + \tau_g + \tau_b} \sum_{c \in (r,g,b)} \tau_c \cdot \vec{X}_{00,c}$$ ,"

And replace with

-- $$\frac{1}{\tau_r + \tau_g + \tau_b} \cdot (\vec{X}_{01,r} - \vec{X}_{00,r} \quad \vec{X}_{01,g} - \vec{X}_{00,g} \quad \vec{X}_{01,b} - \vec{X}_{00,b})^T \cdot \begin{pmatrix} t_{01,r} \\ t_{01,g} \\ t_{01,b} \end{pmatrix} = \vec{X}_{target} - \frac{1}{\tau_r + \tau_g + \tau_b} \cdot \sum_{c \in (r,g,b)} \tau_c \cdot \vec{X}_{00,c}$$ --

Column 55, Line 5 Equation 32: Delete "$$\vec{X} = \vec{X}_{target} - \frac{1}{\tau_r + \tau_g + \tau_b} \cdot \sum_{c \in (r,g,b)} \tau_c \cdot \vec{X}_{00,c}$$"

And replace with -- $$\vec{X} = \vec{X}_{target} - \frac{1}{\tau_r + \tau_g + \tau_b} \cdot \sum_{c \in (r,g,b)} \tau_c \cdot \vec{X}_{00,c}$$ --

CERTIFICATE OF CORRECTION (continued)
U.S. Pat. No. 10,791,306 B2

Column 55, Line 60 Equation 34: Delete

" $S_{1 \to 3DMD}(\lambda, t_{01,r}, t_{01,g}, t_{01,b}) =$ $\frac{1}{\tau} \cdot I(\lambda) \cdot T_O(\lambda) \cdot D_1(\lambda, "black") \cdot \sum_{c \in (r,g,b)} T_{C,c}(\lambda) \cdot$ $\{(\tau - t_{01,c}) \cdot D_{2c}(\lambda, "black") + t_{01,c} \cdot D_{2c}(\lambda, "white")\}$ ", And replace with -- $S_{1 \to 3DMD}(\lambda, t_{01,r}, t_{01,g}, t_{01,b}) = \frac{1}{\tau} \cdot I(\lambda) \cdot T_O(\lambda) \cdot D_1(\lambda, "black") \cdot \sum_{c \in (r,g,b)} T_{C,c}(\lambda) \cdot \{(\tau - t_{01,c}) \cdot D_{2c}(\lambda, "black") + t_{01,c} \cdot D_{2c}(\lambda, "white")\}$ --

Column 56, Lines 5-7: Delete

"Find $t_{01,c} \in [0:\tau_c]$ where $c \in \{r, g, b\}$, such that $\|\vec{X}_{target} - \vec{X}_{1 \to 3DMD}(t_{01,r}, t_{01,g}, t_{01,b})\|$ becomes minimal, where"

And replace with

-- Find $t_{01,c} \in [0:\tau_c]$ where $c \in \{r, g, b\}$, such that $\|\vec{X}_{target} - \vec{X}_{1 \to 3DMD}(t_{01,r}, t_{01,g}, t_{01,b})\|$ becomes minimal, where --

Column 56, Line 10 Equation 35: Delete

" $\vec{X}_{1 \to 3DMD}(t_{01,r}, t_{01,g}, t_{01,b}) = \frac{1}{\tau} \sum_{c \in (r,g,b)} \{(t_c - t_{01,c}) \cdot \vec{X}_{00,c} + t_{01,c} \cdot \vec{X}_{01,c}\}$ "

And replace with

-- $\vec{X}_{1 \to 3DMD}(t_{01,r}, t_{01,g}, t_{01,b}) = \frac{1}{\tau} \cdot \sum_{c \in (r,g,b)} \{(\tau_c - t_{01,c}) \cdot \vec{X}_{00,c} + t_{01,c} \cdot \vec{X}_{01,c}\}$ --

Column 58, Line 30 Equation 39: Delete

" $S_{3 \to 3DMD}(\lambda, t_{01,r}, t_{01,g}, t_{01,b}) =$ $\frac{1}{\tau} \cdot I(\lambda) \cdot T_O(\lambda) \cdot \sum_{c \in (r,g,b)} T_{C,c}(\lambda) \cdot D_{1c}(\lambda, "black") \cdot$ $\{(\tau - t_{01,c}) \cdot D_{2c}(\lambda, "black") + t_{01,c} \cdot D_{2c}(\lambda, "white")\}$ ", And replace with -- $S_{3 \to 3DMD}(\lambda, t_{01,r}, t_{01,g}, t_{01,b}) = \frac{1}{\tau} \cdot I(\lambda) \cdot T_O(\lambda) \cdot \sum_{c \in (r,g,b)} T_{C,c}(\lambda) \cdot D_{1c}(\lambda, "black") \cdot \{(\tau - t_{01,c}) \cdot D_{2c}(\lambda, "black") + t_{01,c} \cdot D_{2c}(\lambda, "white")\}$ --

CERTIFICATE OF CORRECTION (continued)
U.S. Pat. No. 10,791,306 B2

Column 58, Lines 41-42: Delete

"Find $t_{01,c} \in [0:\tau_c]$ where $c \in \{r, g, b\}$, such that $\|\vec{X}_{target} - \vec{X}_{3 \to 3DMD}(t_{01,r}, t_{01,g}, t_{01,b})\|$ becomes minimal, where"

And replace with

-- Find $t_{0.1,c} \in [0:\tau_c]$ where $c \in \{r, g, b\}$, such that $\|\vec{X}_{target} - \vec{X}_{3 \to 3DMD}(t_{01,r}, t_{01,g}, t_{01,b})\|$ becomes minimal, where --

Column 58, Line 45 Equation 40: Delete

"$$\vec{X}_{3 \to 3DMD}(t_{01,r}, t_{01,g}, t_{01,b}) = \frac{1}{\tau} \cdot \sum_{c \in (r,g,b)} \{(\tau_c - t_{01,c}) \cdot \vec{X}_{00,c} + t_{01,c} \cdot \vec{X}_{01,c}\}$$"

And replace with

-- $$\vec{X}_{3 \to 3DMD}(t_{01,r}, t_{01,g}, t_{01,b}) = \frac{1}{\tau} \cdot \sum_{c \in (r,g,b)} \{(\tau_c - t_{01,c}) \cdot \vec{X}_{00,c} + t_{01,c} \cdot \vec{X}_{01,c}\}$$ --

Column 59, Line 45 Equation 46: Delete

"$$S_{D,1 \to 3}(\lambda, g_{2r}, g_{2g}, g_{2b}) = I(\lambda) \cdot U_1(\lambda) \cdot T_O(\lambda) \cdot \sum_{c \in (r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$"

And replace with

-- $$S_{D,1 \to 3}(\lambda, g_{2r}, g_{2g}, g_{2b}) = I(\lambda) \cdot U_1(\lambda) \cdot T_O(\lambda) \cdot \sum_{c \in (r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$ --

Column 59, Line 56 Equation 47: Delete

"$$\vec{X}_{D,1 \to 3}(g_{2r}, g_{2g}, g_{2b}) = \sum_{c \in (r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\}$$"

And replace with

-- $$\vec{X}_{D,1 \to 3}(g_{2r}, g_{2g}, g_{2b}) = \sum_{c \in (r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\}$$ --

CERTIFICATE OF CORRECTION (continued)
U.S. Pat. No. 10,791,306 B2

Column 60, Line 36 Equation 51: Delete

"$$S_{D,3\to 3}(\lambda, g_{2r}, g_{2g}, g_{2b}) = I(\lambda) \cdot U_{1c}(\lambda) \cdot T_O(\lambda) \cdot \sum_{c \in (r,g,b)} T_{C,c}(\lambda) \cdot \left( U_{2c}(\lambda) + \left(\frac{g_{2c}}{255}\right)^{\gamma} \cdot T_{D2c}(\lambda) \right)$$"

And replace with

-- $$S_{D,3\to 3}(\lambda, g_{2r}, g_{2g}, g_{2b}) = I(\lambda) \cdot U_{1c}(\lambda) \cdot T_O(\lambda) \cdot \sum_{c \in (r,g,b)} T_{C,c}(\lambda) \cdot \left\{ U_{2c}(\lambda) + \left(\frac{g_{2c}}{255}\right)^{\gamma} \cdot T_{D2c}(\lambda) \right\}$$ --

Column 60, Line 50 Equation 52: Delete

"$$\vec{X}_{D,3\to 3}(g_{2r}, g_{2g}, g_{2b}) = \sum_{c \in (r,g,b)} \left\{ \left(1 - \left(\frac{g_{2c}}{255}\right)^{\gamma}\right) \cdot \vec{X}_{00,c} + \left(\frac{g_{2c}}{255}\right)^{\gamma} \cdot \vec{X}_{01,c} \right\}$$"

And replace with

-- $$\vec{X}_{D,3\to 3}(g_{2r}, g_{2g}, g_{2b}) = \sum_{c \in (r,g,b)} \left\{ \left(1 - \left(\frac{g_{2c}}{255}\right)^{\gamma}\right) \cdot \vec{X}_{00,c} + \left(\frac{g_{2c}}{255}\right)^{\gamma} \cdot \vec{X}_{01,c} \right\}$$ --

Column 61, Line 22: Delete "clear particularly in the case of a 1→3 DMDs arrangement"
And replace with -- clear particularly in the case of a 1->3 DMDs arrangement --